US012669947B2

(12) United States Patent
Durham et al.

(10) Patent No.: US 12,669,947 B2
(45) Date of Patent: Jun. 30, 2026

(54) MEMORY SAFETY WITH SINGLE MEMORY TAG PER ALLOCATION

(71) Applicant: Intel Corporation, Santa Clara, CA (US)

(72) Inventors: David M. Durham, Beaverton, OR (US); Michael LeMay, Hillsboro, OR (US); Sergej Deutsch, Hillsboro, OR (US); Dan Baum, Haifa (IL)

(73) Assignee: Intel Corporation, Santa Clara, CA (US)

( * ) Notice: Subject to any disclaimer, the term of this patent is extended or adjusted under 35 U.S.C. 154(b) by 23 days.

(21) Appl. No.: 17/957,814

(22) Filed: Sep. 30, 2022

(65) Prior Publication Data

US 2023/0393769 A1 Dec. 7, 2023

Related U.S. Application Data

(60) Provisional application No. 63/349,011, filed on Jun. 3, 2022.

(51) Int. Cl.
*G06F 3/06* (2006.01)

(52) U.S. Cl.
CPC .......... *G06F 3/0631* (2013.01); *G06F 3/0604* (2013.01); *G06F 3/0659* (2013.01); *G06F 3/0679* (2013.01)

(58) Field of Classification Search
CPC .... G06F 3/0604; G06F 3/0631; G06F 3/0659; G06F 3/0679; G06F 12/023; G06F 12/0875; G06F 12/109; G06F 12/1441; G06F 21/52; G06F 21/78; G06F 2212/1044; G06F 2212/1052; G06F 2212/466; G06F 2212/657
See application file for complete search history.

(56) References Cited

U.S. PATENT DOCUMENTS

2020/0125742 A1* 4/2020 Kounavis .............. H04L 9/0861
2021/0405896 A1* 12/2021 Durham .................. G06F 3/064

OTHER PUBLICATIONS

"Armv8.5—A Memory Tagging Extension," Arm, White Paper, Aug. 2, 2019, retrieved from https://developer.arm.com/documentation/102925/0100 (9 pages).

(Continued)

*Primary Examiner* — Larry T Mackall
(74) *Attorney, Agent, or Firm* — Alliance IP, LLC

(57) ABSTRACT

A processor includes a register to store an encoded pointer for a memory address within a first memory allocation of a plurality of memory allocations in a memory region of a memory. The processor further includes circuitry to receive a memory operation request based on the encoded pointer and to obtain a first tag of a plurality of tags stored in a table in the memory. Each memory allocation of the plurality of memory allocations is associated with a respective one of the plurality of tags stored in the table. The circuitry is to further obtain pointer metadata stored in the encoded pointer and to determine whether to perform a memory operation corresponding to the memory operation request based, at least in part, on a determination of whether the first pointer metadata corresponds to the first tag.

25 Claims, 25 Drawing Sheets

(56) References Cited

OTHER PUBLICATIONS

Bannister, Steve, "Memory Tagging Extension: Enhancing memory safety through architecture," Arm Community Blogs, Architectures and Processor blog, Aug. 5, 2019, retrieved from https://community. arm.com/arm-community-blogs/b/architectures-and-processors-blog/posts/enhancing-memory-safety (6 pages).

Bernhard, Lukas et al., "xTag: Mitigating User-After-Free Vulnerabilities via Software-Based Pointer Tagging on Intel x86-64," Cornell University, arXiv:2203.04117 [cs.CR], Mar. 8, 2022, 18 pages, retrieved from https://arxiv.org/abs/2203.04117 (18 pages).

Bialek, Joe et al., "Security Analysis of Memory Tagging," githubusercontent.com, Mar. 2020, retrieved from https://raw. githubusercontent.com/microsoft/MSRC-Security-Research/master/papers/2020/Security%20analysis%20of%20memory%20tagging. pdf (16 pages).

Chen, Tony et al., "Pointer Tagging for Memory Safety," microsoft. com, Jul. 19, 2019, 23 pages, retrieved from https://www.microsoft. com/en-us/research/uploads/prod/2019/07/Pointer-Tagging-for-Memory-Safety.pdf (23 pages).

Gretton-Dann, Matthew, "Arm A-Profile Architecture Developments 2018: Armv8.5-A," Arm Community Blogs, Architectures and Processor blog, Sep. 17, 2018, retrieved from https://community. arm.com/arm-community-blogs/b/architectures-and-processors-blog/posts/arm-a-profile-architecture-2018-developments-armv85a (7 pages).

Mitsunami, Koki, "Delivering enhanced security through Memory Tagging Extension," Arm Community Blogs, Architectures and Processor blog, Jun. 24, 2021, retrieved from https://community. arm.com/arm-community-blogs/b/architectures-and-processors-blog/posts/enhanced-security-through-mte (11 pages).

Serebryany, Kostya et al., "Memory Tagging and how it improves C/C++ memory safety," arXiv.org, Feb. 26, 2018, retrieved from https://arxiv.org/pdf/1802.09517 (14 pages).

* cited by examiner

EXECUTION UNIT(S) CIRCUITRY
2362

ALU 2401

VECTOR / SIMD 2403

LOAD / STORE 2405

BRANCH / JUMP 2407

FPU 2409

FIG. 24

MEMORY SAFETY WITH SINGLE MEMORY TAG PER ALLOCATION

CROSS REFERENCE TO RELATED APPLICATION

This Application claims the benefit of, and priority to, U.S. Provisional Patent Application No. 63/349,011, entitled "MEMORY SAFETY WITH SINGLE MEMORY TAG PER ALLOCATION", filed Jun. 3, 2022, the entire disclosure of which is incorporated herein by reference.

TECHNICAL FIELD

The present disclosure relates in general to the field of computer security, and more specifically, to memory safety with single memory tag per allocation.

BACKGROUND

Memory tags are values that are associated with every 16-byte region of application memory. At least some memory tagging schemes require setting a memory tag for every 16-byte (or other fixed size) granule of allocated data. In a system that implements such a scheme, every memory allocation operation for a 16 MB buffer results in one million tag set instructions. Thus, current memory tagging schemes introduce tremendous memory overhead costs in computing systems.

BRIEF DESCRIPTION OF THE DRAWINGS

FIG. 24 illustrates examples of execution unit(s) circuitry.

DETAILED DESCRIPTION

Figure 1:
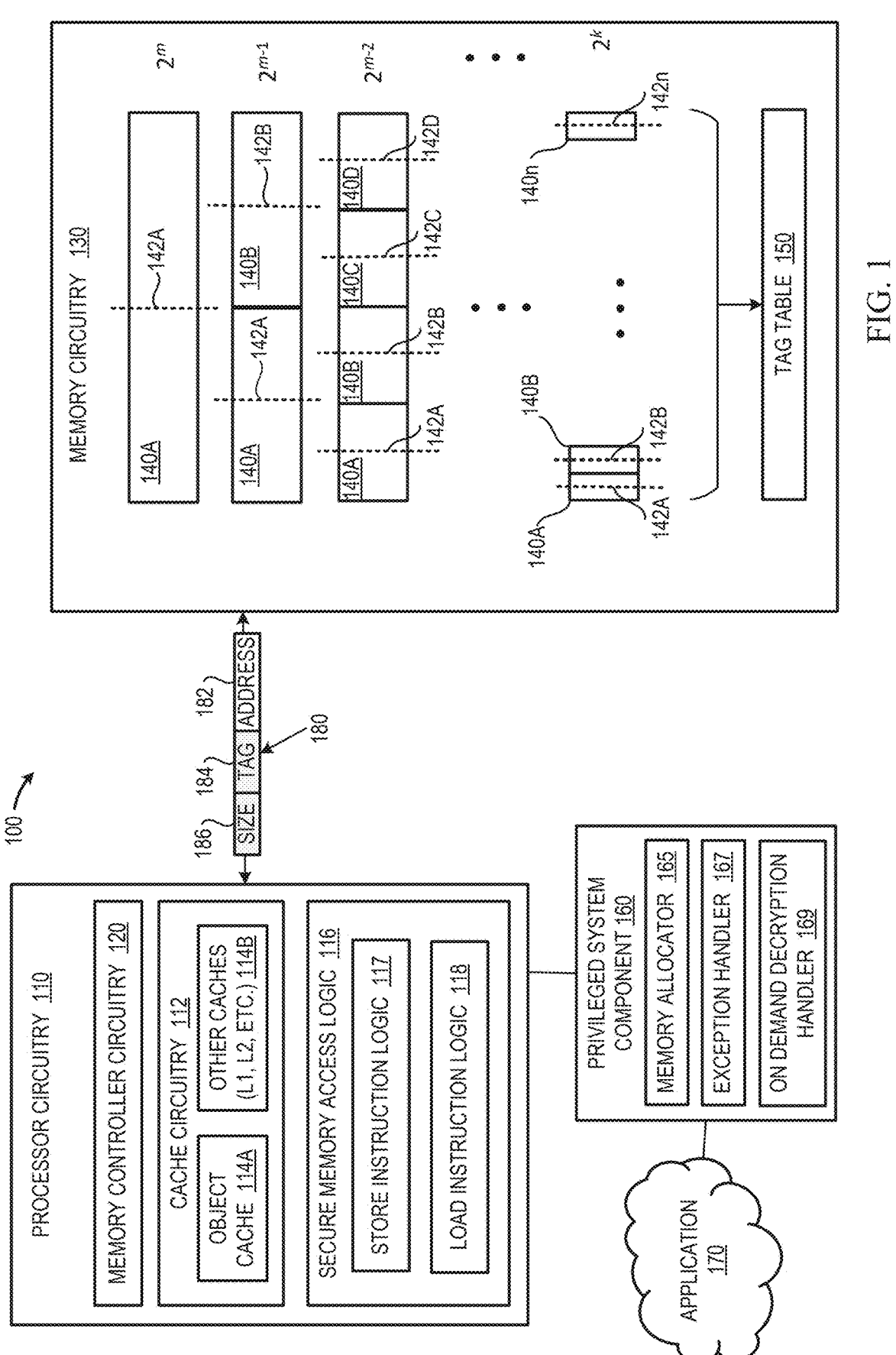
FIG. 1 is a schematic diagram of an illustrative memory safety system for performing memory tag allocation checks according to at least one embodiment.

The present disclosure provides various possible embodiments, or examples, of systems, methods, apparatuses, architectures, and machine readable media for memory safety with a single memory tag per allocation. In particular, embodiments disclosed herein provide the same or similar security safety of typical memory tagging (e.g., one tag per minimum size granule of data), but use only one memory tag set per allocation regardless of allocation size. This offers an order of magnitude performance advantage and lower memory overhead.

Numerous memory safety techniques use tags to protect memory. Memory Tagging Extensions (MTE) offered by ARM Limited, Memory Tagging Technology (MTT), Data Corruption Detection, and SPARC Application Data Integrity (ADI) offered by Oracle Corporation all match a memory tag with a pointer tag per granule of data accessed from memory. The matching is typically performed on a memory access instruction (e.g., on a load/store instruction). Matching a memory tag with a pointer tag per the minimum size granule of data (e.g., 16-byte granule, 8-byte granule, etc.) can be used to determine if the current pointer is accessing memory currently allocated to that pointer. If the tags do not match, an error is generated.

With existing memory tagging solutions such as MTT, MTE, etc., a tag must be set for every granule of memory allocated. By way of example, at 16-bytes granularity, on a memory allocation operation (e.g., malloc, calloc, free, etc.), a 16 MB allocation requires more than one million set tag instructions to be executed and over one million tags set. This produces an enormous power and performance penalty as well as introducing memory overhead.

A memory safety system as disclosed herein can resolve many of the aforementioned issues (and more). One or more embodiments of a memory safety system disclosed herein provide a pointer encoding for finding just one memory tag per memory allocation, regardless of allocation size. In some architectures, this can be achieved with a unique linear pointer encoding that identifies the location of tag metadata, for a given size and location of a memory allocation in a linear address space. A tag in the pointer is then matched with the single memory tag located in a linear memory table for any granule of memory, along with bounds and other memory safety metadata.

In other architectures where physical memory is used, for example, a pointer encoding can identify the location of tag metadata for a given size and location of a memory allocation in any sequence of one or more internally contiguous ranges of physical memory (e.g., a page of physical memory in an architecture with paging, a contiguous space of physical memory in an architecture without paging, etc.), even though each range is not necessarily (but could be) contiguous with the other ranges comprising the allocation. Generally, the techniques described herein can be used to implement a single tag for any memory allocation in a contiguous region of any type of memory (e.g., linear memory, physical memory with paging, physical memory without paging, etc.).

Embodiments of a memory safety system disclosed herein offer significant advantages. Embodiments provide orders of magnitude advantage over setting potentially millions of tags in existing technologies where a tag is applied to every 16-byte memory granule. In addition, embodiments herein enable a single tag lookup a memory access operation (e.g., load/store). Furthermore, only one tag needs to be set per allocation, which can save a tremendous amount of memory and performance overhead, while still offering the security and memory safety of existing memory tagging.

Reference is now made to the drawings. FIG. 1 is a schematic diagram of an illustrative computing system 100 with a memory safety configuration for validating memory accesses in which the system 100 includes processor circuitry 110, memory controller circuitry 120 (e.g., memory controller (MC), integrated memory controller (IMC), memory management unit (MMU)), and memory circuitry 130, with memory apportioned into one or more power of two (i.e., $2^0$ to $2^n$) memory allocation slots 140A-140n (e.g., memory allocation slots 140A, 140B, 140C, 140D ... 140n), with respective midpoints 142A-142n (e.g., midpoints 142A, 142B, 142C, 142D ... 142n) defined in each the slots. In at least one embodiment, memory allocations obtained by an executing application 170 are assigned to one of the memory allocation slots 140A-140n based on one of the power of two sized slots. The encoding of a virtual/linear address (pointer) for a memory allocation identifies a memory allocation slot to which the memory allocation is assigned and optionally, may include a unique tag value that is associated with the memory allocation.

FIG. 1 depicts the memory circuitry 130 allocated into a number of sample memory allocation slots 140A-140n. In embodiments, an instruction that causes the processor circuitry 110 to perform a memory operation causes the memory controller circuitry 120 to access the memory circuitry 130 using an encoded pointer 180 that includes at least data representative of the memory address 182 of the memory operation and metadata, such as data representative of a power or exponent (e.g., size metadata 186) that indicates the size of a memory allocation slot to which a memory allocation is assigned. The metadata also includes tag (or version) metadata 184 associated with the memory allocation assigned to a memory allocation slot 140A-140n containing memory address 182.

To prevent use-after-free (UAF) violations, tag metadata 184 can be compared to the tag metadata in a tag table 150 (also referred to herein as a 'metadata table') stored in memory circuitry 130 in memory that may be separate from the memory allocation slots 140A-140n. If the pointer tag metadata 184 matches the stored tag metadata in the tag table 150, the operation at the designated memory address 182 is permitted. If the pointer tag metadata 184 fails to match the stored tag metadata in the tag table 150, an exception is returned to the processor circuitry 110. In some embodiments, bounds checks may also be performed. If the memory to be accessed by the pointer is within the left and/or right bounds specified by the metadata stored in the tag table 150, then the bounds check passes and the memory access may be permitted. Otherwise, if the memory to be accessed by the pointer is outside the range specified by the stored bounds metadata in the tag table 150, then the bounds check fails and memory access may be denied.

The processor circuitry 110 includes any number and/or combination of electrical components, optical components, quantum components, semiconductor devices, and/or logic elements capable of executing machine-readable instructions, such as provided by one or more applications 170. Processor circuitry 110 may include a plurality of processor core circuits. Each of processor core circuits may provide one or more hardware and/or virtual processor threads. The processor circuitry 110 may include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Core i9, Itanium®, Pentium®, Xeon®, Xeon Phi® and XScale® processors; and similar processors. According to some examples, the processor circuitry 110 may also be an application specific integrated circuit (ASIC) and at least some modules of processor core circuits may be implemented as hardware elements of the ASIC.

Processor circuitry 110 may include additional circuitry and logic. Processor circuitry 110 may include all or a part of memory controller circuitry 120 (memory management unit (MMU), address generation unit (AGU), load buffer, store buffer, etc.) and may also include cache circuitry 112. In other hardware configurations, memory controller circuitry could be communicatively coupled with, but separate from processor circuitry. Memory controller circuitry 120 can include any number and/or combination of electrical components, optical components, quantum components, semiconductor devices, and/or logic elements capable of performing read and/or write operations to the cache circuitry 112 and/or the memory circuitry 130. For example, processor circuitry 110 may further include secure memory access logic 116, which can include store instruction logic 117 for performing memory access operations to store/write data or code to memory and load instruction logic 118 for performing memory access operations to read/load data or code from memory. It should be apparent, however, that read and/or write operations may access the requested data in cache circuitry 112, for example, if the appropriate cache lines were previously loaded into cache circuitry and not yet moved back to memory circuitry 130. In some embodiments, the processor circuitry 110 and/or the memory controller circuitry 120 may include memory management unit (MMU) circuitry to store information and/or data used to provide paginated (e.g., via 4 KB pages) address translations.

The cache circuitry 112 of processor circuitry 110 may include an object cache 114A and various level caches 114B (e.g., level 1 (L1), level 2 (L2)). In some implementations, object cache 114A may be provided for each hardware thread running on processor circuitry 110 (e.g., running on a core of a processor). As will be further described herein, object cache 114A may be configured in linear memory or physical memory and may include metadata for memory allocations (also referred to herein as "allocation metadata" and a "set of metadata") of a program. A set of metadata for an allocation includes a tag. Depending on the particular embodiment as further described herein, and also depending on the size of the allocation, the set of metadata for a particular allocation may also include a descriptor and possibly bounds of the allocation (e.g., left bounds, right bounds, or both left and right bounds).

In some embodiments, a privileged system component 160, such as an operating system kernel or virtual machine monitor, or instruction set emulator, may facilitate communication between applications, such as application 170 and hardware components such as processor circuitry 110 and/or memory controller circuitry 120, for example. Furthermore, privileged system component 160 may be part of a trusted execution environment (TEE), virtual machine, processor circuitry 110, a coprocessor (not shown), or any other suitable hardware, firmware, or software of a computing device or securely connected to computing device. A memory allocator 165 may be part of privileged system component 160 and may be embodied as software, firmware, or hardware, or any combination thereof. Memory allocator may be configured to allocate portions of memory circuitry (e.g., based on instructions such as malloc, realloc, calloc, etc.) to the various processes running on the computing device, to deallocate memory (e.g., based on instructions such as delete, free, etc.) or reallocate memory (e.g., based on instructions such as realloc, etc.) for various processes running on the computing device. The memory allocator 165 could be embodied as, for example, a loader, memory manager service, or a heap management service. An exception handler 167 may also be part of the privileged system component 160. The exception handler 167 may be invoked when a tag check or a bounds check fails.

An on-demand decryption handler 169 may be included in one or more embodiments. In one example, the on-demand decryption handler 169 may be implemented in software, as part of privileged system component 160 for example. The on-demand decryption handler can be configured to decrypt a cryptographically protected object (e.g., data or code), or a portion thereof, in memory. In one or more embodiments, an encoded pointer (e.g., 180) to an object in memory can be used to encrypt and decrypt the object or a portion thereof based, at least in part, on a tweak derived, at least in part, from the encoded pointer. For example, the tweak may include upper address bits of the memory address encoded in the pointer, an encrypted slice of address bits in the encoded pointer, the tag metadata in the encoded pointer (which may or may not be encrypted), and/or any other metadata encoded in the encoded pointer or store separately from the encoded pointer. In some embodiments, a key, which may be secret, can also be used in the encryption and decryption.

When memory is needed by a program, processor circuitry 110 generates an encoded pointer 180 that includes at least data representative of a memory address (e.g., memory address 182) to be used in one or more memory access operations, data representative of the power or exponent (e.g., size metadata 186) that can be used to determine the size (e.g., based on a power of two) of a slot to which the memory allocation is assigned, and data representative of a tag (or version) (e.g., tag metadata 184) associated with the memory allocation slot 140A-140n containing the memory address 182. The tag may also be referred to herein as "version" or "color." The encoded pointer 180 may include additional information, such as pointer arithmetic bits that can be manipulated to cause the encoded pointer to reference different locations within the memory allocation as described below in detail with regard to FIG. 2.

The memory circuitry 130 includes any number and/or combination of electrical components, semiconductor devices, optical storage devices, quantum storage devices, molecular storage devices, atomic storage devices, and/or logic elements capable of storing information and/or data. All or a portion of the memory circuitry 130 may include transitory memory circuitry. All or a portion of the memory circuitry 130 may include non-transitory memory circuitry. Memory circuitry 130 may also be referred to as system memory or main memory. The memory circuitry 130 may include one or more storage devices having any storage capacity. For example, the memory circuitry 130 may include one or more storage devices having a storage capacity of about: 512 kilobytes or greater; 1 megabyte (MB) or greater; 100 MB or greater; 1 gigabyte (GB) or greater; 100 GB or greater; 1 terabyte (TB) or greater; or about 100 TB or greater.

In some embodiments, an instruction that causes the processor circuitry 110 to perform a memory allocation operation causes the processor circuitry 110 to apportion the memory circuitry 130 into any power of two number of memory allocation slots 140A-140n. As depicted in FIG. 1, in some embodiments, the processor circuitry 110 may apportion the memory circuitry 130 into a single memory allocation slot 140A (i.e., a power of two=$2^m$, for a value of m that results in the entire system memory being covered). As depicted in another example apportionment in FIG. 1, the processor circuitry 110 may apportion the memory circuitry 130 into two memory allocation slots 140A, 140B (i.e., a power of two=$2^{m-1}$). As depicted in another example apportionment in FIG. 1, the processor circuitry 110 may apportion the memory circuitry 130 into four memory allocation slots 140A-140D (i.e., a power of two=$2^{m-2}$). As depicted in another example apportionment in FIG. 1, the processor circuitry may apportion the memory circuitry 130 into "n" memory allocation slots 140A-140n (i.e., a power of two=$2^k$ for a value k that results in dividing the system memory into "n" memory allocations). In embodiments described herein, power of two memory allocation slots based on different powers or exponents (e.g., $2^k \ldots 2^{m-2}, 2^{m-1}$, and $2^m$, or any combination thereof) may be used for a single program in which memory allocations for the program are assigned to various sized allocation slots, as will be further described herein.

Importantly, note that the midpoint 142A-142n in each of the memory allocation slots 140A-140n does not align with the midpoint in other memory allocation slots, thereby permitting the assignment of each memory allocation to a unique slot. In addition, metadata associated with each memory allocation (e.g., tag values, data bounds values, descriptors that include allocation bounds information) can be stored in tag table 150 and indexed based on their corresponding slot midpoints 142A-142n. Allocation metadata can include a set of metadata, with the set including one or more items of metadata. Depending on the size of a particular allocation within an assigned slot, allocation metadata associated with the particular allocation may be stored one or more entries of the tag table 150 in a particular entry arrangement (e.g., format). In some embodiments, allocation metadata for smaller allocations (e.g., 1 granule) include only a tag, allocation metadata for slightly larger allocations (e.g., 2 granules) include a tag and a descriptor, and larger allocations (e.g., 3 granules or more) can include a tag, a descriptor, and left and/or right bounds. In other embodiments, even a single granule allocation may include a tag and a descriptor.

The encoded pointer 180 includes the memory address 182 to perform a memory operation (fetch/load, store/write, etc.). The memory address 182 may include any number of bits. For example, the memory address 182 may include: 8-bits or more; 16-bits or more, 32-bits or more; 48-bits or more; or 64-bits or more; 128-bits or more. In embodiments, the size metadata 186 carried by the encoded pointer 180 may include any number of bits. For example, the size metadata 186 may include 4-bits or more, 8-bits or more, 16-bits or more, or 32-bits or more. In embodiments, the tag metadata 184 carried by the encoded pointer 180 may include any number of bits. For example, the tag metadata 184 may include 4-bits or more, 8-bits or more, 16-bits or more, or 32-bits or more. In one or more embodiments, all or a portion of the address and/or tag metadata carried by the encoded pointer 180 may be encrypted.

Additionally, in one or more embodiments, the encoded pointer or a portion thereof may be used as input to a cryptographic algorithm (e.g., as a tweak or part of a tweak to a counter mode block cipher) to encrypt data or code to be stored in the memory allocation or to decrypt data or code loaded from the memory allocation. The cryptographic algorithm may also use a key (e.g., secret or non-secret) as input to encrypt/decrypt the data or code. For example, data or code within a bounded allocation may be encrypted (e.g., when stored/written) or decrypted (e.g., when loaded/read) using a tweakable block cipher such as Advanced Encryption Standard (AES) XOR-encrypt-XOR (XEX)-based tweaked-codebook mode with ciphertext stealing (XTS) mode (or equivalent) using the memory address for the current data load/store operation and/or a key as input and/or a tweak as input that includes at least the tag metadata 184 from encoded pointer 180. The tag metadata itself may be encrypted or in plaintext (i.e., unencrypted). Furthermore, the tweak may include the entire encoded pointer (e.g., with some parts encrypted), an entire decrypted and decoded pointer, selected portions of the encoded pointer (e.g., upper address bits, encrypted address bits, decrypted address bits, other metadata), other metadata or context information not encoded in the pointer, or any suitable combination thereof.

In some embodiments, the memory accesses are performed upon successful verification of the tag values stored in tag table and indexed (e.g., by allocation slot midpoints) to correspond to associated memory allocations containing the data targeted in the memory access operations. Also in some embodiments, memory accesses are not performed unless the targeted address range is determined to be within the bounds of the allocation, which may be stored in the tag table 150 along with the tag values associated with the same targeted address range. In one example, a bounds check may be performed by evaluating upper and/or lower allocation bounds information stored in the tag table 150 with the associated tag value for the same memory allocation being targeted.

Figure 2:
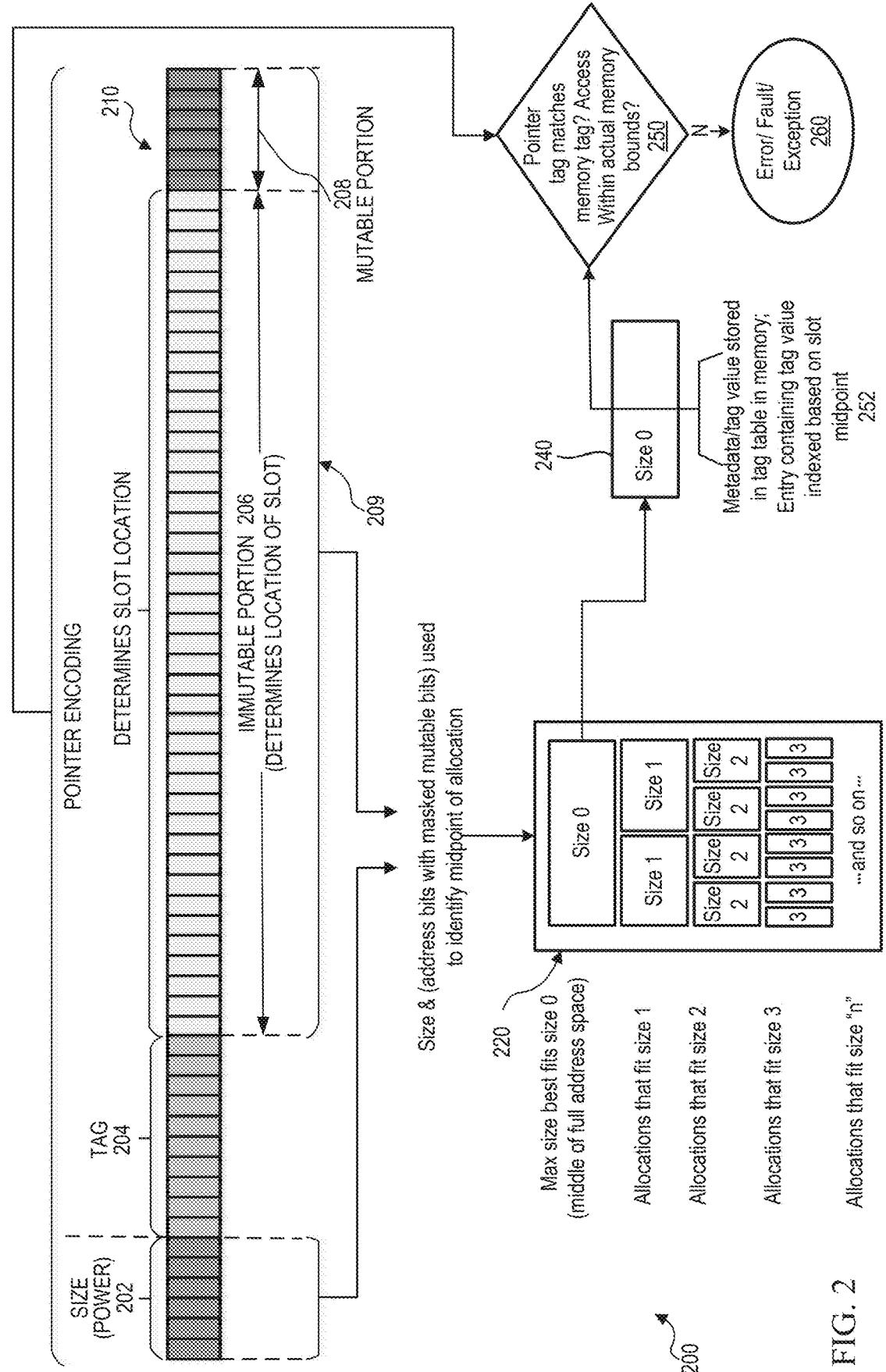
FIG. 2 is a schematic diagram of an illustrative encoded pointer architecture according to at least one embodiment.

Turning to FIG. 2, FIG. 2 is a schematic diagram of an example encoded pointer architecture and tag checking operation 200. FIG. 2 illustrates an encoded pointer 210 that may be used in one or more embodiments of a memory safety system disclosed herein. The encoded pointer 210 may be configured as any bit size, such as, for example, a 64-bit pointer (as shown in FIG. 2), or a 128-bit pointer, or a pointer that is larger than 128-bits. The encoded pointer, in one embodiment, may include an x86 architecture pointer. The encoded pointer 210 may include a greater (e.g., 128-bits), or lesser (e.g., 16-bits, 32-bits) number of bits.

FIG. 2 shows a 64-bit pointer (address) in its base format, using exponent size (power) metadata. The encoded pointer 210 includes a multi-bit size (power) metadata field 202, a multi-bit tag field 204, and a multi-bit address field 209 that includes an immutable portion 206 and a mutable portion 208 that can be used for pointer arithmetic. The encoded pointer 210 is an example configuration that may be used in one or more embodiments and may be the output of special address encoding logic that is invoked when memory is allocated (e.g., by an operating system, in the heap or in the stack, in the text/code segment) and provided to executing programs in any of a number of different ways, including by using a function such as malloc, alloc, calloc, or new; or implicitly via the loader; or statically allocating memory by the compiler, etc. As a result, an indirect address (e.g., a linear address) that points to the allocated memory, is encoded with metadata, which is also referred to herein as 'pointer metadata' (e.g., power/exponent in size metadata field 202, tag value in tag field 204) and, in at least some embodiments, is partially encrypted.

In embodiments, the number of bits used in the immutable portion 206 and mutable portion 208 of the address field 209 may be based on the size of the respective memory allocation as expressed in the size metadata field 202. For example, in general, a larger memory allocation ($2^0$) may require a lesser number of immutable address bits than a smaller memory allocation ($2^1$ to $2^n$). The immutable portion 206 may include any number of bits, although, it is noted that, in the shown embodiment of FIG. 2, the size number in fact does not correspond to the Po2 slot size. For example, the immutable portion 206 may accommodate memory addresses having: 8-bits or more; 16-bits or more, 32-bits or more; 48-bits or more; 52-bits or more; 64-bits or more; 128-bits or more.

In the example shown, the address field 209 may include a linear address (or a portion thereof). The size metadata field 202 may indicate a number of bits in mutable portion 208 of the encoded pointer 210. A number of low order address bits that comprise the mutable portion (or offset) 208 of the encoded pointer 210 may be manipulated freely by software for pointer arithmetic. In some embodiments, the size metadata field 202 includes data representative of a power (exponent) that indicates a slot size based on a power of two. A slot size corresponds to a particular number of granules in memory, where a granule is the smallest size (e.g., in bytes) of allocatable memory. For example, if the data in the size metadata field 202 has a value of 3, then based on a power of two slot size, the integer 3 can be used as an exponent of the integer 2 to determine that the power size of the slot is 8 granules (23=8). In other words, the slot is sized to contain 8 granules. If one granule is 16 bytes, then the slot size is 128 bytes (16×8=128). Other embodiments may use a different power base other than a power of two. For ease of illustration, encoded pointer 210 of FIG. 2 will be assumed to have a power of two (Po2) size metadata encoding.

Another metadata field, such as tag field 204, can include a tag that is unique to the particular pointer within the process for which the pointer was created. In some embodiments, other metadata may also be encoded in encoded pointer 210 including, but not necessarily limited to, one or more of a domain identifier or other information that uniquely identifies the domain (e.g., user application, library, function, etc.) associated with the pointer, version, or any other suitable metadata.

The size metadata field 202 may indicate the number of bits that compose the immutable portion 206 and the mutable plaintext portion 208. In certain embodiments, the sizes of the respective address portions (e.g., immutable portion 206 and mutable portion 208) are dictated by the size metadata field 202. By way of example, for a 48-bit address and size metadata that indicates a size based on a power of two, if the size metadata value is 0 (bits: 000000), no mutable plaintext bits are defined and all of the address bits in the address field 209 form an immutable portion. As further examples, if the size metadata value is 1 (bits: 000001), then a 1-bit mutable plaintext portion and a 47-bit immutable portion are defined, if the size metadata value is 2 (bits: 000010), then a 2-bit mutable portion and a 46-bit immutable portion are defined, and so on, up to a 48-bit mutable plaintext portion with no immutable bits. In some embodiments, a minimum granularity may be defined, e.g., 16 bytes, and size values below that minimum may be reserved. In other embodiments that encrypt pointers, size values below that minimum may be increased to the minimum metadata granularity for the purpose of looking up metadata, and the smaller size value may still be used for purposes of encrypting and decrypting the pointer.

In the example of FIG. 2, the size metadata value equals 6 (bits: 000110), resulting in a 6-bit mutable portion 208 and a 42-bit immutable portion 206. The mutable portion 208 may be manipulated by software, e.g., for pointer arithmetic or other operations. In some cases, the size metadata field 202 could be provided as a separate parameter in addition to the pointer; however, in some cases (e.g., as shown) the bits of the size metadata field 202 may be integrated with the encoded pointer 210 to provide legacy compatibility in certain cases.

In at least one embodiment, in encoded pointer 210, the address field 209 is in plaintext, and encryption is not used. In other embodiments, however, an address slice (e.g., upper 16 bits of address field 209) may be encrypted to form a ciphertext portion of the encoded pointer 210. In some scenarios, other metadata encoded in the pointer (but not the size metadata) may also be encrypted with the address slice. The ciphertext portion of the encoded pointer 210 may be encrypted with a small tweakable block cipher (e.g., a SIMON, SPECK, BipBip, or tweakable K-cipher at a 16-bit block size, 32-bit block size, or other variable bit size tweakable block cipher). Thus, the address slice to be encrypted may use any suitable bit-size block encryption cipher. If the number of ciphertext bits is adjusted (upward or downward), the remaining address bits to be encoded (e.g., immutable and mutable portions) may be adjusted accordingly. The tweak may include one or more portions of the encoded pointer. For example, the tweak may include the size metadata in the size metadata field 202, the tag metadata in the tag field 204, some or all of the immutable portion 206. If the immutable portion of the encoded pointer is used as part of the tweak, then the immutable portion 206 of the address cannot be modified by software (e.g., pointer arithmetic) without causing the ciphertext portion to decrypt incorrectly. Other embodiments may utilize an authentication code in the pointer for the same.

When a processor is running in a cryptographic mode and accessing memory using an encoded pointer such as encoded pointer 210, to get the actual linear/virtual address memory location, the processor takes the encoded address format and decrypts the ciphertext portion. Any suitable cryptography may be used and may optionally include as input a tweak derived from the encoded pointer. In one example, a tweak may include the variable number of immutable plaintext bits (e.g., 206 in FIG. 2) determined by the power/exponent represented in the size metadata bits (e.g., 202 of FIG. 2) and a secret key. In some instances, the size metadata and/or other metadata or context information may be included as part of the tweak for encrypting and decrypting the ciphertext portion (also referred to herein as "address tweak"). In one or more embodiments, all of the bits in the immutable portion 206 may be used as part of tweak. If the address decrypts incorrectly, the processor may cause a general protection fault (#GP) or page fault due to the attempted memory access with corrupted linear/virtual address.

A graphical representation of a memory space 220 illustrates possible memory slots to which memory allocations for various encodings in the Po2 size metadata field 202 of encoded pointer 210 can be assigned. Each address space portion of memory, covered by a given value of the immutable portion 206 contains a certain number of allocation slots (e.g., one Size 0 slot, two Size 1 slots, four Size 2 slots, etc.) depending on the width of the Po2 size metadata field 202.

Referring still to FIG. 2, the size metadata field 202, in combination with the information in the address fields (e.g., immutable portion 206 with masked mutable portion 208), can allow the processor to find the midpoint of a given slot defined in the memory space 220. The size metadata, which is expressed as a power of two in this example, is used to select slot that best fits the entire memory allocation. For a power of two scheme, where the size metadata includes exponent (power) information, as the exponent (power) becomes larger (for larger slots, such as Size 0), fewer upper address bits (e.g., immutable portion 206) are needed to identify a particular slot (since with larger slots, there will be fewer slots to identify). In such a case, more of the bits at the end of the pointer, in the bits of mutable portion 208 (e.g., where pointer arithmetic can be performed), can be used to range within a given slot. The latter leads to a shrinking of the address field and an expanding of the pointer arithmetic field.

FIG. 2 illustrates a pointer format for locating tag metadata for any allocation. Tag data in a pointer allows multiple versions of a pointer to be used pointing to the same slot, while still ensuring that the pointer version being used to access the slot is in fact the pointer with the right to access that slot. The use of tag data can be useful for mitigating user-after-free (UAF) attacks for example. Where a dangling pointer is involved, but where tag data is used, changing tags with each version of the pointer would result in a mismatch with an allocation sought to be accessed by a dangling pointer, leading to errors and thus protecting the new allocation from unauthorized access by the dangling pointer. As will be further described herein, one or more embodiments provide for a tag table that enables a single tag to be used for each allocation. For a given allocation, the power (e.g., in the size metadata field) and upper address bits of the memory address encoded in the pointer generated for the allocation can be used to locate the one tag stored in the tag table for the allocation.

As depicted in FIG. 2, upon execution of an instruction that includes a memory operation, according to one embodiment, processor circuitry (e.g., 110) and/or an integrated memory controller (IMC) (e.g., 120) and/or a separate memory controller compares at 250 the tag value included in the tag field 204 with the tag metadata 252 stored in metadata storage in memory. In one example, the metadata storage may include a tag table. The tag metadata 252 may be indexed in the tag table based on a midpoint of a slot 240 in memory to which the memory allocation is assigned. As will be further discussed herein, for each memory allocation, the tag table stores allocation metadata in metadata storage in memory. The allocation metadata for a particular memory allocation includes tag metadata (e.g., 252), which represents the memory allocation. For larger allocations, the allocation metadata may also include a descriptor and appropriate bounds information. If the tag data included in the tag field 204 matches (e.g., exact match, complementary, or otherwise corresponding to as determined by a particular implementation) the tag metadata 252 stored in the metadata storage in memory, and if any other metadata checks (e.g., memory access bounds checks) also succeed, then the processor circuitry and/or the IMC completes the requested memory operation in the memory circuitry/cache circuitry. If the tag data included in the tag field 204 fails to match the tag metadata 252 stored in the metadata storage in memory, then the IMC reports an error, fault, or exception 260 to the processor circuitry.

In one or more embodiments, a single tag is stored for a memory allocation, resulting in a single tag lookup to verify that the encoded pointer is accessing the correct allocation. Using the power represented in the size metadata field of the pointer together with a memory address based on the higher order address bits encoded in the pointer, a slot to which the memory allocation is assigned can be located. For example, the higher order address bits include immutable address bits that are not used in pointer arithmetic to point to different bytes of data within the allocation. These higher order address bits represent a memory address at a power of two boundary in memory that coincides with the power of two slot to which the allocation is assigned. The power represented in the size metadata field can be used to determine the size of the slot. For example, the value of the data in the size metadata field can be used as an exponent (n) of the integer 2 ($2^n$ because the slot size is based on the power-of-two) to determine the number of granules that the slot is sized to contain. The number of granules may be multiplied by the bytes per granule (e.g., 16 bytes/granule) to determine the byte size of the slot that begins at the memory address identified from the higher order bits. A midpoint of the slot can be used to search metadata storage to find the location of the allocation metadata (e.g., tag, descriptor, bounds information) for the given allocation. For memory allocation operations, such as alloc, realloc, and free, only one memory access is needed to set/reset the tag data. Additionally, as few as one memory access is needed for pointer lookups on load/store operations.

Figure 3:
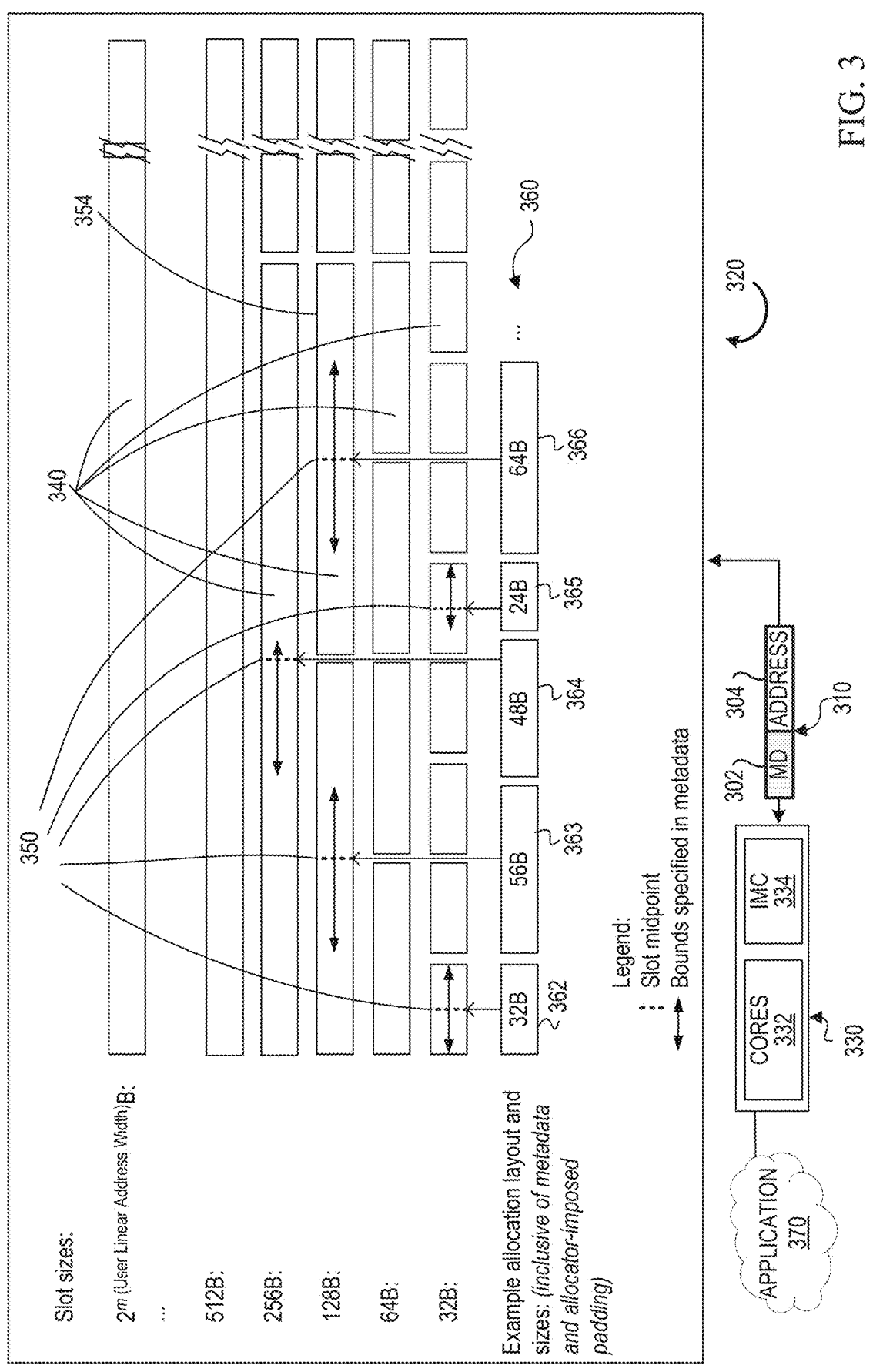
FIG. 3 is a schematic illustration of a memory allocation system using tag metadata according to at least one embodiment.

FIG. 3 is a schematic diagram of an illustrative memory/cache 320 to allow tag metadata checks on memory allocations accessed by encoded pointers (e.g., encoded pointer 210), some of which are described herein. The schematic diagram also shows processor circuitry 330 including cores 332 and memory controller circuitry 334 (e.g., memory controller (MC), integrated memory controller (IMC), memory management unit (MMU)), which are communicatively coupled to memory/cache 320. The processor circuitry 330, memory controller circuitry 334, and memory/cache 320 are examples, respectively, of processor circuitry 110, memory controller circuitry 120, and memory circuitry 130 of FIG. 1. Although embodiments are not so limited, in the shown embodiment of FIG. 3 the memory/cache 320 may be apportioned, conceptually, into one or more power of two (i.e., $2^0$ to $2^m$) slots 340 in which the respective midpoints (e.g., midpoint addresses 350) are associated with respective memory allocations 360 within slots 340, in accordance with at least one embodiment described herein. In some implementations, the midpoints may include respective regions at the midpoints (e.g. before, after, or both before and after the midpoints) that contain certain metadata (e.g., integrity value, etc.) associated with the corresponding allocation. Additionally, "allocation" and "memory allocation" are intended to refer to an addressable portion of memory in which an object, such as data or code, is stored. As used herein, "slot" is intended to refer to a unit of memory in a cacheline or across multiple cachelines.

In some embodiments, an instruction that causes the processor circuitry 330 to allocate memory causes an encoded pointer 310 (which may be similar to encoded pointer 180, 210) to be generated. The encoded pointer may include at least data representative of the linear address associated with the targeted memory allocation 360 and metadata 302 (such as power/exponent in size field 202 and tag value in tag field 204) associated with the respective memory allocation 360 corresponding to memory address 304. Also, an instruction that causes the processor circuitry 330 to perform a memory operation (e.g., LOAD, MOV, STORE) that targets a particular memory allocation (e.g., 366) causes the memory controller circuitry 334 to access that memory allocation, which is assigned to a particular slot (e.g., 354) in memory/cache 320 using the encoded pointer 310.

In the embodiments of the memory/cache 320 of FIG. 3, each memory allocation 360 is fully assigned to a given slot (i.e., one memory allocation per slot and one slot per memory allocation), in this way ensuring that the midpoint address 350 can be easily associated with the memory allocation to which it pertains. Embodiments, however, are not so limited, and include within their scope the provision of metadata (e.g., tag table information) within a slot that includes none, some, or all of the memory allocation to which the metadata pertains. The memory allocations 360 are shown in FIG. 3 once at the bottom of the figure and represented correspondingly by double pointed arrows within the respective slots 340 to which the memory allocations are assigned. Even though the memory allocations 360 may be assigned to slots larger than the allocations themselves, the allocations may, according to one embodiment, not need padding in order to be placed within larger slots.

According to some embodiments, a memory allocation may be assigned to a slot that most tightly fits the allocation, given the set of available slots and allocations. In the shown embodiment of FIG. 3, for example, the 32 B allocation 362 is assigned to a 32 B slot, the 56 B allocation 363 to a 128 B slot, the 48 B allocation 364 to a 256 B slot, the 24 B allocation 365 to a 32 B slot and the 64 B allocation 366 to a 128 B slot. In the shown example of FIG. 3, because the 48 B allocation would have crossed an alignment boundary within two slots, it is assigned to the larger 128 B slot. Although the example of FIG. 3 shows the memory allocations as spanning through the slots in a contiguous fashion (tightly packed), clearly, embodiments are not so limited, and include within their scope a scheme of memory allocations to respective, dedicated memory slots as long as a midpoint address of the slot is crossed by the allocation, where some slots may be free, especially for example in UAF scenario where a dangling pointer is involved. According to some embodiments, memory allocation sizes may be no smaller than half the width of a smallest slot in order for them to cross (i.e., to at least partially cover) the midpoint when assigned to a slot.

Based on the above allocation scheme, where each memory allocation is uniquely assigned to a dedicated slot, and crosses the slot midpoint of that dedicated slot, the processor is able to find the midpoint address 350 of a particular slot easily and quickly and the midpoint is ensured to be contained within the memory allocation that is assigned to that particular slot. The power-of-two (Po2) approach, used according to one embodiment, allows a unique mapping of each memory allocation to a Po2 slot, where the slot is used to provide the possibility to uniquely encode and encrypt each object stored in the memory allocations.

At least some encoded pointers indicate the size of the slot, such as the Po2 size of the slot based on an exponent (power) represented in the size metadata field of the pointer, that the allocation to be addressed fits into. The value encoded in the size metadata field can be used to determine the size of the slot. For example, the value of the data in the size metadata field can be used as the exponent of 2 (because the slot size is based on the power-of-two) to determine the power size of the slot (e.g., number of granules that the slot is sized to contain). The number of granules may be multiplied by the bytes per granule (e.g., 16 bytes/granule) to determine the byte size of the slot (or power size). A memory address represented by higher order address bits (e.g., immutable address portion 206) determines the specific address bits to be referred to by the processor. The calculated slot size together with the memory address represented by the higher order address bits determine the slot being referred to. Having identified the specific slot, the processor can go directly to the midpoint of the slot, which can be used as an index into a tag table (e.g., 150) to locate a tag (and possibly other metadata) that is associated with the allocation assigned to the specific slot. Embodiments are, however, not limited to Po2 schemes for the slots, and may include a scheme where the availability of slots of successively increasing sizes may be based on a power of an integer other than two, or based on any other scheme.

Although the memory controller circuitry 334 is depicted in FIG. 3 as a separate box from the cores 332, the cores 332 may include all or a portion of the memory controller circuitry 334. Also, although the memory controller circuitry 334 is depicted in FIG. 3 as part of processor circuitry 330, in some embodiments, the processor circuitry 330 may be include all, a portion, or none of the memory controller circuitry 334.

In response to execution of a memory access instruction, the processor circuitry 330 uses an encoded pointer 310 that includes at least data representative of the memory address 304 involved in the operation and data representative of the metadata 302, which includes a tag associated with the memory allocation 360 corresponding to the memory address 304. The encoded pointer 310 may include additional information, such as data representative pointer arithmetic bits (e.g., mutable plaintext portion 208) to identify the particular address being accessed within the memory allocation. In one or more embodiments, the midpoint of the slot to which the targeted memory allocation is assigned is used to locate metadata (e.g., a tag, a descriptor, right bounds, left bounds, extended right bounds, extended left bounds) in a tag table.

The memory/cache 320 may include any number and/or combination of electrical components, semiconductor devices, optical storage devices, quantum storage devices, molecular storage devices, atomic storage devices, and/or logic elements capable of storing information and/or data. All or a portion of the memory/cache 320 may include transitory memory circuitry, such as RAM, DRAM, SRAM, or similar. All or a portion of the memory/cache 320 may include non-transitory memory circuitry, such as: optical storage media; magnetic storage media; NAND memory; and similar. The memory/cache 320 may include one or more storage devices having any storage capacity. For example, the memory/cache 320 may include one or more storage devices having a storage capacity of about: 512 kiloBytes or greater; 1 megaByte (MB) or greater; 100 MB or greater; 1 gigaByte (GB) or greater; 100 GB or greater; 1 teraByte (TB) or greater; or about 100 TB or greater.

In the shown embodiment of FIG. 3, the memory controller circuitry 334 apportions the memory/cache 320 into any power of two number of slots 340. In some embodiments, the memory controller circuitry 334 may apportion the memory/cache 320 into a single memory slot 340 (i.e., a power of two=$2^m$, for a value of m that results in the entire system memory being covered). In other embodiments, the memory controller circuitry 334 may apportion the memory/cache 320 into two memory slots 340 (i.e., a power of two=$2^{m-1}$). In other embodiments, the memory controller circuitry 334 may apportion the memory/cache 320 into four memory slots 340 (i.e., a power of two=$2^{m-2}$). In other embodiments, the memory controller circuitry 334 may apportion the memory/cache 320 into "n" memory slots 340 (i.e., a power of two=$2^k$ for a value k that results in dividing the memory space into "n" slots). Importantly, note that the midpoint address 350 in each of the memory slots 340 does not align with the midpoint address in other memory slots, thereby permitting the indexing of allocation metadata (e.g., tag, descriptor, bounds) in a tag table that is unique to the respective memory slots 340.

The encoded pointer 310 is created for one of the memory allocations 360 (e.g., 32 B allocation, 56 B allocation, 48 B allocation, 24 B allocation, or 64 B allocation) and includes memory address 304 for an address within the memory range of that memory allocation. When memory is initially allocated, the memory address may point to the lower bounds of the memory allocation. The memory address may be adjusted during execution of the application 370 using pointer arithmetic to reference a desired memory address within the memory allocation to perform a memory operation (fetch, store, etc.). The memory address 304 may include any number of bits. For example, the memory address 304 may include: 8-bits or more; 16-bits or more, 32-bits or more; 48-bits or more; or 64-bits or more; 128-bits or more; 256-bits or more, 512-bits for more, up to 2 to the power of the linear address width for the current operating mode, e.g., the user linear address width-bits in terms of slot sizes being addressed. In embodiments, the metadata 302 carried by the encoded pointer 310 may include any number of bits. For example, the metadata 302 may include 4-bits or more, 8-bits or more, 16-bits or more, or 32-bits or more. In embodiments, all or a portion of the address and/or tag metadata carried by the encoded pointer 310 may be encrypted.

Figure 4:
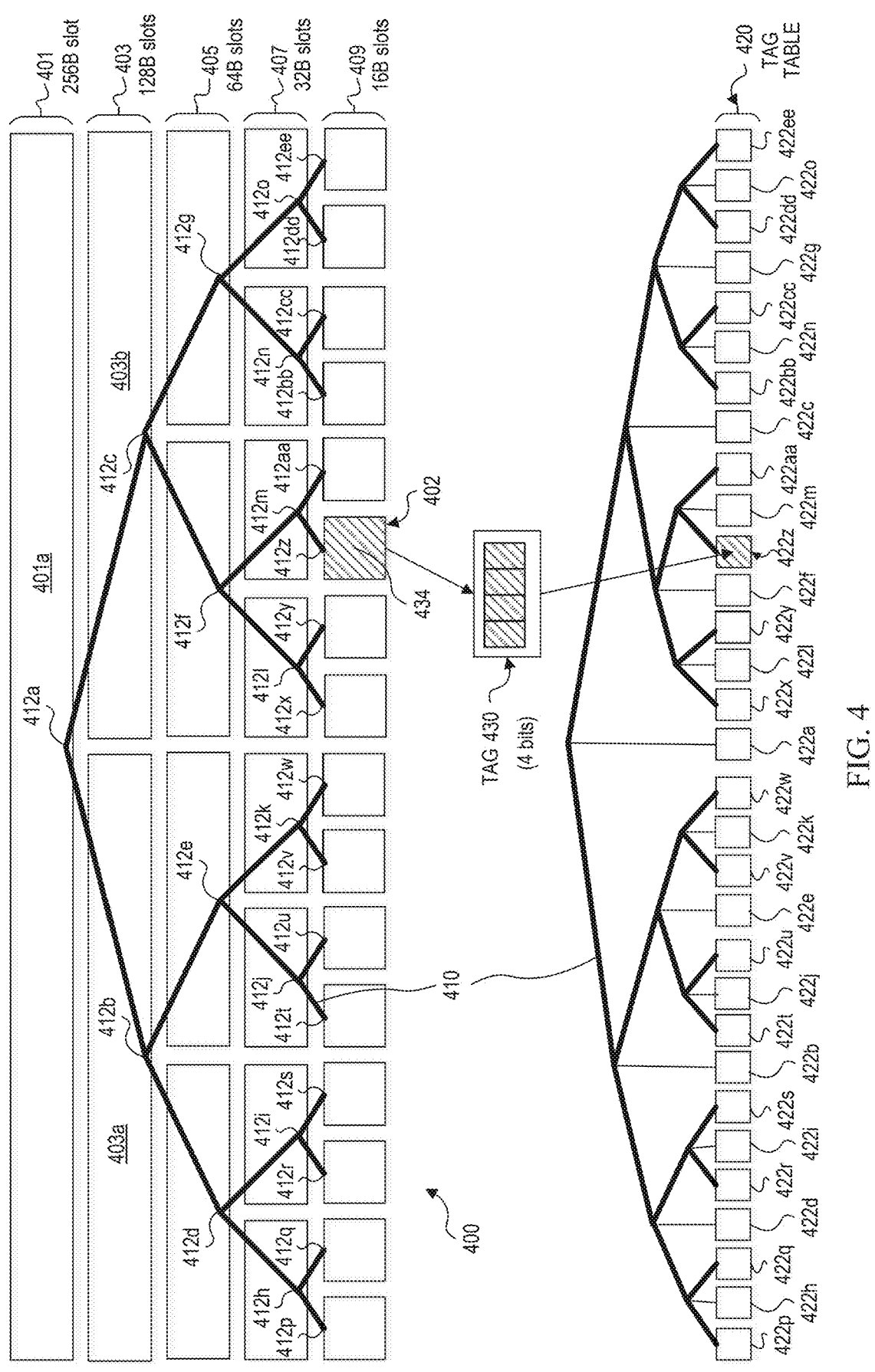
FIG. 4 is a graphical representation of a memory space illustrating a binary tree and the selection of the correct tag metadata location in a tag table.

FIG. 4 is a graphical representation of a memory space 400 and the selection of an index of a metadata location in a tag table for a particular memory allocation in the memory space 400. Memory space 400 illustrates memory (e.g., heap) that is conceptually divided into power of two sized slots with a binary tree 410 illustrated thereon. As shown and described herein (e.g., with reference to FIG. 3), non-overlapping memory allocations can be assigned to respective slots. The slot size of the particular slot to which a given memory allocation is assigned can be specified in a Po2 size metadata portion (e.g., 202) of an encoded pointer (e.g., 210) generated for the given memory allocation. The particular slot can be identified based on the Po2 size metadata and the linear address in the encoded pointer of the memory allocation.

FIG. 4 is a graphical representation of a memory space 400 and the selection of an index of a metadata location in a tag table for a particular memory allocation in the memory space 400. Memory space 400 illustrates memory (e.g., heap) that is conceptually divided into overlapping power of two sized slots. For each power of two size, the memory space 400 can be divided into a different number of slots. For example, the memory space can be divided into one 256-byte (256 B) slot 401 (individually referenced as 401*a*), two 128-byte (128 B) slots 403 (individually referenced as 403*a* and 403*b*), four 64-byte (64 B) slots 405, eight 32-byte (32 B) slots 407, and sixteen 16-byte (16 B) slots 409.

The midpoints of the slots in memory space 400 form a binary tree 410 illustrated thereon. As shown and described herein (e.g., with reference to FIG. 3), non-overlapping memory allocations can be assigned to respective slots. For example, an allocation 434 in memory space 400 is assigned to a single 16-byte slot 402. The slot size of the particular slot to which a given memory allocation is assigned can be determined based on a Po2 size metadata encoded in size metadata portion (e.g., 202) of an encoded pointer (e.g., 210) generated for the given memory allocation. The location of the slot can be determined based on the Po2 size metadata and the address bits corresponding to the immutable portion (e.g., 206) of an address portion (e.g., 209) of the encoded pointer generated for the memory allocation.

In one embodiment shown in FIG. 4, a tag table 420 can be created to hold a tag for each allocation assigned to a slot in contiguous memory. Tag table 420 is one example of tag table 150 shown in memory circuitry 130 of FIG. 1. Depending on the particular architecture, the tag table 420 may be created for different types of contiguous memory. In one architecture, the tag table 420 may be generated to hold a single tag for each allocation assigned to a slot in a contiguous linear address space (e.g., of a program), which is a contiguous range of linear addresses. In this example, the tag table 420 is also linearly contiguous and may be stored in the contiguous linear address space for the program. In another architecture, the tag table 420 may be generated to hold a single tag for each allocation assigned to a slot in contiguous physical memory, which is a contiguous range of physical addresses (e.g., of a program). In this example, the tag table

420 may also be physically contiguous and may be stored in the contiguous physical memory for the program. In yet another architecture, the tag table 420 may be generated to hold a single tag for each page of memory, as the page is physically contiguous. In this example, the tag table 420 may be correspondingly contiguous (e.g., in another page of memory). Generally, the techniques described herein could be applied to any region of memory that is embodied as a contiguous set of memory, in which one tag is set for the entire region.

The binary tree 410 shown on memory space 400 is formed by branches that extend between a midpoint of each (non-leaf) slot and the midpoints of two corresponding child slots. For example, left and right branches from midpoint 412*a* of a 256-byte slot 401*a* extend to respective midpoints 412*b* and 412*c* of 128-byte slots 403*a* and 403*b* that overlap the 256-byte slot 401*a*. The binary tree 410 can be applied to tag table 420, such that each midpoint of binary tree 410 corresponds to an entry in tag table 420. For example, midpoints 412*a*-412*ee* correspond to tag table entries 422*a*-422*ee*, respectively.

For the minimum power, corresponding to an allocation 434 fitting within a 16-byte slot, metadata entry 422*z* in tag table 420 contains 4 bits constituting a tag 430. If the pointer power (e.g., in a size metadata field) is, for example zero (0), this can indicate the metadata entry 422*z* contains just the tag 430. In at least one embodiment, a tag without additional metadata is used for a minimum sized data allocation (e.g., fitting into a 16-byte slot) and is represented as a leaf e.g., 422*z* in the midpoint binary tree 410 applied to (e.g., superimposed on) tag table 420.

Because every allocation regardless of size can fit into one slot uniquely, for each load and store operation of data or code in an allocation, a single tag can be looked up and compared to the tag metadata encoded in the encoded pointer to the data or code. Instead of individual tags for each 16-byte granule (or other designated size of granule).

Figure 5:
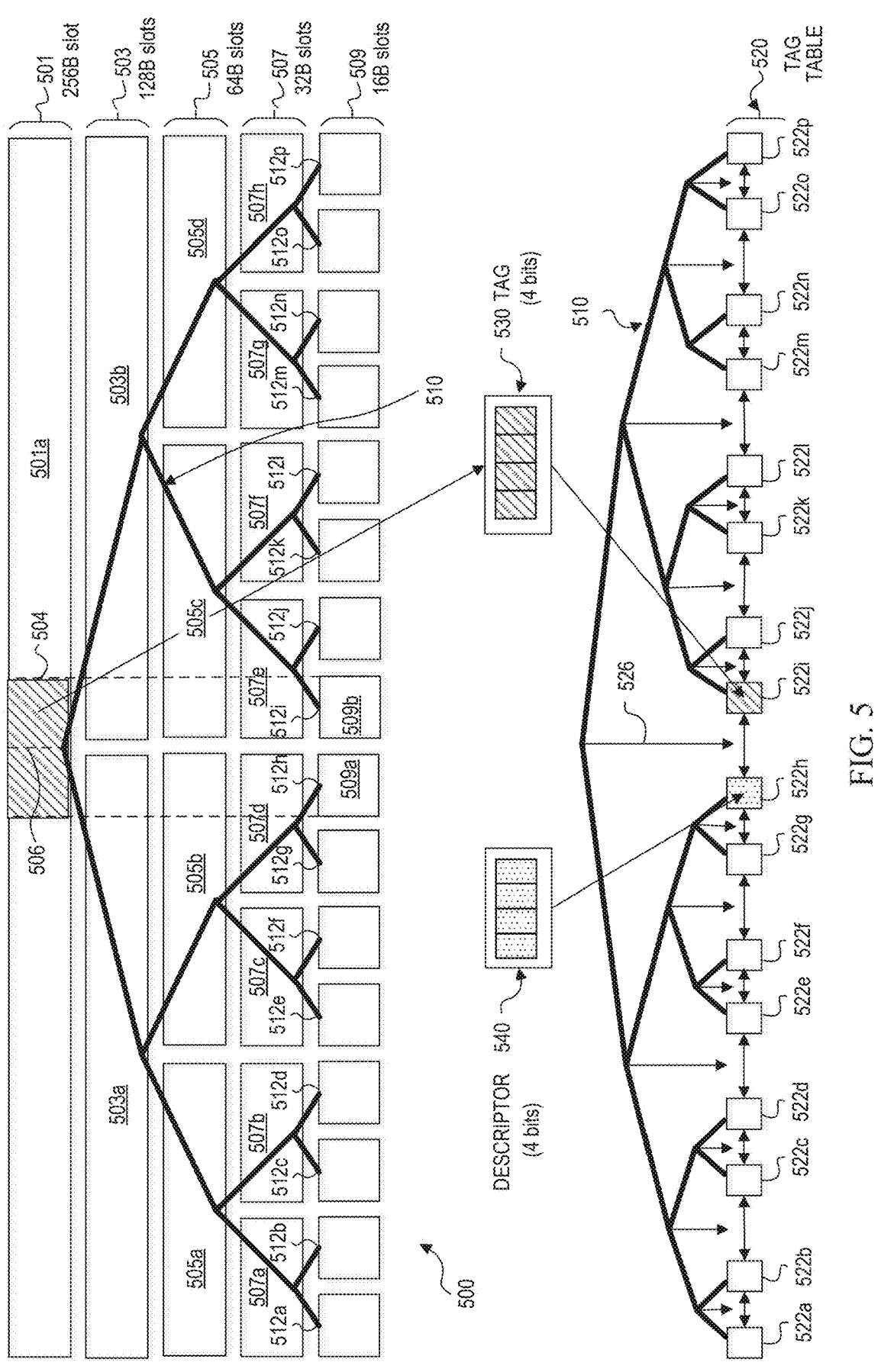
FIG. 5 is a graphical representation of a tag table and entries for an allocation assigned to a slot that includes at least two granules.

FIG. 5 is a graphical representation of a memory space 500 and the selection of an index of a metadata location in a tag table for a particular memory allocation having a power size of two granules (e.g., 32 B) in the memory space 500. Memory space 500 illustrates memory (e.g., heap) that is conceptually divided into overlapping power of two sized slots, as previously described with reference to memory circuitry 130 and memory/cache 320 of FIGS. 1 and 3 and memory space 400 of FIG. 4. For each power of two size, the memory space 500 can be divided into a different number of slots. For example, the memory space can be divided into one 256-byte (256 B) slot 501 (individually referenced as slot 501*a*), two 128-byte (128 B) slots 503 (individually referenced as slots 503*a*-503*b*), four 64-byte (64 B) slots 505 (individually referenced as 505*a*-505*d*), eight 32-byte (32 B) slots 507 (individually references as slots 507*a*-507*h*), and sixteen 16-byte (16 B) slots 509 (slots 509*a* and 509*b* are individually referenced).

The midpoints of the slots in memory space 500 form a binary tree 510 superimposed thereon, which is similar to the binary tree 410 over memory space 400 of FIG. 4. Midpoints 506 and 512*a*-512*p* are referenced in FIG. 5. As shown and described herein (e.g., with reference to FIG. 2), non-overlapping memory allocations can be assigned to respective slots. Each memory allocation crosses a midpoint of the slot to which the memory allocation is assigned. For example, a memory allocation 504 in memory space 500 is assigned to a single 256-byte slot 501*a*. Memory allocation 504 crosses a midpoint 506 of the 256-byte slot 501*a*. The slot size of the particular slot to which a given memory allocation is assigned can be determined based on a Po2 size metadata encoded in size metadata portion (e.g., 202) of an encoded pointer (e.g., 210) generated for the given memory allocation. The location of the slot can be determined based on the Po2 size metadata and the address bits corresponding to the immutable portion (e.g., 206) of an address portion (e.g., 209) of the encoded pointer generated for the memory allocation.

In an embodiment shown in FIG. 5, a tag table 520 can be created to hold a tag for each allocation assigned to a slot in contiguous memory. Tag table 520 is one example of tag table 150 shown in memory circuitry 130 of FIG. 1. As previously described with reference to tag table 420 of FIG. 4, the techniques described herein can be applied to any region of memory that is embodied as a contiguous set of memory (e.g., linear space, physical memory, memory pages, etc.), in which one tag is set for the entire region.

If an allocation is assigned to a slot with a power size larger than a single granule (e.g., 16 bytes), then at least two adjacent granules of the allocation cross the midpoint of the slot. In FIG. 5 for example, memory allocation 504 is assigned to a slot 501*a* having a power size of 16 granules (or 256 bytes), which is larger than the power size of a single 16-byte granule. Memory allocation 504 includes exactly two granules that cross the midpoint of the slot 501*a*. The size of memory allocation 504, which contains exactly two granules, is illustrated by dashed lines from the memory allocation to 16-byte slots 509*a* and 509*b*.

Because allocations cannot overlap, the two entries in the tag table 520 for each granule adjacent to the midpoint of the larger slot can be merged to represent all slots of two or more granules. Therefore, the tag table 520 only needs to represent the leaf entries and may omit the entries corresponding to midpoints of slots having a power size greater than one granule. For example, entries 522*a* and 522*b* can be used in combination to represent an allocation assigned to slot 507*a*, entries 522*b* and 522*c* can be used in combination to represent an allocation assigned to slot 505*a*, entries 522*c* and 522*d* can be used in combination to represent an allocation assigned to slot 507*b*, entries 522*d* and 522*e* can be used in combination to represent an allocation assigned to slot 503*a*, entries 522*e* and 522*f* can be used in combination to represent an allocation assigned to slot 507*c*, entries 522*f* and 522*g* can be used in combination to represent an allocation assigned to slot 505*b*, entries 522*g* and 522*h* can be used in combination to represent an allocation assigned to slot 507*d*, entries 522*h* and 522*i* can be used in combination to represent an allocation assigned to slot 501*a*, and so on for entries 522*i*-522*p* and the remaining slots 503*b*, 505*c*, 505*d*, and 507*e*-507*h*. This reduces the table size from N log N to just N, where N corresponds to the number of leaf slots 509.

If the power size is larger than just one granule, then the midpoint slot includes (at a minimum) both adjacent table entries (to the midpoint) of the lowest power by definition as the allocation will always cross the midpoint of the best fitting slot. For the example of memory allocation 504, both entries 522*h* and 522*i* adjacent to a superimposed midpoint 526 corresponding to the midpoint 506 of slot 501*a* are used where the a descriptor 540 is stored in the left entry 522*h* and a tag 530 is stored in the right entry 522*i*. The descriptor 540 can describe or indicate the rest of memory allocation 504, which crosses the midpoint 506 of slot 501*a*. In this example, memory allocation 504 is not larger than two granules so the descriptor can indicate that there are no bounds to the left or right because the allocation is not larger than two granules (e.g., 2×16-byte granules).

Figure 6:
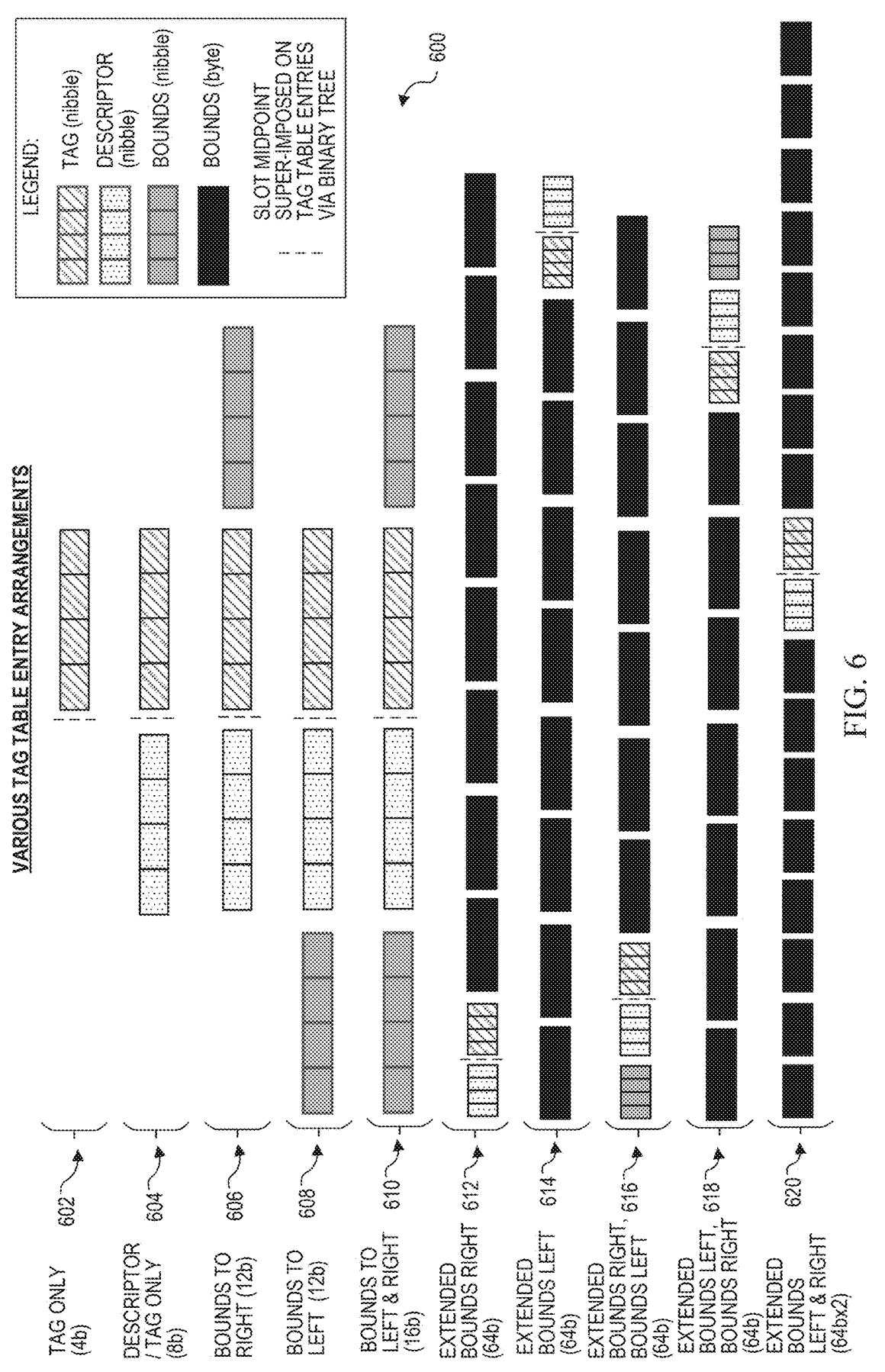
FIG. 6 is a table illustrating possible tag table entry arrangements according to at least one embodiment.

FIG. 6 is a table illustrating possible tag table entry arrangements depending on the size of an allocation. An entry arrangement in a tag table is includes allocation metadata generated for each allocation in a memory space and may be stored in a tag table of the memory space. Allocation metadata can include a tag, a descriptor, one or more right bounds, one or more left bounds, or a suitable combination thereof depending on the size of the allocation. A tag is included in every entry arrangement. In some embodiments, a descriptor is included in every entry arrangement corresponding to an allocation that is larger than the smallest granule (e.g., 16 bytes) and, therefore, assigned to a slot having a power size that is greater than the minimum power size of a single granule. For example, in FIG. 5, a descriptor is included in each allocation assigned to a slot in one of the 32-byte slots 507, the 64-byte slots 505, the 128-byte slots 503, or the 256-byte slot 501. Right bounds may be included in a tag table entry arrangement when an allocation extends more than one granule to the right of a midpoint in a slot to which the allocation is assigned. Conversely, left bounds may be included in a tag table entry arrangement when an allocation extends more than one granule to the left of a midpoint in a slot to which the allocation is assigned. Right bounds can include normal right bounds and extended right bounds. Left bounds can include normal left bounds and extended left bounds.

A descriptor defines how additional adjacent entries (if any) in a tag table entry arrangement are interpreted. Because memory may be allocated in various sizes in a program, several descriptor enumerations are possible. In one embodiment, a descriptor for a given allocation may provide one of the following definitions of adjacent table entries corresponding to a particular allocation: 1) for tag table entry arrangement 604, descriptor and tag only represent two granules; 2) for tag table entry arrangement 606, normal bounds to the right, 3) for tag table entry arrangement 608, normal bounds to the left, 4) for tag table entry arrangement 610, normal bounds to the left and the right, 5) for tag table entry arrangement 612, extended bounds to the right (multiple nibbles because it is a large bounds), 6) for tag table entry arrangement 614, extended bounds to the left, 7) for tag table entry arrangement 616, extended bounds to the right, normal bounds to the left, 8) for tag table entry arrangement 618, extended bounds to the left, normal bounds to the right, and 9) for tag table entry arrangement 620, extended bounds to the left and the right.

With reference to the table 600 of FIG. 6, various tag table entry arrangements 602-620 are illustrated. Each of the tag table entry arrangements 602-620 illustrates one or more tag table entries and the contents thereof (e.g., a set of metadata) that collectively represent an allocation having a particular size. For example, in some embodiments, a descriptor may not be used for an allocation of the smallest size (e.g., single 16-byte granule or any other size based on the particular implementation and/or architecture), which is assigned to a slot having a slot size indicated by the minimum power (e.g., zero) in the size metadata field of an encoded pointer (e.g., 180, 210, 310) generated for the allocation. A corresponding tag table entry arrangement 602 may include a tag in a tag table entry adjacent to a midpoint of the slot indicated in a binary tree (e.g., 410, 510) of memory space (e.g., 400, 500) applied to the tag table (e.g., 420, 520). Allocation 434 and corresponding tag 430 in tag table 420 is an example of a tag only entry arrangement 602. In this scenario, the set of metadata stored in the tag table for the memory allocation includes only a tag.

An allocation having two granules (e.g., 32 bytes) is assigned to the smallest slot available that can hold the allocation (e.g., slots 501-507 of memory space 500 in FIG. 5). A corresponding tag table entry arrangement 604 includes only a tag and a descriptor in respective tag table entries located on either side of the slot's midpoint indicated in a binary tree applied to the tag table. In this scenario, the set of metadata stored in the tag table for the memory allocation includes a tag and a descriptor.

It should be noted that bounds are needed in a tag table entry arrangement when the allocation size extends at least one more granule in the left and/or right direction (e.g., 3 granules, 48 bytes for a system with the smallest allocatable granule being 16 bytes). The extension of the allocation size by at least one more granule frees the granule's associated entry in the tag table for use to indicate the bounds. In one embodiment, a 4-bit normal bounds entry may be used. A normal bounds entry may be used to the left and/or to the right of the slot midpoint (e.g., left of the descriptor entry and/or right of the tag entry). Since a 4-bit bounds entry can represent a maximum of 16 granules, the normal left bounds entry can indicate up to 16 bytes to the left of the slot midpoint, and the normal right bounds entry can indicate up to 16 bytes to the right of the slot midpoint.

An allocation having three or more granules but not more than a maximum number of granules within normal bounds, is assigned to the smallest slot available that can hold the allocation (e.g., slots 501-505 of memory space 500 in FIG. 5), and a corresponding tag table entry arrangement can include a left bounds entry, a right bounds entry, or both. In a first scenario, an allocation assigned to a slot has one granule to the left of the slot's midpoint and has two or more granules but less than an extended number of granules to the right of the slot's midpoint. In this scenario, the corresponding tag table entry arrangement 606 can include a tag and a descriptor in respective tag table entries located on either side of the slot's midpoint indicated in a binary tree (e.g., 410, 510) applied to the tag table (e.g., 420, 520). In addition, the tag table entry arrangement 606 can include a right bounds entry adjacent to (e.g., to the right of) the tag. The right bounds entry can indicate how many granules in the allocation extend to the right of the slot's midpoint. In this scenario, the set of metadata stored in the tag table for the memory allocation includes a tag, a descriptor, and a single right bounds.

In a second scenario, an allocation assigned to a slot has one granule to the right of the slot's midpoint and has two or more granules but less than an extended number of granules to the left of the slot's midpoint. In this scenario, the corresponding tag table entry arrangement 608 can include a tag and a descriptor in respective tag table entries located on either side of the slot's midpoint indicated in a binary tree (e.g., 410, 510) applied to the tag table (e.g., 420, 520). In addition, the tag table entry arrangement 608 can include a left bounds entry adjacent to (e.g., to the left of) the descriptor. The left bounds entry can indicate how many granules in the allocation extend to the left of the slot's midpoint. In this scenario, the set of metadata stored in the tag table for the memory allocation includes a tag, a descriptor, and a single left bounds.

In a third scenario, an allocation assigned to a slot stretches in both directions from the slot midpoint. The allocation has two or more granules to the right of the slot's midpoint and has two or more granules to the left of the slot's midpoint, but less than an extended number of granules in either direction. In this scenario, the corresponding tag table entry arrangement 610 can include a tag and a descriptor in respective tag table entries located on either side of the slot's midpoint indicated in a binary tree (e.g., 410, 510) applied to the tag table (e.g., 420, 520). In addition, the tag table entry arrangement 610 can include a left bounds entry adjacent to (e.g., to the left of) the descriptor. The tag table entry arrangement 610 can also include a right bounds entry adjacent to (e.g., to the right of) the tag. The left bounds entry can indicate how many granules in the allocation extend to the left of the slot's midpoint, and the right bounds entry can indicate how many granules in the allocation extend to the right of the slot's midpoint. In this scenario, the set of metadata stored in the tag table for the memory allocation includes a tag, a descriptor, a single right bounds, and a single left bounds.

For larger allocations, the extension of an allocation beyond the granules in the normal bounds frees the granules' associated entries in the tag table for use to indicate the extended bounds. Accordingly, freed entries associated with granules in an extended allocation may be used for representing the extended bounds.

By way of example, but not of limitation, for a 4-bit normal bounds entry, a single first extension (also referred to herein as 'normal bounds') can only be up to 16 (4 bits)×the smallest granule size. For example, if the smallest granule that can be allocated is 16 bytes, as shown in FIGS. 4 and 5, a single first extension can only be up to 16*16 B, which equals 256 B. For an extension beyond the first extension (e.g., 256 B), extended bounds entries can be included in the tag table entry arrangement corresponding to the allocation. Multiple extended bounds entries in a tag table entry arrangement can be used to define the bounds of the allocation up to the maximum allocation size. A normal bounds entry on the right covers 16 granules to the right. Therefore, for extended bounds to the right, the descriptor can indicate that the bounds metadata to the right includes 64 bits across 16 entries to the right: 16 entries*4 bits/entry, which equals 64 bits. This covers allocations to the right for an entire 64-bit address space. Similarly, for extended bounds to the left, the descriptor can indicate that the bounds metadata to the left includes 64 bits across 16 entries to the left: 16 entries*4 bits/entry, which equals 64 bits. This covers allocations to the left for an entire 64-bit address space.

In a first scenario of an allocation with extended bounds, the allocation is assigned to a slot and has extended bounds to the right of the slot's midpoint and a single granule to the left of the slot's midpoint. In this scenario, the corresponding tag table entry arrangement 612 can include a tag and a descriptor in respective tag table entries located on either side of the slot's midpoint indicated in a binary tree (e.g., 410, 510) applied to the tag table (e.g., 420, 520). Since a 4-bit normal right bounds entry covers 16 granules to the right, the descriptor can indicate that the bounds metadata to the right extends for 64 bits across 16 entries to the right: 16 entries*4 bits/entry, which equals 64 bits. This covers allocations to the right for the entire 64-bit address space. Thus, the tag table entry arrangement 612 can also include sixteen right bounds entries to the right of the tag. The right bounds entries indicate how many granules in the allocation extend to the right of the slot's midpoint. In this scenario, the set of metadata stored in the tag table for the memory allocation includes a tag, a descriptor, and extended right bounds.

In a second scenario of an allocation with extended bounds, the allocation is assigned to a slot and has extended bounds to the left of the slot's midpoint and a single granule to the right of the slot's midpoint. In this scenario, the corresponding tag table entry arrangement 614 can include a tag and a descriptor in respective tag table entries located on either side of the slot's midpoint indicated in a binary tree (e.g., 410, 510) applied to the tag table (e.g., 420, 520). Since a 4-bit normal left bounds entry covers 16 granules to the left, the descriptor for extended bounds to the left can indicate that the allocation bounds are extended to the left (e.g., 16 entries*4 bits to cover the entire 64-bit address space). Thus, the tag table entry arrangement 614 can also include sixteen left bounds entries to the left of the descriptor. The left bounds entries indicate how many granules in the allocation extend to the left of the slot's midpoint. In this scenario, the set of metadata stored in the tag table for the memory allocation includes a tag, a descriptor, and extended left bounds.

In a third scenario of an allocation with extended bounds, the allocation is assigned to a slot and has extended bounds to the right and left of the slot's midpoint. In this scenario, the corresponding tag table entry arrangement 620 can include a tag and a descriptor in respective tag table entries located on either side of the slot's midpoint indicated in a binary tree (e.g., 410, 510) applied to the tag table (e.g., 420, 520). Since a 4-bit normal right or left bounds entry covers 16 granules to the right or left, respectively, the descriptor for extended bounds to the right and left can indicate that the allocation bounds are extended to the right and left (e.g., 16 entries*4 bits on both the left and right of the slot's midpoint to cover the entire 64-bit address space for the right extension and for the left extension). Thus, the tag table entry arrangement 620 can also include sixteen left bounds entries to the left of the descriptor and sixteen right bounds entries to the right of the tag. The left bounds entries indicate how many granules in the allocation extend to the left of the slot's midpoint. The right bounds entries indicate how many granules in the allocation extend to the right of the slot's midpoint. In this scenario, the set of metadata stored in the tag table for the memory allocation includes a tag, a descriptor, extended left bounds, and extended right bounds.

In further scenarios, an allocation assigned to a slot may include normal bounds on one side of the slot's midpoint and extended bounds on the other side of the slot's midpoint. In a first scenario of an allocation with mixed bounds, the allocation is assigned to a slot and has extended bounds to the right of the slot's midpoint and normal (not extended) bounds to the left of the slot's midpoint. In this scenario, the corresponding tag table entry arrangement 616 can include a tag and a descriptor in respective tag table entries located on either side of the slot's midpoint indicated in a binary tree (e.g., 410, 510) applied to the tag table. The descriptor in the tag table entry arrangement 616 can indicate that extended right bounds entries (e.g., 64 bits) and a single normal left bounds entry (e.g., 4 bits) correspond to the allocation. The left bounds entries indicate how many granules in the allocation extend (within normal bounds) to the left of the slot's midpoint. The right bounds entries indicate how many granules in the allocation extend to the right of the slot's midpoint (as extended bounds). In this scenario, the set of metadata stored in the tag table for the memory allocation includes a tag, a descriptor, a single left bounds, and an extended right bounds.

In a second scenario of an allocation with mixed bounds, the allocation is assigned to a slot and has extended bounds to the left of the slot's midpoint and normal (not extended) bounds to the right of the slot's midpoint. In this scenario, the corresponding tag table entry arrangement 618 can include a tag and a descriptor in respective tag table entries located on either side of the slot's midpoint indicated in a binary tree (e.g., 410, 510) applied to the tag table. The descriptor in the tag table entry arrangement 618 can indicate that extended left bounds entries (e.g., 64 bits) and a single normal right bounds entry (e.g., 4 bits) correspond to the allocation. The left bounds entries indicate how many granules In the allocation extend to the left of the slot's midpoint (as extended bounds). The right bounds entries indicate how many granules in the allocation extend (within normal bounds) to the right of the slot's midpoint. In this scenario, the set of metadata stored in the tag table for the memory allocation includes a tag, a descriptor, a single right bounds, and an extended left bounds.

Figure 7:
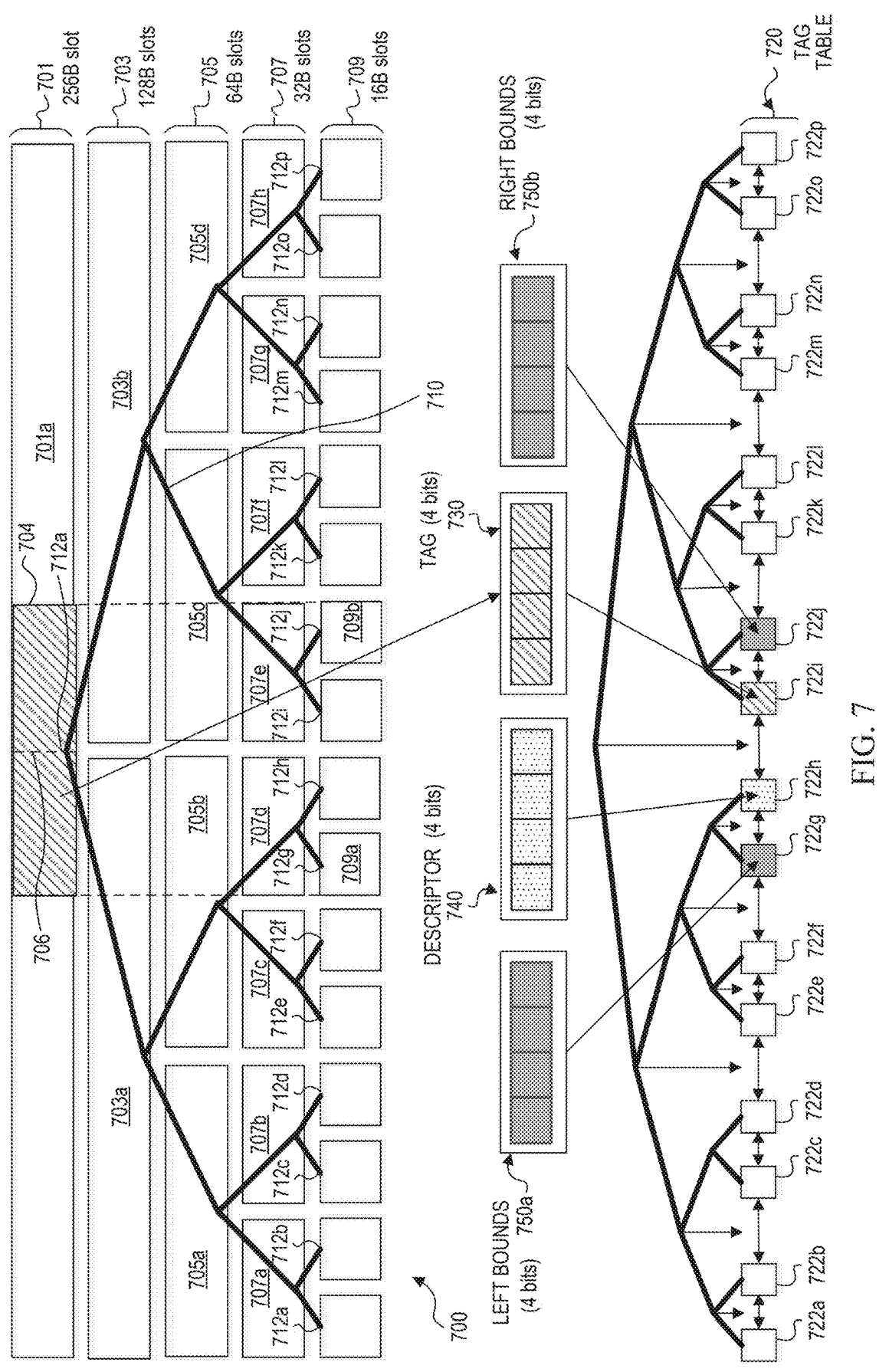
FIG. 7 is a graphical representation of a tag table and entries for an allocation assigned to a slot that includes four granules.

FIG. 7 is a graphical representation of a memory space 700 and the selection of an index of a metadata location in a tag table for a particular memory allocation having a power size that can include at least four granules (e.g., 64 B) but not more than a maximum number of granules (e.g., 16 granules or 256 B) within normal bounds in the memory space 700. Memory space 700 illustrates memory (e.g., heap) that is conceptually divided into overlapping power of two sized slots, as previously described with reference to memory space 400 of FIG. 4 and memory space 500 of FIG. 5. For each power of two size, the memory space 700 can be divided into a different number of slots. For example, the memory space can be divided into one 256-byte (256 B) slot 701 (individually referenced as slot 701a), two 128-byte (128 B) slots 703 (individually referenced as slots 703a-703b), four 64-byte (64 B) slots 705 (individually referenced as slots 705a-705d), eight 32-byte (32 B) slots 707 (individually referenced as slots 707a-707h), and sixteen 16-byte (16 B) slots 709 (slots 709a and 709b are individually referenced).

The midpoints of the slots in memory space 700 form a binary tree 710 superimposed thereon, which is similar to the binary tree 410 over memory space 400 of FIG. 4 and binary tree 510 over memory space 500 of FIG. 5. As shown and described herein (e.g., with reference to FIG. 2), non-overlapping memory allocations can be assigned to respective slots. Each memory allocation crosses a midpoint of the slot to which the memory allocation is assigned. For example, a memory allocation 704 in memory space 700 is assigned to a single 256-byte slot 701a. Memory allocation 704 crosses a midpoint 706 of the 256-byte slot 701a. The slot size of the particular slot to which a given memory allocation is assigned can be determined based on a Po2 size metadata encoded in size metadata portion (e.g., 202) of an encoded pointer (e.g., 210) generated for the given memory allocation. The location of the slot can be determined based on the Po2 size metadata and the address bits corresponding to the immutable portion (e.g., 206) of an address portion (e.g., 209) of the encoded pointer generated for the memory allocation.

In one embodiment shown in FIG. 7, a tag table 720 can be created to hold a tag for each allocation assigned to a slot in contiguous memory. Tag table 720 is one example of tag table 150 shown in memory circuitry 130 of FIG. 1. Tag table 720 may have the same or similar configuration as tag table 520 of FIG. 5, where the tag table 520 only needs to represent the leaf entries 722a-722p and may omit entries corresponding to midpoints of slots having a power size greater than one granule. Also, as previously described with reference to tag table 420 of FIG. 4, the techniques described herein can be applied to any region of memory that is embodied as a contiguous set of memory (e.g., linear space, physical memory, memory pages, etc.), in which one tag is set for the entire region.

In FIG. 7, memory allocation 704 is assigned to a slot 701a having a power size of 16 granules (or 256 bytes), which is larger than the power size of a single 16-byte granule. Memory allocation 704 includes exactly four granules that cross the midpoint of the slot 701*a*. The size of memory allocation 704 is illustrated by dashed lines from the allocation to 16-byte slots 709*a* and 709*b*. Because the power size for slot 701*a* is larger than just one granule, the slot 701*a* includes both adjacent table entries (to the midpoint) of the lowest power by definition as the allocation will always cross the midpoint of the best fitting slot. For memory allocation 704, both entries 722*h* and 722*i* adjacent to the midpoint of slot 701*a* are used as part of a tag table entry arrangement. A descriptor 740 is stored in the left entry 722*h* and a tag 730 is stored in the right entry 722*i*. The descriptor 740 can define how additional adjacent entries in tag table 720 are interpreted vis a vis the memory allocation 704. Right bounds information 750*b* is stored in a third entry 722*j* to indicate the right bounds of memory allocation 704 (e.g., how many (16 B) granules the memory allocation 704 extends to the right of the slot midpoint). Left bounds information 750*a* is stored in a fourth entry 722*g* to indicate the left bounds of memory allocation 704 (e.g., how many (16 B) granules the allocation 704 extends to the left of the slot midpoint). In this scenario, the number of granules that the memory allocation 704 extends to the left of the slot midpoint is two, and the number of granules that the memory allocation 704 extends to the right of the slot midpoint is two. In other embodiments, the bounds of a memory allocation may be counted in other units such as bytes, for example. Accordingly, the bounds information provides a value that corresponds to the particular unit being counted.

A discussion of memory accesses using embodiments described herein now follows. When a load/store operation for an encoded pointer is beyond the bounds, as measured by the midpoint of the slot determined by the pointer's power and address, an error condition is created. An error condition is also created when the power of two slot does not encompass the bounds. For example, a bound can specify a valid range beyond the slot size. This can occur when a pointer is incremented to the next slot and invalid data is loaded from the table. Zero may be defined as an invalid tag.

Bounds information and tag data for a particular allocation (e.g., bounds information in entries 722*g* and 722*j*, descriptor in entry 722*h*, and tag in entry 722*i* corresponding to memory allocation 704 in FIG. 7) may be cached at the processor core to avoid additional memory lookups for the same pointer or when pointer arithmetic is performed within the same data allocation. For example, software enumerating a 16-megabyte (MB) array may only require lookup of one tag from the memory tag table that can be cached along with its bounds information for the that same array pointer. This offers significant performance gains over potentially a million additional memory lookups by other memory tagging schemes that use memory tags for every granule (e.g., 16-kilobyte).

Figure 8:
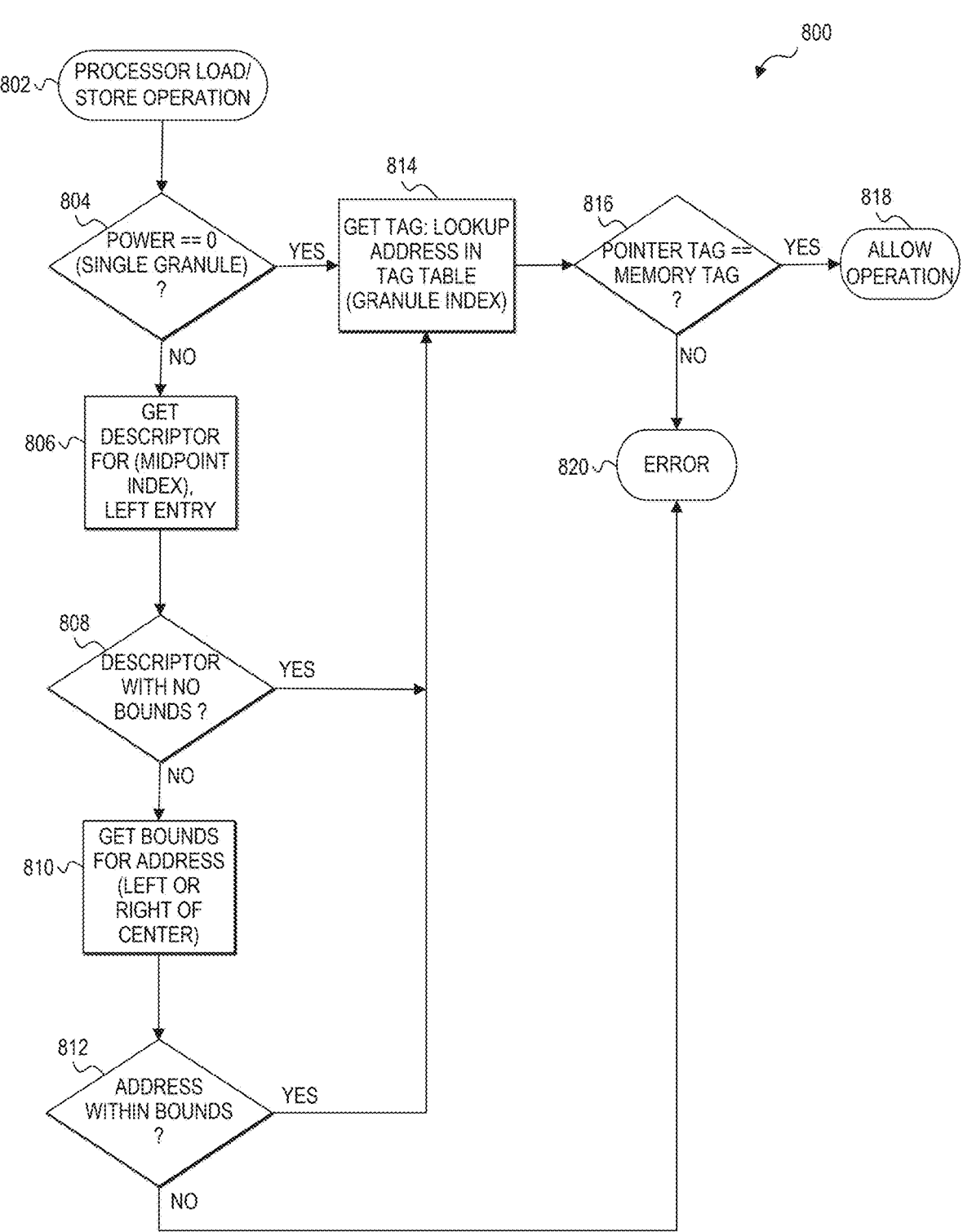
FIG. 8 is a flow diagram illustrating an example process for performing a tag check during a load or store operation according to at least one embodiment.

FIG. 8 is a flow diagram illustrating an example process 800 of a tag check during a load or store operation according to at least one embodiment. In at least one embodiment, process 800 is one possible embodiment of a tag check at 250 shown in FIG. 2. Process 800 may be performed upon execution of an instruction that includes a memory operation, such as a load instruction (e.g., 118) or a store instruction (e.g., 117), according to one embodiment. In one or more implementations, processor circuitry (e.g., 110) and/or an integrated memory controller (IMC) (e.g., 120) and/or a separate memory controller performs one or more operations illustrated in process 800.

At 802, a memory operation request in the form of a load or store operation, for example, may be received by a processor. The load or store operation may be based on an encoded pointer (e.g., 180, 210, 310) to a memory address in a memory allocation where data or code is to be read or stored.

At 804, a determination is made as to whether the power represented in the size metadata field (e.g., 202) in the encoded pointer corresponds to a single granule in memory. For example, if the size metadata field contains data having a value of zero (0), the data represents the zeroth ($0^{th}$) power, which corresponds to a single granule ($2^0=1$). A single granule is the smallest size of allocatable memory. In this example, a single granule is 16 bytes. Therefore, if a memory allocation is 16 bytes, then the data in a size metadata field of an encoded pointer to the memory allocation could have a value of zero (0) representing the zeroth power. Accordingly, if the data in a size metadata field equals zero, then this indicates that the load/store operation is targeting an allocation of a single granule.

At 814, a memory tag corresponding to the allocation referenced by the encoded pointer is obtained from an entry in a tag table based on a midpoint index of a slot to which the allocation is assigned. The tag table is a table created for a memory space of an application. The tag table contains memory tags stored in respective tag table entries for allocations in the memory space. The midpoint index of the slot corresponds to two adjacent entries in the tag table. In at least one embodiment, the right entry holds the memory tag. If the tag table entry arrangement contains a descriptor, then the left entry holds the descriptor. The memory tag for the allocation can be obtained from the right entry based on the midpoint index.

At 816, the memory tag can be compared to the tag obtained from the encoded pointer. If no conflict is detected (e.g., if the memory tag matches or otherwise corresponds to the pointer tag), then at 818, the load/store operation is allowed. However, if at 816 a conflict is detected (e.g., if the memory tag and the pointer tag do not match or otherwise do not correspond), then at 820 an error condition is created. An error condition may trigger an error, exception, and/or fault so that software, such as a software exception handler, can handle the error.

With reference again to 804, if the size metadata field contains data that does not equal zero (e.g., is greater than zero), then this indicates that the allocation, and the slot to which the allocation is assigned are larger than a single granule. Accordingly, a descriptor and possibly bounds information is also checked. At 806, a descriptor is obtained from a left entry based on the midpoint index of the slot to which the allocation is assigned.

At 808, a determination is made as to whether the descriptor indicates that bounds entries are present in the set of metadata in the tag table entry arrangement corresponding to the allocation. If the descriptor indicates that no bounds entries are present, this indicates that the allocation is only two granules in size. Thus, flow may pass to 814, where the memory tag is obtained. The tag check is then performed at 816. If the tag check passes, then the operation is allowed at 818. If the tag check fails, then an error condition is met at 820, and appropriate action is taken (e.g., error is raised, program is terminated, etc.).

With reference again to 808, if a determination is made that the descriptor indicates that one or more bounds entries are present, this indicates that the allocation extends to the left, to the right, or to both the left and right of the slot midpoint. The descriptor may define how to interpret the additional adjacent entries. For example, the descriptor may indicate whether the allocation extends to the left of the slot midpoint, to the right of the slot midpoint, or to both the left and right of the slot midpoint. The descriptor may also indicate that a single bounds entry corresponds to the allocation extending to the left of the midpoint and/or that a single bounds entry corresponds to the allocation extending to the right of the midpoint. The descriptor may further indicate that multiple bounds entries correspond to the allocation extending to the left of the midpoint and/or that multiple bounds entries correspond to the allocation extending to the right of the midpoint. At 810, the bounds are obtained from the tag table based on the information determined from the descriptor.

At 812, once the presence of bounds metadata of the allocation is determined based on the descriptor and the relevant bounds entry or entries are obtained from the tag table, a determination is made as to whether the address referenced in the encoded pointer is within the bounds indicated by the bounds metadata. If the address is not within the bounds indicated by the bounds metadata, then an error condition is met at 820, and appropriate action is taken (e.g., error is raised, program is terminated, etc.).

If the address is within the determined bounds, however, then flow may pass to 814, where the memory tag is obtained. The tag check is then performed at 816, to determine whether the tag encoded in the pointer matches the tag obtained from the tag table. If the tag check passes, then the operation is allowed at 818. If the tag check fails, then an error condition is met at 820.

In one or more embodiments, a pointer used in a load or store operation can include a tag and a locator (e.g., memory address). The pointer may be cryptographically encoded or non-cryptographically encoded. For example, a portion of an encoded pointer (e.g., 210) may be encrypted to produce a cryptographically encoded pointer. In one example, tag metadata (e.g., 204) and/or a some or all of the immutable portion (e.g., 206) may be encrypted. Encryption may be performed using a tweakable block cipher using a key and a tweak as input. The tweak may include portions of the encoded pointer (e.g., size metadata field 202, a portion of the immutable address bits that are not being encrypted). These cryptographically encoded pointers or non-cryptographically encoded pointers may be used in load and store operations according to one or more embodiments disclosed herein. In one example, the tag and at least a portion of the locator (e.g., memory address) may be encrypted using cryptographic computing to make the pointers and the tags unforgeable.

In an alternative embodiment, a terminator memory tag may be used to indicate the end of the bounds to the left and/or to the right. If a memory tag is used to indicate the end of bounds to the left, the tag table entries can be checked to the left of the midpoint index for bound entries and the tag entry. If a memory tag is used to indicate the end of bounds to the right, the tag table entries can be checked to the right of the midpoint index for bound entries and the memory tag entry. If bound entries contain all ones (e.g., 7) then this indicates that the bound of the allocation continues. The next set of nibbles is read to get extended bounds.

In one embodiment, the tag table can be protected using cryptography (e.g., encryption and decryption). In another embodiment, the tag table can be protected with memory range registers to ensure that only special Instruction Set Architecture (ISA) can set the tags in the tag table. For example, a new instruction (e.g., MOVTAG) may be used to store tag data and bounds information in the appropriate entries in a tag table. Cryptography or memory range registers may be used to protect the tag table to ensure that only special instruction set architecture (ISA) instructions can set tags (e.g., new instruction MOVTAG (tag, bounds)).

Bounds information can also be used to expand tag space. For example, small allocations can be managed so that they are not mapped to large tag slots and vice versa. In one embodiment, the algorithm to enable the use of one tag per allocation is based on contiguous linear addresses and an associated linear tag table. In other embodiments, the algorithm to enable the use of one tag per allocation is based on contiguous physical addresses and an associated physical tag table. In yet other embodiments, the algorithm may enable the use of tags based on any other contiguous memory (e.g., memory pages).

Physical Tagging

In a system using physical tagging (e.g., using physically mapped tag/metadata storage that is indexed using physical data addresses), it can be advantageous to implement concepts disclosed herein to reduce tag table update and lookup overheads by reducing or eliminating redundant tag storage. Unlike linear memory tagging, where contiguous linear memory allocations can be easily mapped to contiguous metadata region, physical memory uses physical pages that can be reassigned, which can result in a discontiguous set of physical pages containing allocations. When an allocation spans multiple pages, finding a midpoint in a discontiguous set of physical pages may not be feasible. Accordingly, alternative approaches may be used to reduce or eliminate duplicate tagging when physical tagging is used.

In one example, for physical tagging processors can define a minimum page granularity such that contiguous linear addresses map to contiguous physical addresses within that page. Thus, e.g., it is possible to locate a non-redundant metadata item within each page when an allocation spans multiple pages. The processor can know whether to load a non-redundant metadata item based on a per-page indicator (e.g., a page table entry (PTE) bit) of whether the page contains multiple allocations. The memory allocator can set this indicator appropriately for each page.

Figure 9:
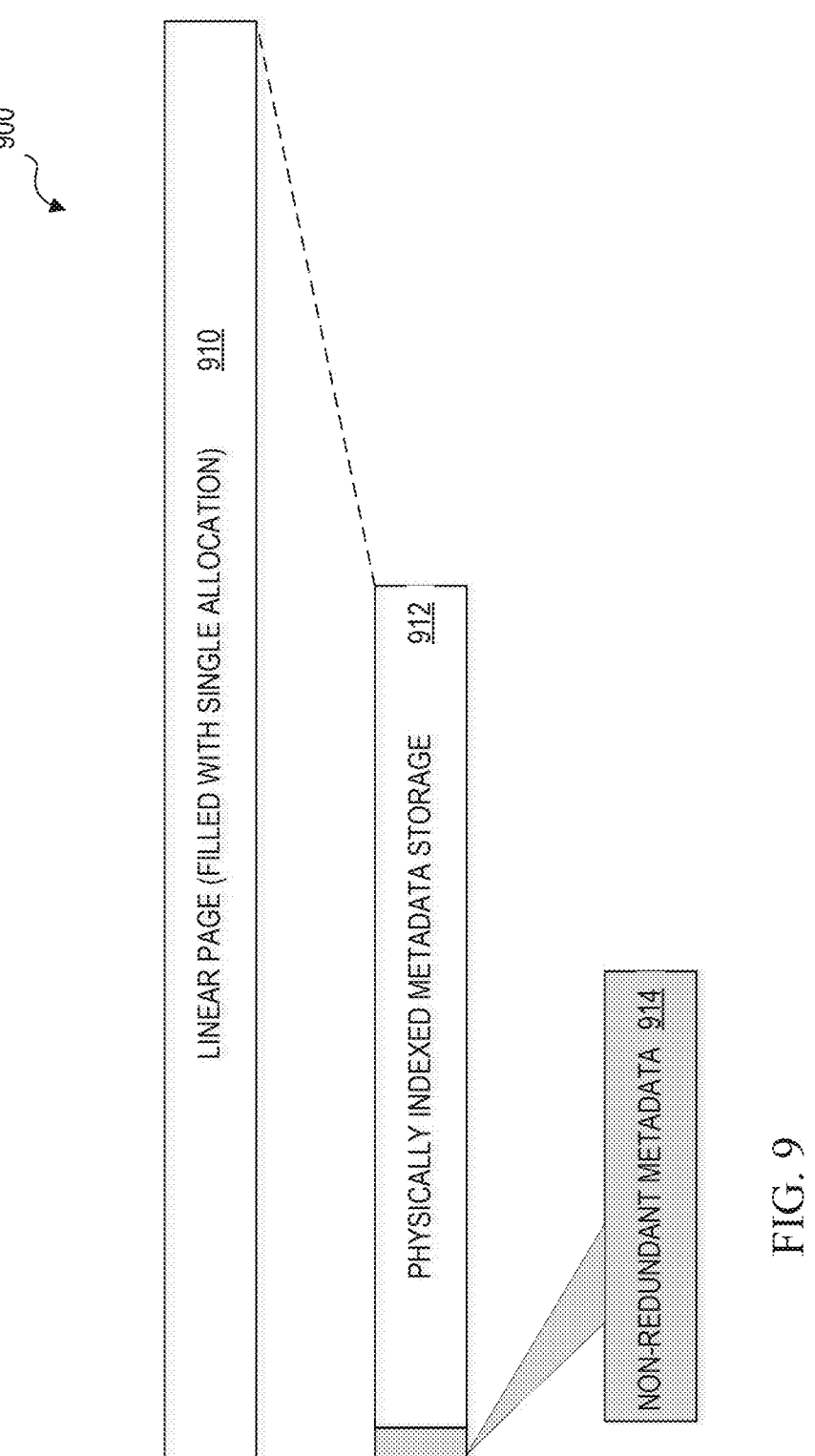
FIG. 9 is a block diagram illustrating an example of a physical memory tagging scheme according to at least one embodiment.

FIG. 9 is a block diagram illustrating an example of physical tagging to reduce the tag table update and lookup overheads according to at least one embodiment. FIG. 9 illustrates a portion 900 of memory in a computing device. Memory portion 900 includes a linear page 910 filled with a single allocation and physically indexed metadata storage 912 for the linear page 910. The linear page 910 is mapped to a physical page that is not shown, and that physical page is in turn mapped to metadata storage 912. In this example, the linear page 910 is entirely filled by a single allocation, and a single copy of non-redundant metadata 914 for the allocation may be stored at the beginning of the physically indexed metadata storage 912 for that linear page 910. Alternatively, the metadata may be stored at the end of the physically indexed metadata storage 912 or at any other offset within the physically indexed metadata storage 912.

Figure 10:
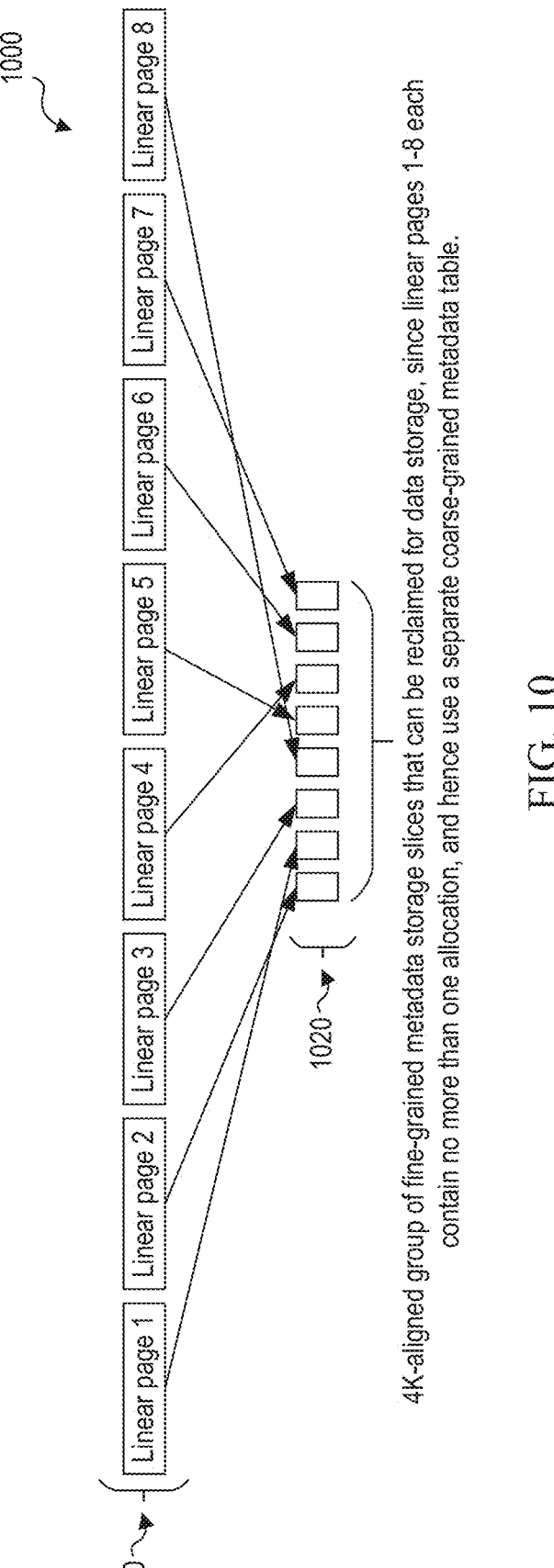
FIG. 10 is a block diagram illustrating another memory tagging scheme utilizing a linear page and a coarse-grained metadata table according to at least one embodiment.

FIG. 10 illustrates another physical memory tagging scheme utilizing a separate metadata table for coarse-grained, per-page metadata. Specifically, FIG. 10 illustrates memory 1000 that includes contiguous linear pages 1010 (e.g., linear pages 1-8) and a 4K-aligned group of fine-grained metadata storage slices 1020 that can be reclaimed for data storage. Each linear page in the linear pages 1010 is mapped to a physical page that is not shown, and that physical page is in turn mapped to a metadata storage slice within metadata storage slices 1020. In this example, a separate metadata table is maintained for coarse-grained, per-page metadata. If a run of physically contiguous pages that are each dedicated to a single allocation exists, then it is possible that enough contiguous slices of the metadata table are unused such that those slices can be reclaimed for data storage by the operating system (OS) or virtual machine manager (VMM). This may occur when the physically contiguous pages are each dedicated to a single allocation, which may or may not span the page boundaries, but each page holds no more than one allocation. By enabling the OS or VMM to reclaim slices of the metadata table for data storage, this embodiment can further minimize unused metadata table space. The illustration of FIG. 10 assumes that each metadata slice of the fine-grained metadata slices 1020 is 512 bytes for ease of illustration. However, it should be noted that each fine-grained metadata slice may be smaller than this example. This example assumes a page size of 4 KiB, but other page sizes are also possible.

Figure 11:
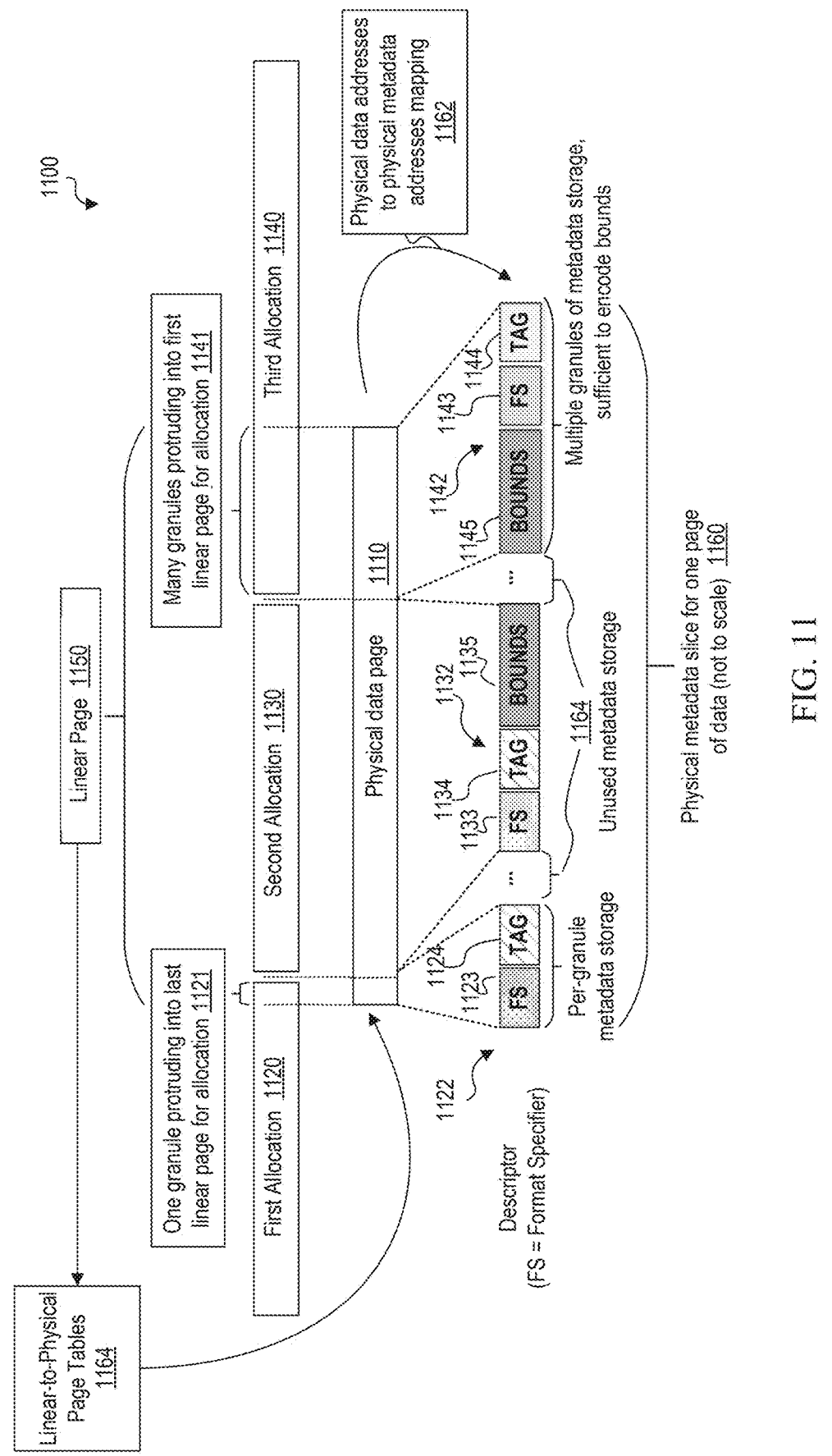
FIG. 11 is a block diagram illustrating various metadata arrangements and positions for multi-allocation pages according to at least one embodiment.

FIG. 11 is a block diagram illustrating various metadata formats and positions for a multi-allocation physical page according to at least one embodiment. In FIG. 11, memory 1100 contains a linear page 1150 mapped to a physical data page 1110, and three allocations having different intersection relationships to the linear page 1150 and to the physical data page 1110. The three allocations include a first memory allocation 1120 in a first slot, a second memory allocation 1130 in a second slot, and a third memory allocation 1140 in a third slot.

Linear addresses can be translated to physical addresses via one or more linear-to-physical translation page tables 1164. Page tables 1164 store the mapping between linear addresses and physical addresses. A process is given a linear address space that appears to be a contiguous section of memory. Although the linear address space appears to be contiguous to the process, the memory may actually be dispersed across different areas of physical memory. As illustrated in FIG. 11, for every page of linear memory (e.g., 1150), there is a contiguous page of underlying physical memory (e.g., 1110). Each adjacent pair of linear pages, however, may or may not be mapped to an adjacent pair of physical pages.

In the embodiment shown in FIG. 11, for a single physical page (e.g., 1110) mapped from a single linear page (e.g., 1150) containing multiple allocations or portions thereof (e.g., 1121, 1130, 1141), a respective set of metadata for each of the multiple allocations or portions thereof can be stored in physically indexed storage (e.g., also referred to as a "tag table" or "metadata table"). A data physical address to metadata physical address mapping 1162 may be created and updated when memory is allocated and may be used to locate sets of metadata in the tag table for the corresponding allocation (or portion thereof) being accessed. In one or more embodiments, the mapping 1162 may be based on a power encoded in the encoded pointer similar to the mapping of tag tables 420, 520, or 720 of FIG. 4, 5, or 7, respectively. A physical metadata slice (e.g., 1160) in the tag table can hold a respective set of metadata for each allocation (or portion thereof) contained in a single physical page. Unused metadata storage (e.g., 1164) may be present in the metadata slice (e.g., 1160) between adjacent sets of metadata and possibly between a set of metadata and an upper boundary and/or between a set of metadata and a lower boundary of the physical metadata slice in the tag table. It should be noted that, when the physical metadata is to be loaded, the processor has (or can access) information pertaining to the linear level slot. Therefore, the processor will know whether the physical page being accessed is mapped from a linear page that is below the midpoint, contains the midpoint, or is above the midpoint. The processor can then access the appropriate portion of the physical metadata slice for the portion of the allocation that is currently being accessed.

Each set of metadata (e.g., 1122, 1132, 1142) in a physically indexed tag table includes a tag and a descriptor. Accordingly, in at least one example, a minimum of one byte is reserved for each set of metadata (e.g., 4 bits for a tag plus 4 bits for a descriptor). Some sets of metadata can also include left and/or right bounds information for the allocation or portion thereof contained in the physical page. The descriptor of a set of metadata provides an indication of whether upper and/or lower bounds are present in the metadata set. It should be apparent that, for an allocation spanning multiple physical pages, respective sets of metadata may be stored in respective physical metadata slices in the tag table for each portion of the allocation intersecting a different physical page. In such a scenario, the tags in the respective sets of metadata for the same allocation can be duplicated (e.g., one tag per allocation duplicated for each unique intersection of an allocation (or portion thereof) and a physical page). However, the other metadata information (e.g., descriptor, bounds) in each set of metadata may vary depending on the size of the allocation (or portion thereof) that intersects the particular physical page. For example, the bounds stored in the metadata for the portion of an allocation on a physical page may specify the bounds of that particular portion of the allocation.

To locate non-redundant, fine-grained metadata for physical pages containing multiple allocations, a processor (e.g., 110, 330) can consider the four types of intersection relationships of allocations and physical pages illustrated in FIG. 11, based on observing the respective linear addresses specifying slot information. In a first case, the second (middle) memory allocation 1130 is contained in one linear page 1150. Therefore, the second memory allocation is also entirely contained within the physical page 1110 corresponding to the linear page 1150. Thus, the intersection relationship is defined by the entire second allocation 1130 intersecting the physical page 1110. In addition, a slot midpoint of a slot to which the second allocation 1130 is assigned is also contained in the linear page 1150 that maps to the physical page 1110. When an allocation is entirely contained within a physical page, a single set of metadata is stored in the tag table for the entire allocation. In this case, the second set of metadata 1132 covers the entire second allocation 1130. The second set of metadata 1132 includes a tag 1134 and a descriptor 1133. If the second allocation 1130 is three or more granules in size, then the second set of metadata 1132 also includes bounds 1135 (e.g., left and/or right bounds depending on the size of the allocation on either side of the of the slot midpoint's physical address). Thus, the entry arrangement may be same or similar to one of the entry arrangements shown in FIG. 6 that includes both a tag and a descriptor.

The precise physical address of the midpoint of the slot is known based on the linear-to-physical address mapping. During a memory access operation (e.g., load, store), the second set of metadata 1132 can be loaded from the corresponding location in the physically indexed metadata table as determined by translating the linear slot midpoint to a physical slot midpoint, and then mapping the data physical address of the physical slot midpoint to a physical tag table address. In the mapping 1162, the physical address of the physical slot midpoint in the physical page 1110 may be used as an index in the tag table to determine the location of the second set of metadata 1132, as shown in physical metadata slice 1160. The tag and descriptor may be loaded initially. If the descriptor indicates that bounds are included in the second set of metadata 1132 for the second memory allocation 1130, then the bounds (e.g., left and/or right) can be loaded as well. A tag check and a bounds check can be performed to determine whether to allow the memory access operation.

In a second case, the first (left most) memory allocation 1120 crosses a lower (left) boundary of physical page 1110. In this example, a one-granule upper portion 1121 of the first memory allocation 1120 intersects a one-granule lower portion of the physical page 1110 aligned on the lower boundary of the physical page 1110. A first set of metadata 1122 can be stored at the lower boundary of the physical metadata slice 1160 (in the tag table) for physical page 1110. During a memory access operation, the first set of metadata 1122 for the first allocation 1120 includes a tag 1124 and a descriptor 1123 and can be loaded from the corresponding location in the physically indexed tag table. The location of the first set of metadata 1122 may be determined by translating the linear address of the lower boundary of the linear page to a physical address of the lower boundary of the physical page, and then mapping the data physical address to a physical tag table address based on mapping 1162. In the mapping 1162, the physical address of the lower boundary of the physical page 1110 may be used as an index in the tag table to determine the location of the first set of metadata 1122, as shown in physical metadata slice 1160.

In this embodiment of physical memory tagging, each metadata entry arrangement in the tag table is to be large enough to accommodate encoding with a descriptor (also referred to as a "format specifier" (FS)) whether that metadata entry arrangement contains a metadata value (e.g., a tag) just for that granule, or whether that metadata entry arrangement is coalesced with adjacent entries to specify a bound indicating where in the physical page the allocation terminates. The overall allocation being large enough to accommodate bounds metadata does not necessarily imply that enough metadata space is reserved on every page containing a part of the allocation to fit bounds. For example, the allocation may protrude just slightly (e.g., a single granule) into the page at its endpoint (as in the example of the first allocation portion 1121 in FIG. 11) and hence require metadata space for both a format specifier and a tag to be reserved for that data location, but not additional metadata space for bounds. If the pointer points far enough into the page that a bound would be required rather than per-granule tags being stored, then the processor can directly infer that the metadata is formatted as a bound, and load the entire bound storage immediately. The processor also verifies that the format specifier agrees with that inference. Multiple bounds formats may be supported as described above (e.g., FIG. 6) for example, for linear metadata. The processor may still check the format specifier prior to loading any other metadata.

In a third case, a third memory allocation 1140 crosses an upper (right) boundary of page 1110. In this example, many granules of a lower portion 1141 of the third allocation 1140 intersect an upper portion of the physical page 1110. A set of metadata 1142 can be stored at the upper boundary of the physical metadata slice (in the tag table) for page 1110. The format of the metadata can be similar to that of the metadata that may be stored at the lower boundary and includes a tag 1144, a descriptor 1143, and bounds 1145. During a memory access operation, the third set of metadata 1142 for the third allocation 1140 can be loaded from the corresponding location in the physically indexed tag table as determined by translating the linear address of the upper boundary of the linear page to a physical address of the upper boundary of the physical page, and then mapping the data physical address to a physical tag table address based on mapping 1162. In the mapping 1162 the physical address of the upper boundary of the physical page 1110 may be used as an index in the tag table to determine the location of the third set of metadata 1142 shown in the physical metadata slice 1160.

In a fourth case not illustrated in FIG. 11, the memory allocation may cross the upper boundary of the linear page and the lower boundary of the linear page. Thus, the allocation could potentially intersect several or even many page tables. In this scenario, the allocation may cross both upper and lower boundaries of two or more linear pages. However, a slot midpoint of the slot to which the allocation is assigned is located in only one linear page. Therefore, for scenarios in which the a portion of a memory allocation crosses the upper and lower boundaries of a linear page, a metadata addressing granularity may be specified for each "full-page" portion of an allocation that crosses both the upper and lower boundaries of a linear page. The metadata addressing granularity refers to the range used for computing the index to the metadata address. In one example, for a full-page portion of an allocation, a 1-page size of the metadata addressing granularity could be specified for that full-page portion. The midpoint of the metadata addressing granularity can be calculated based on the upper and lower boundaries of the linear (or physical) page.

The precise physical midpoint can be determined based on the linear midpoint using the linear-to-physical page tables 1164. During a memory access operation (e.g., load, store), a set of metadata similar to other sets of metadata (e.g., 1164) can be loaded from the corresponding location in the physically indexed metadata table as determined by translating the linear midpoint (of the metadata addressing granularity) to a physical midpoint (of the metadata addressing granularity), and then mapping the data physical address of the physical midpoint to a physical tag table address. In the mapping 1162, the physical address of the physical midpoint (of the metadata addressing granularity) in the physical page may be used as an index in the tag table to determine the location of a set of metadata (not shown) associated with the full-page portion of the allocation. A tag and descriptor may be loaded initially. If the descriptor indicates that bounds are included in the located set of metadata for the full-page portion of the allocation, then the bounds (e.g., left and/or right) can be loaded as well. A tag check and a bounds check can be performed to determine whether to allow the memory access operation.

This memory tagging approach illustrated in FIG. 11 may be advantageous because fewer slot sizes are needed since metadata is duplicated per-page. This consumes fewer pointer bits for specifying the power (e.g., four bits to specify the power range) as well as some reserved values. This memory tagging approach can also be used for linear tagging to reduce pointer bit consumption. For example, with 5-level paging the number of bits available for tagging may drop to 7 (e.g., upper address ignore (UAI) feature). Even with such a limited field, 3 pointer bits can be used as the tag and 4 bits can be used for power. This allows slot sizes up to 1 MB, assuming a minimum slot size of 16 B for this example. Any allocations crossing the 1 MB slot boundary or consisting of multiple 1 MB slots can simply repeat the tag and bounds entry in the tag table for each adjacent 1 MB slot midpoint, using the same tag value for all slots comprising the same allocation. While setting multiple repeated tags is needed (e.g., one for each 1 MB of allocation), there are still 65,535 less tags that need to be set per MB of memory allocated. Multiple such entries per slot in the tag table can also be used by software to reconstitute encrypted data objects for cryptographic computing, identifying the version and slot information used as a tweak to encrypt individual data objects.

Another way to manage limited pointer bit availability is to check a slice of the pointer that is primarily used for some other purpose, such as specifying the slot size, against stored metadata as though that slice specifies a tag. For example, if the slot size is checked in this way, overflows that land in a different allocation with a different slot size can be detected, as well as dangling pointer accesses into memory that has been reallocated with a different slot size. The allocator can arrange allocations in such a way as to maximize the chances of detecting memory safety violations. For example, the allocator can seek to place allocations with different slot sizes next to each other to allow metadata checks to detect adjacent overflows. The allocator can also seek to avoid reusing memory for allocations with identical slot sizes to facilitate detection of use after free exploits. This approach can also work for encrypted pointer representations by checking slices of either the encrypted or decrypted pointer representation.

Figure 12A:
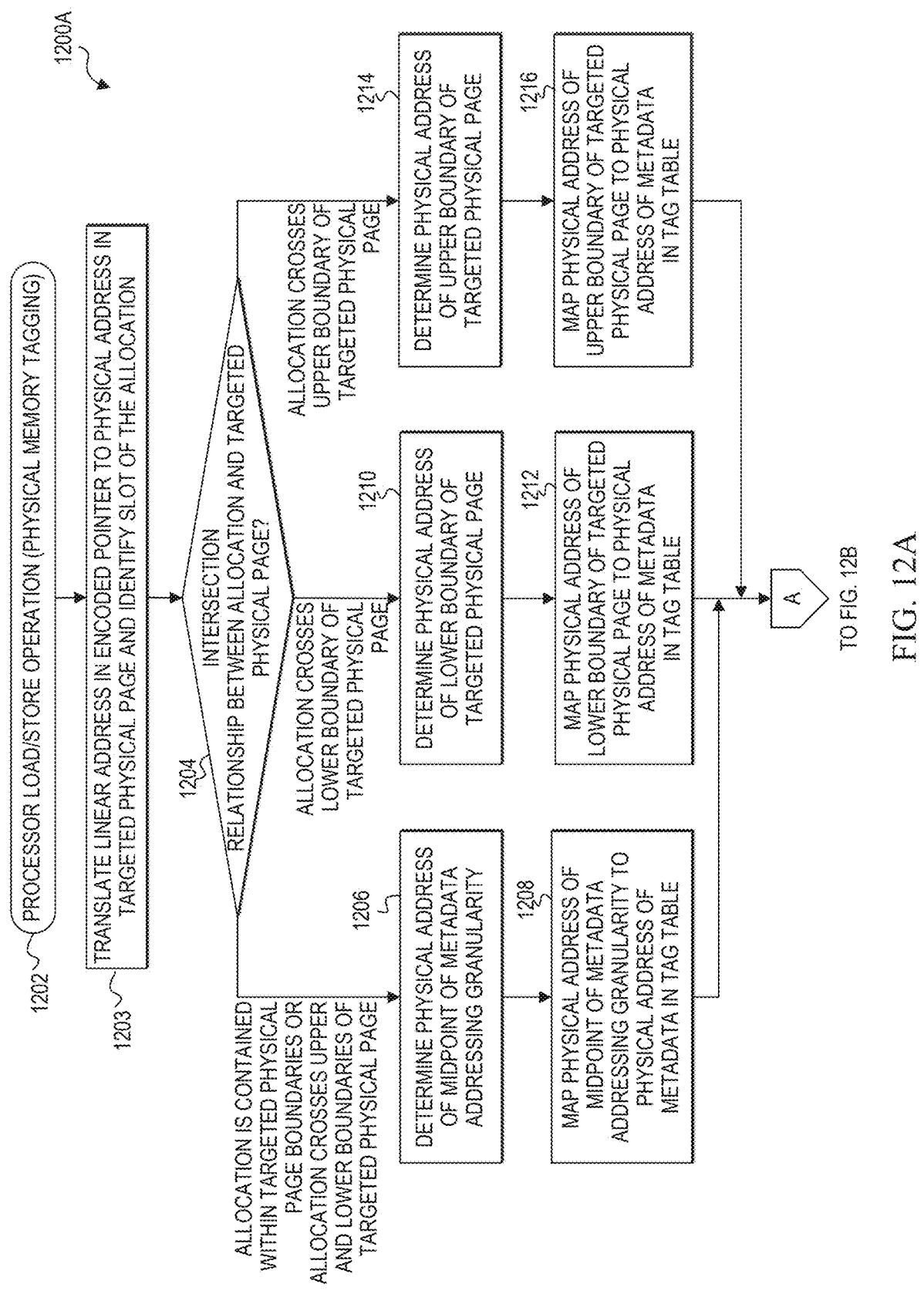
FIGS. 12A and 12B are flow diagrams illustrating an example process for performing a tag check during a load or store operation using a physical memory tagging scheme according to at least one embodiment.
Figure 12B:
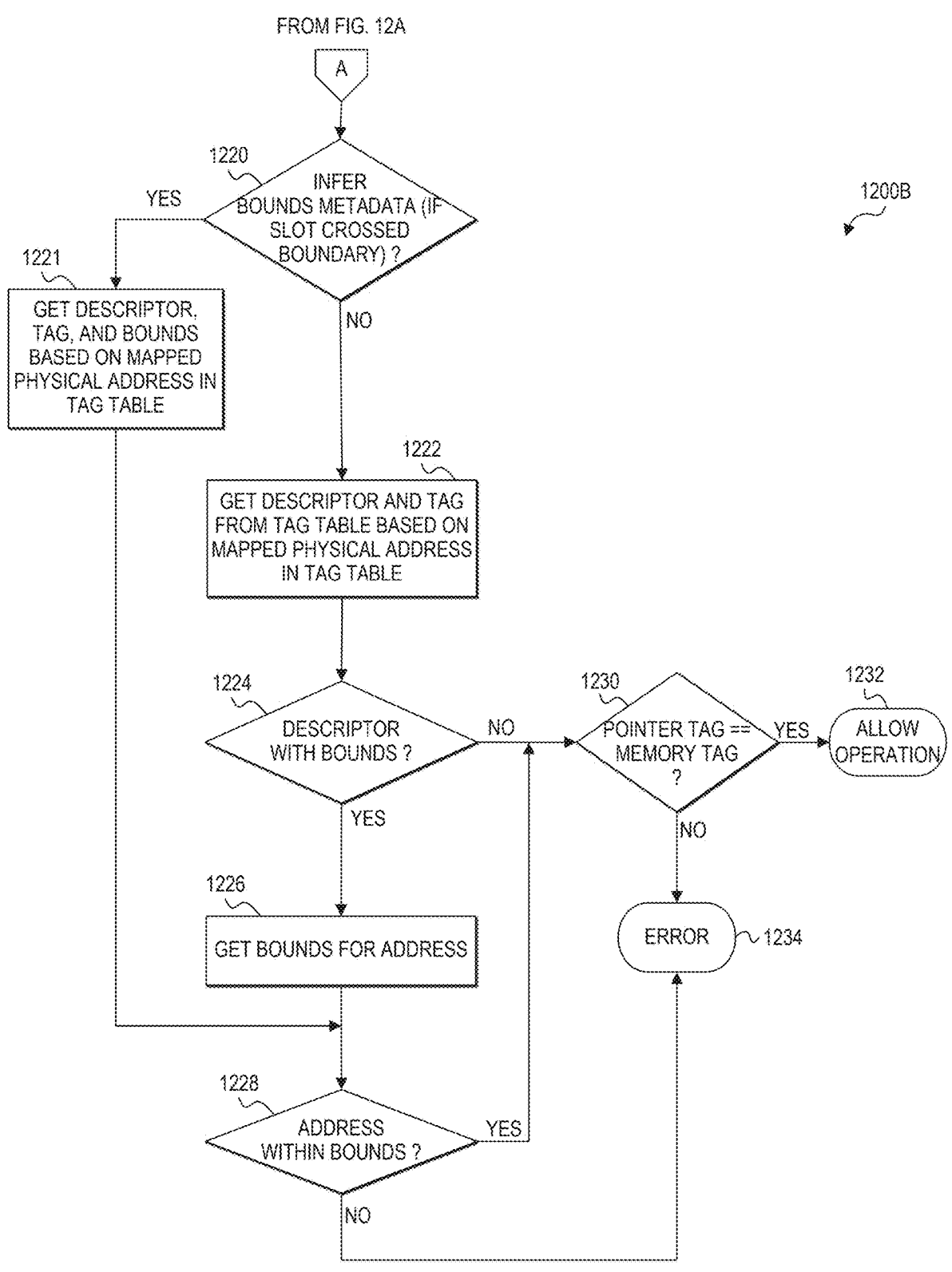

FIGS. 12A and 12B are flow diagrams 1200A and 1200B illustrating an example process for performing a metadata check during a load or store operation using a physical memory tagging scheme according to at least one embodiment. The metadata checking process shown in FIGS. 12A-12B is one possible embodiment of a metadata check at 250 shown in FIG. 2. The process shown in FIGS. 12A-12B may be performed upon execution of an instruction that includes a memory operation, such as a load instruction (e.g., 118) or a store instruction (e.g., 117), according to one embodiment. In one or more implementations, processor circuitry (e.g., 110, 330) and/or an integrated memory controller (IMC) (e.g., 120, 334) and/or a separate memory controller performs one or more operations illustrated in FIGS. 12A-12B.

At 1202, a memory operation request in the form of a load or store operation, for example, may be received by a processor. The load or store operation may be based on an encoded pointer (e.g., 180, 210, 310) to a memory address in a linear page of memory (also referred to as the "targeted linear page") where data or code is to be read or stored. The memory address may be part of a memory allocation that is assigned to a slot defined in linear memory that is apportioned into a plurality of slots having a plurality of sizes based on multiple power of two numbers. The slot may be sized to contain a number of granules equal to a power of two value based on a power/exponent indicated in a size field (e.g., 202) of the encoded pointer.

At 1203, the slot to which the memory allocation is assigned may be determined using the power (exponent) in the size field in the encoded pointer. The allocation is either entirely or partially contained in a linear page. If the allocation is partially contained within the linear page, then the allocation crosses either the lower boundary of the linear page, the upper boundary of the linear page, or both the lower and upper boundaries of the linear page.

Also at 1203, the linear address encoded in the encoded pointer is translated via page tables (e.g., 1164) to a physical address in a physical page (referred to as the "targeted physical page"). Initially, the encoded pointer may be decrypted if a portion or slice of the encoded pointer is encrypted (e.g., tag field, upper immutable address bits, other metadata, etc.). The decrypted portion of the linear address and the unencrypted portion of the linear address may be combined (e.g., concatenated), and metadata bits (e.g., tag field, size field) may be replaced to generate the linear address encoded in the encoded pointer of the memory operation.

At 1204, the intersection relationship between the allocation (translated to physical addresses) and the targeted physical page is determined. In particular, a determination is made as to whether the allocation is contained entirely within the targeted physical page and if not, whether the allocation crosses a lower boundary of the targeted physical page and/or whether the allocation crosses an upper boundary of the targeted physical page. In at least some implementations, the intersection relationship of the allocation (translated to physical memory) and the targeted physical page may be determined by evaluating the allocation and the targeted linear page containing the linear address generated from the encoded pointer. If each linear page is mapped to a single physical page, then determining the intersection relationship of the allocation and the targeted physical page can be achieved by determining whether the allocation in linear memory is contained within the targeted linear page that is mapped to the targeted physical page, and/or determining whether the allocation crosses the upper and/or lower boundaries of the targeted linear page.

If a determination is made that the allocation is contained within the targeted physical page boundaries or if a determination is made that the allocation crosses both boundaries of the page, then at 1206, a physical address of a midpoint of a metadata addressing granularity can be determined. A metadata addressing granularity is the range used for computing the metadata address in a tag table. In some scenarios where the allocation is contained entirely within the linear (and physical) page boundaries, the metadata addressing granularity may correspond to the linear slot to which the allocation being accessed is assigned. Accordingly, the physical address of a midpoint of the metadata addressing granularity will correspond to a physical address corresponding to the linear slot midpoint of the slot to which the allocation is assigned. In this scenario, a linear address of the slot midpoint can be calculated based on the linear slot size and boundary (e.g., power of two boundary) in linear memory. Linear-to-physical page tables (e.g., 1164) may then be used to translate the linear address of the slot midpoint to a physical address of the slot midpoint in the targeted physical page. In other scenarios, where an allocation crosses both the upper and the lower boundaries of the physical page (and linear page), the metadata addressing granularity could be specified based on the entire linear (or physical) page. For example, the metadata addressing granularity for a full-page portion of an allocation could be specified as a 1-page size of metadata addressing granularity. In this scenario, the linear midpoint of the metadata addressing granularity can be calculated based on the upper and lower boundaries of the linear (or physical) page. The precise physical midpoint of the metadata addressing granularity can be determined based on the linear midpoint using the linear-to-physical page tables (e.g., 1164).

At 1208, a physical address in a tag table can be determined based on a mapping (e.g., 1162) from the physical address of the midpoint of the metadata addressing granularity to the physical address in the tag table. For example, the tag table may be indexed based on a power as previously shown herein (e.g., tag tables 420, 520, 720) or any other suitable mapping or indexing from physical data addresses to physical tag table addresses. The determined physical address in the tag table contains a set of metadata (e.g., descriptor and tag) associated with the memory allocation contained within the targeted physical page corresponding to the targeted linear page. The set of metadata may also include right and/or left bounds information depending on how far the allocation extends from the slot midpoint to the right and/or to the left within the physical page.

Alternatively, at 1204, if a determination is made that the allocation crosses a lower boundary of the targeted linear page, then an inference can be made that the allocation, when translated to physical memory, crosses a lower boundary of the targeted physical page. At 1210, a physical address of the lower boundary of the physical page can be determined. First, a linear address of the lower boundary of the targeted linear page can be determined. Linear-to-physical page tables may then be used to translate the linear address of the lower boundary of the targeted linear page to a physical address of the lower boundary of the targeted physical page.

At 1212, a physical address in the tag table can be determined based on a mapping (e.g., 1162) from the physical address of the lower boundary of the targeted physical page to the physical address in the tag table. The determined physical address in the tag table contains a set of metadata (e.g., descriptor and tag) associated with the portion of the memory allocation contained within the targeted physical page. The set of metadata may also include right bounds information depending on how far the allocation extends from the left boundary to the right into the targeted physical page.

Alternatively, at 1204, if a determination is made that the allocation crosses an upper boundary of the targeted linear page, then an inference can be made that the allocation, when translated to physical memory, crosses an upper boundary of the targeted physical page. At 1214, a physical address of the upper boundary of the targeted physical page can be determined. First, a linear address of the upper boundary of the targeted linear page is determined. Linear-to-physical page tables may then be used to translate the linear address of the upper boundary of the targeted linear page to a physical address of the upper boundary of the targeted physical page.

At 1216, a physical address in the tag table can be determined based on a mapping (e.g., 1162) from the physical address of the upper boundary of the targeted physical page to the physical address in the tag table. The determined physical address in the tag table contains a set of metadata (e.g., descriptor and tag) associated with the portion of the memory allocation contained within the physical page corresponding to the linear page. The set of metadata may also include left bounds information depending on how far the allocation extends from the right boundary to the left into the targeted physical page.

Once a physical address in the tag table is determined, the flow continues as shown in FIG. 12B. If the slot was determined to cross a boundary of the linear page, then at 1220, a determination may be made as to whether the presence of bounds metadata in the set of metadata in the tag table can be inferred. If the size of data being accessed by the memory access operation exceeds a threshold (e.g., >2 granules) or if the pointer being used points to a location in the page that exceeds a certain threshold distance from a crossed page boundary, then an inference can be made that bounds metadata is included in the set of metadata corresponding to the portion of the allocation being accessed in the physical page. In this scenario, the entire set of metadata (e.g., a tag, a descriptor, and bounds) can be retrieved from appropriate entries in the tag table at 1221 based on the physical address that was previously determined (e.g., at

1208 or 1212 or 1216). Some embodiments may have variable-sized bounds. In such embodiments, the processor may inspect whether the greatest distance of any portion of the requested access from the page boundary is sufficiently large that the largest possible bound representation is needed, and it may then load bound metadata of that maximal size. If the requested access is entirely close enough to the page boundary that a smaller bound representation may suffice for representing the distance, then the processor may wait until the descriptor has been loaded to determine what bound format to use. Alternatively, the processor may load an amount of metadata sufficient to encode the maximal bound format and disregard any portion that is unneeded once the descriptor has been read and interpreted. As another alternative, the processor may predict that the smallest bound format is in use that is able to represent the greatest distance of the requested access from the page boundary and check that prediction against the descriptor once it is loaded. If that prediction is incorrect, then the processor may load additional metadata for the correct, larger bound representation. In at least some embodiments, the descriptor and tag may be part of an entry arrangement in a tag table in physical memory, which may be the same or similar to one of the entry arrangements previously described herein with reference to a tag table in linear memory (e.g., entry arrangements 606-620 of FIG. 6).

If the bounds cannot be inferred at 1220, such as when the size of the allocation that crosses a page boundary is small (e.g., 1 or 2 bytes) or when the allocation is contained entirely withing the page boundaries, then at 1222, a descriptor and a tag are loaded from the physical address that was previously determined (e.g., at 1208 or 1212 or 1216). The descriptor and tag may be part of an entry arrangement in a tag table in physical memory, which may be the same or similar to one of the entry arrangements previously described herein with reference to a tag table in linear memory (e.g., 604-620 of FIG. 6).

At 1224, a determination is made as to whether the descriptor indicates that bounds entries are present in the set of metadata in the tag table entry arrangement corresponding to the allocation (or portion thereof) being accessed. If the descriptor indicates that no bounds entries are present, this indicates that the allocation is only one or two granules in size. Thus, flow may pass to 1230, where a tag check is performed to determine whether the tag encoded in the pointer matches the tag obtained from the tag table. If the tag check passes, then the operation is allowed at 1232. If the tag check fails, then an error condition is met at 1234, and appropriate action is taken (e.g., error is raised, program is terminated, etc.).

With reference again to 1224, if the descriptor indicates that one or more bounds entries are present, this indicates that the allocation extends to the left if the slot crosses the upper page boundary, to the right if the slot crosses the lower page boundary, or to both the left and right of the physical slot midpoint if the slot is contained entirely within the physical page boundaries. The descriptor may define how to interpret the additional adjacent entries. For example, the descriptor may indicate whether the allocation extends to the left of the upper page boundary, to the right of the lower page boundary, or to both the left and right of the slot midpoint physical address. The descriptor may also indicate that a single bounds entry corresponds to the allocation extending to the left of the upper physical page boundary or that a single bounds entry corresponds to the allocation extending to the right of the lower physical page boundary, or that multiple bounds entries correspond to the allocation extending on both sides of the slot midpoint physical address. At 1226, the bounds metadata is retrieved from the tag table based on the information determined from the descriptor.

At 1228, once the presence of bounds metadata of the allocation is determined (e.g., by inference or by descriptor) and the relevant bounds entry or entries are obtained from the tag table, a determination is made as to whether the physical address translated from the linear address encoded in the encoded pointer is within the physical bounds indicated by the bounds metadata. If the physical address is not within the physical bounds indicated by the bounds metadata, then an error condition is met at 1234, and appropriate action is taken (e.g., error is raised, program is terminated, etc.).

If the physical address is within the determined physical bounds, however, then flow may pass to 1230, where a tag check is performed to determine whether the tag encoded in the pointer matches the tag obtained from the tag table. If the tag check passes, then the operation is allowed at 1232. If the tag check fails, then an error condition is met at 1234, and appropriate action is taken (e.g., error is raised, program is terminated, etc.).

Protecting Metadata

A discussion regarding protecting metadata now follows. An adversary may be able to spray objects of a known size and thus skew the probability of particular slots with particular descriptor types being installed at many locations in memory. That may in turn increase the chance of an adversary forging a pointer for a 12 B slot specifying that descriptor value as the "tag" value, and hence gaining access to the associated granule of data. The bounds encodings would also be predictable in this case, so the adversary could likely access those corresponding granules as well.

To mitigate attempts by an adversary to cause metadata to be misinterpreted as a different type of metadata (e.g., to confuse a descriptor or nibble in a bound for a large slot as just a tag for a 12 B slot), it may be helpful to reserve a bit in each byte to indicate whether the nibble is a tag or a descriptor. However, that would either increase tag table storage requirements or limit the tag space.

It would be less predictable, while still avoiding tag table bloat, to encode all descriptors and bounds by XOR-ing each nibble with the tag value. This essentially propagates the unpredictability of the tag through the other metadata. If an adversary still manages to guess one of XOR-ed metadata values for a correctly predicted metadata value, then that implies that they know the other metadata values, and they may be able to then access the corresponding data for those other metadata positions. However, this makes the metadata no less predictable than in the equivalent situation for memory tagging that simply stores duplicated tag values.

Another option for protecting metadata may be to encrypt metadata differently depending on whether it is a lone tag for a 16 B slot versus metadata including a descriptor for a larger slot.

Reducing Hardware Complexity

A discussion regarding protecting metadata now follows. Embodiments of memory tagging with a single tag per allocation as disclosed herein enable reducing hardware complexity for implementing tag checks by making it more feasible to rely on a software-managed object cache (also referred to herein as "object cache"). In an embodiment using a software-managed object cache, a processor could implicitly check the object cache for each attempted access and would not access the tag table to load allocation metadata not represented in the object cache. If an object cache entry is not found for an attempted access, an exception would be generated so that a software exception handler could update the object cache appropriately. A single cache entry can cover a large range, so exceptions due to missing object cache entries would typically be relatively infrequent. The cache entry format of the allocation metadata could be similar to the in-memory tag table format of the allocation metadata (e.g., as shown in FIG. 6) so that a single object cache entry can represent allocation metadata for either a number of small allocations with non-bounded metadata or a single bounded allocation or a combination of bounded and non-bounded metadata for multiple allocations. A user level exception delivery mechanism could help to reduce overheads of handling cache misses.

Indexing the tag (or object) cache using an encoded pointer, power of two format, such as encoded pointer 210 of FIG. 2 for example, allows greater efficiency than a conventional bounds check. This object cache may be indexed by the slot midpoint address as each midpoint is unique per allocation, adding the offset to be compared with the bounds. Slot entries may be exclusive to the right bounds, left bounds, or some embodiments may include both left and right bounds. The object cached slot size may also be smaller than the actual object size allowing multiple cache entries to represent an object if needed.

Figure 13:
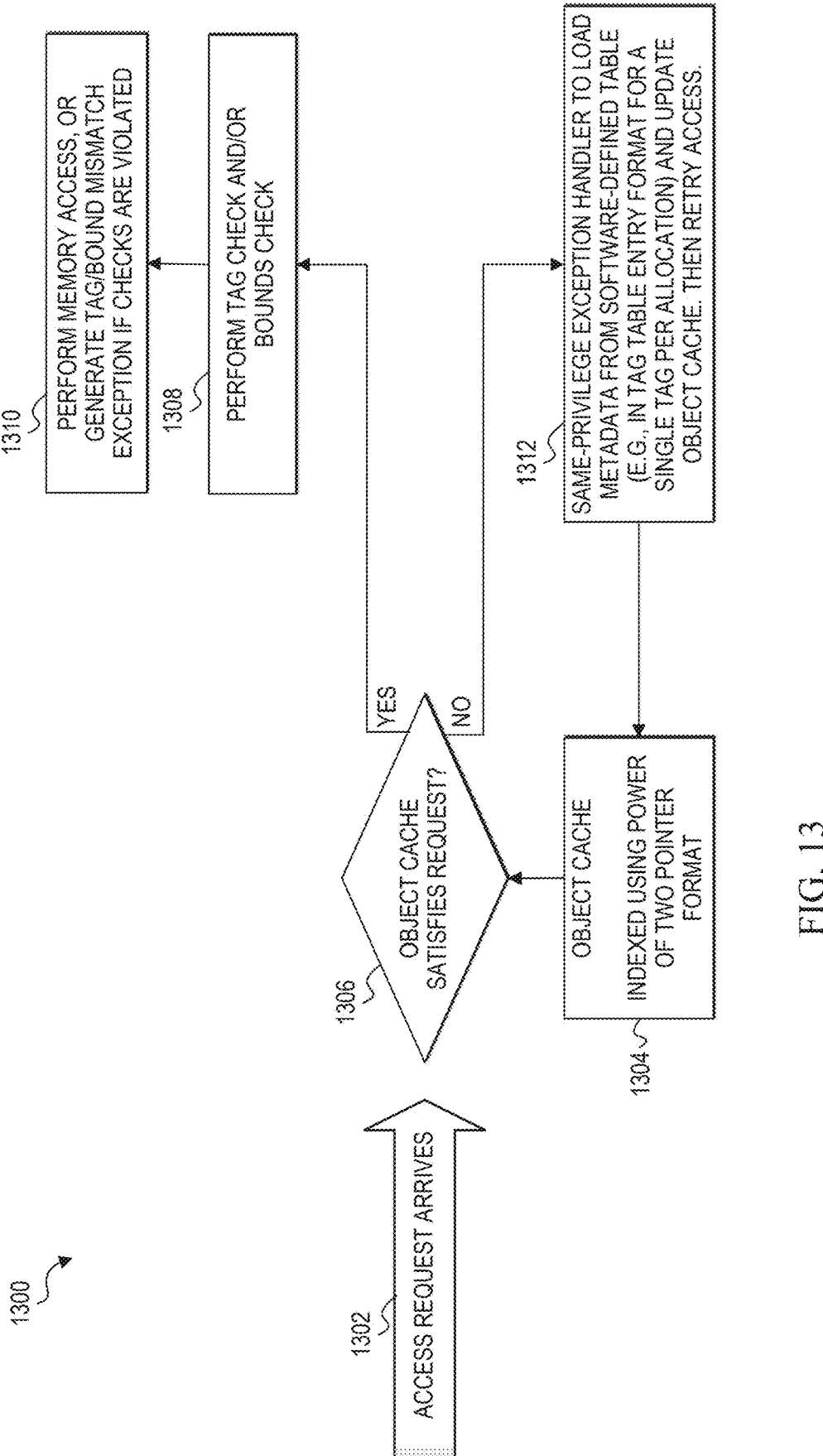
FIG. 13 is a flow diagram illustrating an example process for indexing an object cache according to at least one embodiment.

FIG. 13 is a flow diagram illustrating an example process 1300 for indexing an object cache according to at least one embodiment. Process 1300 may be associated with an instruction to be executed by a processor (e.g., 230) to perform one or more operations in process 1300. In one example, the object cache may be updated using a "CacheTag" instruction with operands for the associated address and the metadata associated with that address. Other operations of process 1300 may be performed by processor circuitry (e.g., 110, 330) and/or an integrated memory controller (IMC) (e.g., 120, 334) and/or a separate memory controller. At least some operations may be performed by an exception handler, which may be performed in software (e.g., 167) or in hardware.

At 1302, an access request (e.g., load or store) is received by the processor. At 1306, a determination is made as to whether an object cache 1304 satisfies the access request. The object cache satisfies the access request if a set of metadata (e.g., tag, descriptor, bounds) associated with the access request is contained in the object cache. If a determination is made that the object cache satisfies the access request, then at 1308, a tag check and/or a bounds check are performed for the memory access request. If the targeted memory of the memory access request is small (e.g., 1 or 2 granules), then the associated set of metadata may not include bounds information and, therefore, a bounds check may not be performed. At 1310, if the tag check and the bounds check (if the bounds check is performed) are successful, then the memory access is performed. Alternatively, if the tag check or bounds check are violated, then a tag/bound mismatch exception is generated.

If a determination is made at 1306 that the object cache 1304 cannot satisfy the access request because the metadata associated with the memory access instruction is not loaded in the object cache, then at 1312, a same-privilege or different-privilege exception handler, or some other form of same-privilege or different-privilege software routine, may be invoked to load metadata from a software-defined table (e.g., in an appropriate tag table entry format such as those shown in FIG. 6). Other formats of metadata could also be used in other implementations.

Within the exception handler, a "CacheTag" instruction can be executed to specify the metadata (or set of metadata) that is to be inserted into the object cache. The CacheTag instruction, when executed, determines the alignment and format of the metadata by inspecting the supplied address and metadata. An available object cache entry is then selected, which may involve evicting some prior object cache entry. The supplied metadata is placed into the selected entry. For example, the processor may track which object cache entry was least recently used and replace that one. Alternatively, software may specify an index for the object cache entry, overwriting any contents (e.g., metadata including a tag associated with another memory allocation) of the entry that may already exist. The processor uses the determined index to update the object cache 1304 with the metadata provided by the CacheTag instruction. In some embodiments, the CacheTag may update the object cache with multiple sets of metadata at once. For example, multiple small allocations without bounds could be loaded at once into a cacheline.

In some embodiments, when the needed allocation metadata is determined to be missing from the object cache, a same-privilege exception handler, e.g., in user space for a user space memory access request, can be invoked to load the necessary allocation metadata into the object cache, or a generic handler can load the necessary metadata and install it in the object cache. In other embodiments that direct exceptions to the kernel, the kernel can send the exception to user space, so that the user space handler could perform the cache update. In other embodiments, the kernel could perform the object cache update. Invoking user space directly in response to user space memory access requests instead of the kernel, however, can be more efficient since the kernel does not need to be invoked first. In other scenarios, if an access occurs in the kerned in kernel mode, and if the relevant allocation metadata is missing from the object cache, then the kernel handler may be invoked. Otherwise, for an object cache miss for a user space access, the kernel handler would not need to be invoked.

Once the object cache has been updated, memory access may be retried. At 1306, a determination can be made as to whether the object cache satisfies the request. The object cache 1304 may be accessed based on an index using a power of two pointer format of the pointer used in the memory access request. Since the object cache satisfies the request, the memory access may be performed at 1310 if the tag check and bounds check are successful at 1308.

An object cache may need to be synchronized across a multi-core processor. If a memory allocator on one core creates a new allocation, the object caches on other cores containing old metadata for that location need to be invalidated or otherwise have the affected cache entries removed. Software or hardware could keep object caches synchronized across cores in a variety of ways. First, a cross-core Inter-Process Interrupt (IPI) or User Inter-Process Interrupt (UIPI) to a handler that evicts the affected object cache entry could be performed, if any exists on the destination hardware thread. Each thread could use a new instruction to evict object cache entries selectively, e.g., "InvTag". For example, an IPI can be used to cause the operating system on the destination core to invoke an allocator for the core, which can then use the InvTag to clear stale cache metadata and install new cache metadata. In another example, a UIPI can be used to invoke the allocator on the destination core directly.

A second approach to synchronizing object caches across cores can include a new instruction that remotely evicts specified lines from object cache entries in other hardware threads could be used. For example, a new instruction could be called "EvictTagCacheLine". When an allocator on one core creates a new allocation, the allocator may use this instruction to directly communicate through the processor to other cores in that processor. The instruction could be used to communicate to all of the other cores or to selected ones of the other cores. Thus, software would not need to be invoked on the other cores, which could increase efficiency since software context is not changed on the other cores.

A third approach to synchronizing object caches across cores can include a "lazy" software technique. In this embodiment, a list in the allocator of object cache entries that need to be evicted can be maintained, and the list of object cache entries can be lazily evicted whenever the allocator is invoked next on each hardware thread, where one or more hardware threads may be running on each core. The allocator can maintain the list for each hardware thread. When an allocator instance on another hardware thread is creating a new allocation, that allocator instance can check the list to ensure that the locations of any previously freed allocations with associated metadata that has not been cleared from every hardware thread in the system, is not used. Over time, as each allocator instance is invoked for various reasons, the allocator instance can check the list and clear out any object cache entries that are associated with allocations that have previously been freed by another allocator instance for another hardware thread. A data structure such as a bitmap could record which hardware threads have evicted each object cache entry (e.g., by setting a flag or other suitable indicator), and the associated memory region could be quarantined until all hardware threads that may have previously cached that entry have evicted it.

In a fourth approach to synchronizing object caches across cores, writes to the metadata storage associated with the object cache entry can be monitored in hardware, and the entry can be evicted whenever a change is detected. Thus, the processor needs to know which memory locations correspond to particular tag table entries and object cache lines. In this case, the tag table could be in a particular format recognized by the hardware, such as the format specified above (e.g., FIG. 6). In addition, the processor would retain a mapping from the object cache entry to the associated physical metadata storage to be able to recognize relevant cache updates. In one example, the processor can watch for any changes to the physical metadata storage for the metadata that has been loaded into a particular object cache line. The processor can monitor the cache traffic for snoops (e.g., messages sent between caches indicating when a particular region is being updated). When the processor detects a matching snoop, then the processor can clear that cache entry because the snoop indicates a metadata update.

If the object cache synchronization logic is strictly enforced prior to allowing reallocation of the associated memory region, this can avoid tag check race conditions. Applications could opt into strictly performing this synchronization for certain sensitive allocations or for all allocations. Additionally, an optional "MovTag" instruction could automatically perform either local or global object cache updates for the metadata updated by the instruction.

It should be noted that it is also possible to implement an object cache when physical tagging is used. In this scenario, some instructions may perform physical accesses to data regions, such as physically indexed metadata stored in the data regions.

Figure 14:
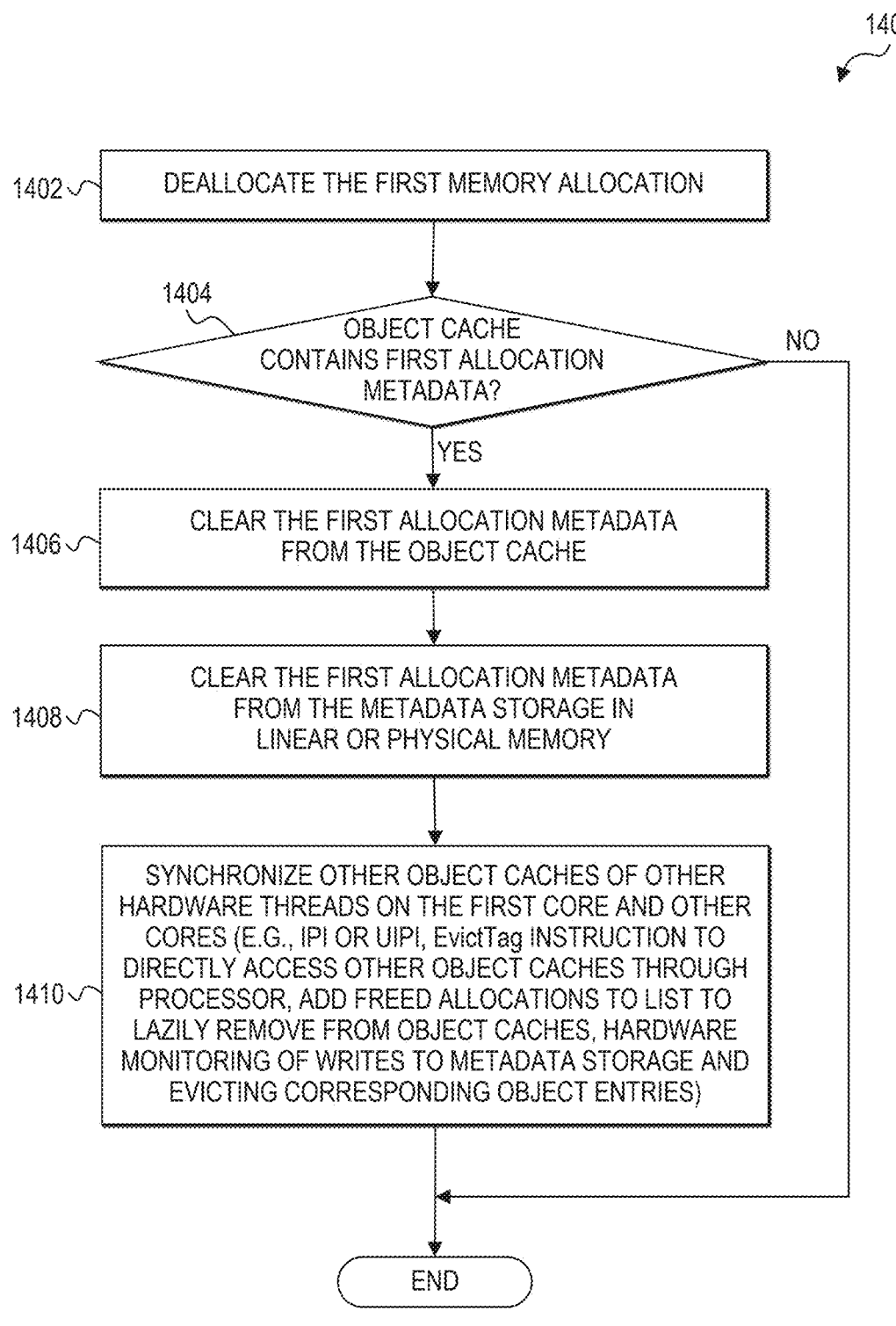
FIG. 14 is a flow diagram illustrating an example process for clearing an object cache and synchronizing other object caches according to at least one embodiment.

FIG. 14 is a flow diagram illustrating an example process 1400 for clearing an object cache and synchronizing other object caches when a memory deallocation occurs. At least some of the operations of process 1400 may be performed by an instance of an allocator for a hardware thread of a core of a processor. At least some operations of process 1400 may be performed by software (e.g., the allocator) and/or the processor (e.g., 110, 330). An object cache (e.g., 114A, 1304) may be accessed and updated by operations of process 1400. Although process 1400 is described with particular reference to allocation metadata (e.g., tags, descriptors, and bounds associated with memory allocations) stored in an object cache of a hardware thread, it should be apparent that the concepts also apply to caches that are used to store other types of data (e.g., metadata) and, when cleared from the cache, other corresponding caches of other hardware threads need to be synchronized.

At 1402, an allocator of a hardware thread of a core of a processor can deallocate memory that was previously allocated. The hardware thread may be one of one or more hardware threads of a first core of a processor. The processor may contain one or more cores, each having one or more hardware threads.

At 1404, a determination is made as to whether an object cache contains the first allocation metadata associated with the first memory allocation that has been deallocated. If the object cache does not contain the first allocation metadata, then the flow can end. Otherwise, if the object cache does contain the first allocation metadata, the first allocation metadata is cleared from the object cache at 1406. At 1408, the first allocation metadata may also be cleared from the metadata storage (e.g., tag table indexed in linear or physical memory).

At 1410, other object caches of other hardware threads on the first core and other cores is synchronized to clear the first allocation metadata for the other object caches. Any suitable technique for synchronizing the other object caches may be used, as previously described herein. For example, techniques using IPI or UIPI to invoke other allocator instances (e.g., via processor or directly) to update the other object caches may be used. Techniques using an EvictTag instruction to directly update other object caches via the process may be used. Techniques using a lazy update approach where freed allocations are tracked on a list and when other allocator instances are invoked, the object caches associated with those other allocator instances are updated. Also, techniques using hardware to monitor writes to metadata storage and evict corresponding object cache entries may be used.

Supporting Fine-Grained, On-Demand Decryption

In some scenarios, cryptographically protected objects stored in memory may need be to be accessed in an unencrypted form. For example, physical memory accesses are typically performed assuming that the targeted content is unencrypted. Direct memory access (DMA) devices, for example, perform physical memory accesses. In other examples, memory access of an object (or portions thereof) via another alias within a system (e.g., using multiple linear addresses to access an object) may need to be performed without requiring decryption that is tied to a single linear address. In such scenarios, one or more embodiments herein provide for cryptographically protected objects that can be decrypted in anticipation of other types of access (e.g., physical access or aliased access) of the objects.

In one embodiment to enable a cryptographically protected object (or portion thereof) to be accessed in an unencrypted form, the encrypted object can be decrypted in advance of the memory access, and an indication that the object is unencrypted (e.g., decrypted) can be provided. The metadata used in one or more embodiments of memory tagging with a single memory tag per allocation or sub-allocation can provide the indication per-object (or sub-object for objects covered by multiple single tag metadata items). The indication can be in embodied as a flag (e.g., one bit) or any other suitable indicator that conveys whether the object has been decrypted on-demand to avoid exposing other nearby objects or blocking access to the other objects while the decryption is taking place. For example, a bit (e.g., a flag) within each metadata item can be designated to indicate whether the corresponding object is encrypted. Thus, one bit per object allocation may be stored in the corresponding metadata for that object. The metadata, including the flag (or other indicator) can be stored in the object cache. Since any access that expects the object to be encrypted will be performed using an encoded linear address, such as encoded pointer 210 of FIG. 2 for example, an opportunity is provided for the processor to check the indicator bit in the object cache prior to performing the access. In contrast, direct memory access (DMA) device accesses always expect that the object has already been decrypted, so there is no need for them to have visibility into the indicator bit.

The setting of the indicator bit needs to be consistent across all accesses to the object. For example, if different software threads are scheduled concurrently on multiple hardware threads and concurrently access the same object, then both of the software threads treat that object as either encrypted or decrypted. To enforce that property, the on-demand decryption handler can use Inter-Processor Interrupts (IPIs) to synchronize with other hardware threads, analogously to how page mappings are taken offline for swapping or updating following permission reductions.

Figure 15A:
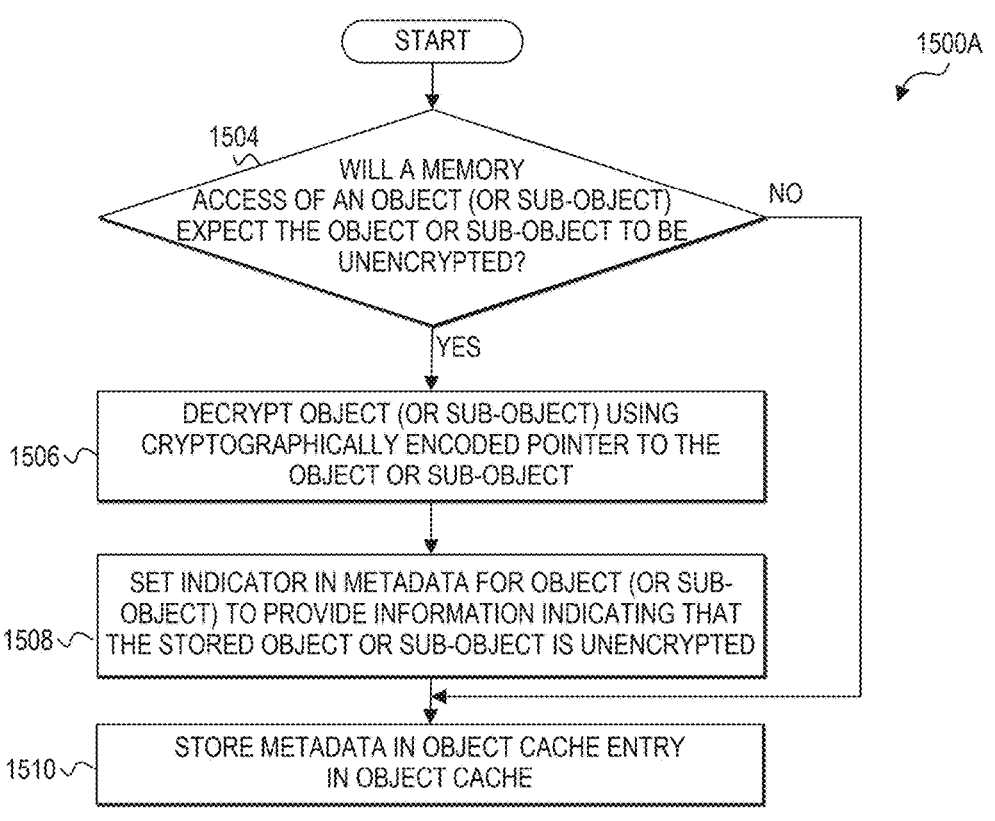
FIGS. 15A and 15B are flow diagrams illustrating example processes associated with single tag metadata and memory access to plaintext objects according to at least one embodiment.
Figure 15B:
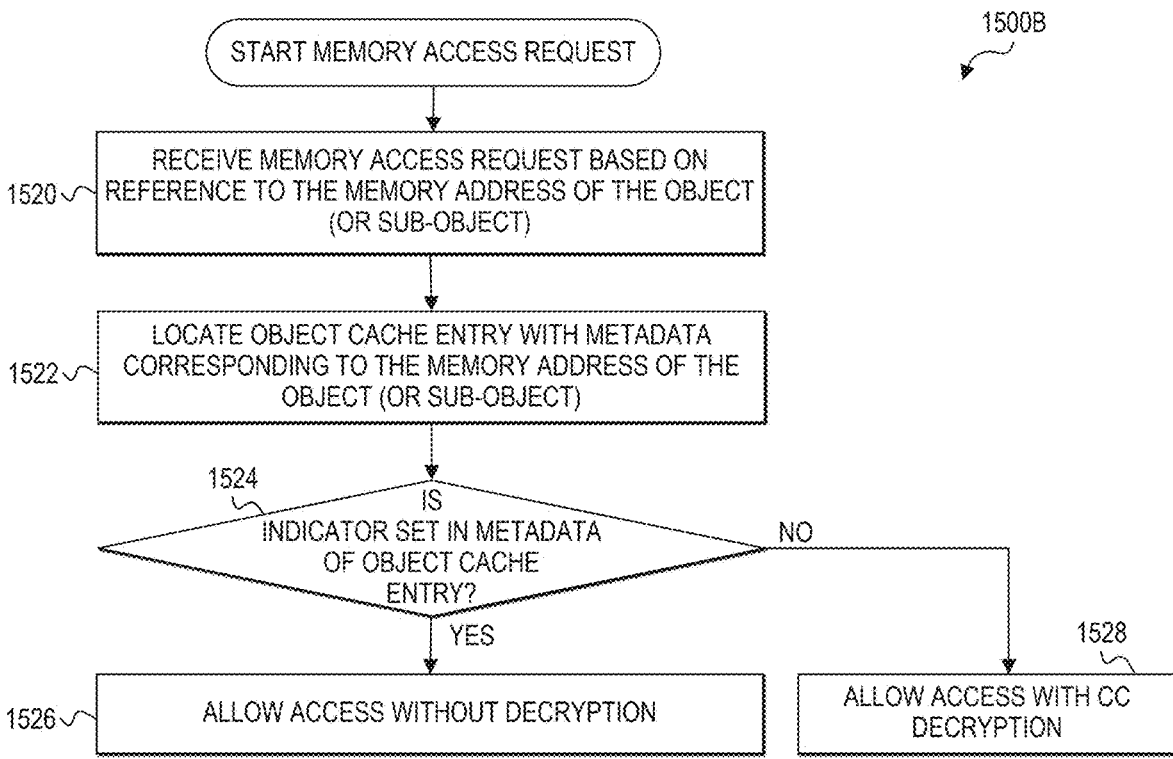

FIGS. 15A and 15B are flow diagrams illustrating example processes 1500A and 1500B, respectively, for using single tag metadata to enable plaintext (or unencrypted) access to cryptographically protected objects. Process 1500A may be performed by a processor (e.g., 110, 330) and/or an integrated memory controller (IMC) (e.g., 120, 334) and/or a separate memory controller and/or an on-demand decryption handler (e.g., 169). Process 1500A may be performed during execution of a program.

At 1504, a determination is made as to whether an executing program associated with a particular memory access of an encrypted object (or sub-object for objects covered by multiple single tag metadata items), will expect the object or sub-object to be unencrypted. For example, a DMA access or an aliased access can expect the object (or sub-object) to be unencrypted.

If a determination is made at 1504 that the executing program will expect an unencrypted object (or sub-object) when the particular memory access is performed, then at 1506, the object (or sub-object) is decrypted. Cryptographic computing concepts may be used to decrypt the object (or sub-object) referenced by a cryptographically encoded pointer. For example, an encrypted portion of the crypto-graphically encoded pointer may be decrypted to obtain the memory address (e.g., linear address) of the encrypted object (or sub-object). The encrypted object (or sub-object) can be loaded and decrypted based on a key and a tweak that is derived, at least in part, from the cryptographically encoded pointer.

At 1508, the processor can set an indicator (e.g., 1 bit) in the single tag metadata associated with the object (or sub-object). The indicator can convey whether the object (or sub-object) is encrypted or unencrypted). At 1510, the single tag metadata can be stored in a object cache entry in an object cache. The indicator in the metadata may be set to a particular value (e.g., 1 or 0) to convey that the object (or sub-object) is encrypted.

If a determination is made at 1504 that the executing program does not expect an object that is retrieved based on the particular memory access to be unencrypted, then at 1510, single tag metadata associated with an object (or sub-object) can be stored in an object cache entry of an object cache. The indicator in the metadata may be set to a particular value (e.g., 0 or 1) to convey that the object (or sub-object) is encrypted.

Process 1500B may be performed by a processor (e.g., 102) upon execution of an instruction that includes a memory operation, according to one embodiment. Processor circuitry (e.g., 110, 330) and/or an integrated memory controller (IMC) (e.g., 120, 334) performs one or more operations illustrated in process 1500B.

At 1520, the processor receives a memory access request (e.g., read, move, etc.) based on a reference to a memory address of a particular object (or sub-object). The reference may be any type of address or indirect address (e.g., pointers, etc.) pointing to the location in memory containing the targeted object (or sub-object).

At 1522, an object cache entry containing the single tag metadata associated with the targeted object (or sub-object) is located in the object cache. At 1524, a determination is made as to whether an indicator in the single tag metadata contains a value that indicates that the targeted object (or sub-object) is encrypted.

If a determination is made that the indicator contains a value conveying that the targeted object (or sub-object) is unencrypted, then at 1526, access is allowed and performed without decrypting the targeted object (or sub-object) loaded from the memory address.

If a determination is made that the indicator contains a value conveying that the targeted object (or sub-object) is encrypted, then at 1528, access is allowed and performed using cryptographic computing decryption on the targeted object (or sub-object) loaded from the memory address.

It should be noted that, when a object cache entry is added, either automatically by the processor or at the direction of the software (e.g., via a CacheTag instruction), the page mapping and permissions information, etc., for that slot of memory can also be cached in the object cache rather than in the translation lookaside buffer (TLB). Thus, performance can be optimized by avoiding the need for looking up both the object cache and the TLB for each access. Operations for invalidating TLB entries, e.g., INVLPG, would also operate on object cache entries.

Cryptographically Protecting Single Tag Pointers

In some architectures, fewer pointer bits may be available for encoding metadata such as power and a tag value. For example, some architectures support five level paging and define 57 address bits. Thus, for a 64-bit pointer, only seven bits are unused. Pointer embodiments described in FIGS. 16A-16B offer alternative configurations for encoding pointers with power and a tag value when fewer pointer bits are available.

Figures 16A, 16B:
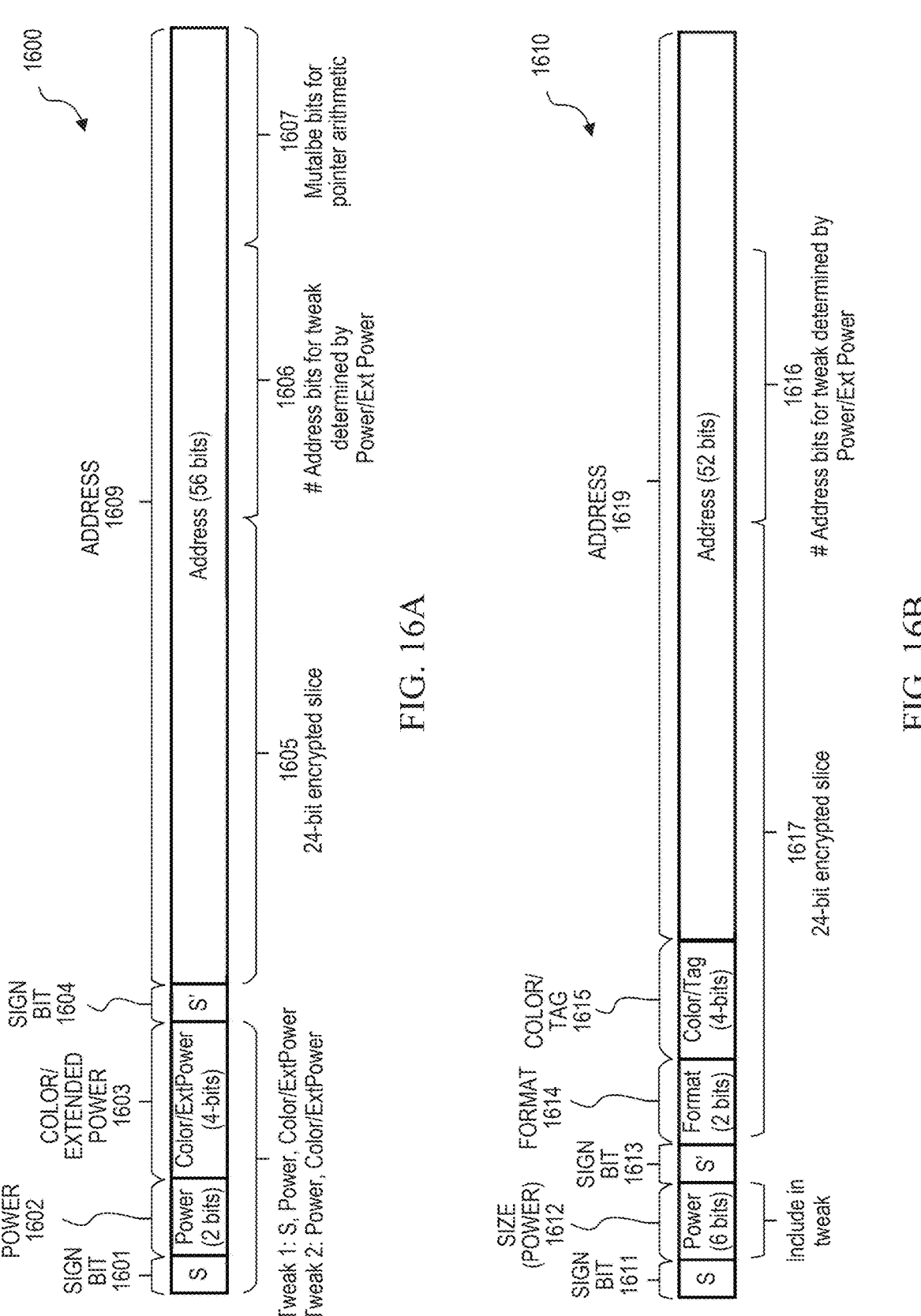
FIG. 16A is a schematic diagram of another illustrative encoded pointer architecture according to at least one embodiment.
FIG. 16B is a schematic diagram of yet another illustrative encoded pointer architecture according to one embodiment.

FIG. 16A is a schematic diagram of another illustrative encoded pointer architecture according to one embodiment. FIG. 16A illustrates an encoded pointer 1600 that may be used in one or more embodiments of a memory safety system disclosed herein. The encoded pointer 1600 may be configured as any bit size, such as, for example, a 64-bit pointer (as shown in FIG. 16A), a 128-bit pointer, a pointer that is larger than 128-bits (e.g., 256 bits, etc.), or a pointer that is smaller than 64 bits (e.g., 32 bits, 16 bits, etc.).

Encoded pointer 1600 illustrates one possible approach for encoding power and a tag value in a pointer with a limited number of unused bits that can be used for encoding power and a tag value. For example, the address encoded in the 64-bit pointer 1600 uses 57 address bits, leaving one bit for as a sign bit and six unused bits that can be used for power and a tag value. In one example implementation, the encoded pointer 1600 may include an Intel x86 architecture pointer.

FIG. 16A shows a 64-bit pointer (address) in its base format, using exponent size (power) metadata. The encoded pointer 1600 includes a first sign bit field 1601, a 2-bit power field 1602, a 4-bit color/extended power field 1603, a second sign bit field 1604, and a multi-bit address field 1609. A tag field is also referred to herein as a "color field." The address field 1609 includes a 24-bit encrypted slice 1605 and unencrypted address bits 1606, which may include an immutable portion and a mutable portion that can be used for pointer arithmetic. The encoded pointer 1600 is an example configuration that may be used in one or more embodiments and may be the output of special address encoding logic that is invoked when memory is allocated (e.g., by an operating system, in the heap or in the stack, in the text/code segment) and provided to executing programs in any of a number of different ways, including by using a function such as malloc, alloc, calloc, or new; or implicitly via the loader; or statically allocating memory by the compiler, etc. As a result, an indirect address (e.g., a linear address) that points to the allocated memory, is encoded with metadata (e.g., power in power field 1602, extended power in color/extended power field 1603, and sign bits in sign bit fields 1601 and 1604) and is partially encrypted (e.g., 1605).

Certain operating modes of various architectures may include features that reduce the number of unused bits available for encoding metadata in the pointer. In one example, the Intel® Linear Address Masking (LAM) feature includes a first sign bit (S) in the first sign bit field 1601. The LAM feature is defined so that canonicality checks are still performed even when some of the unused pointer bits have information embedded in them. A second sign bit (referred to herein as S') may also be encoded in a second sign bit field 1604 of encoded pointer 1600. The S bit and S' bit need to match, even though the processor does not require the intervening pointer bits to match. Although embodiments of memory tagging with one memory tag per allocation is not dependent on the LAM feature, some embodiments can work with the fewer unused bits made available in the encoded pointer when LAM is enabled. Encoded pointer 1600 illustrates one example of a pointer having fewer available bits. Nevertheless, the particular encoding of encoded pointer 1600 enables the pointer to be used in a memory tagging system as described herein.

In at least one embodiment, in encoded pointer 1600, an address slice (e.g., upper 24 bits of address field 1609) may be encrypted to form a ciphertext portion (e.g., encrypted slice 1605) of the encoded pointer 1600. In some scenarios, other metadata encoded in the pointer (other than the power in the power field 1602, extended power in the extended power field 1603, or sign bits in the sign fields 1601 and 1604) may also be encrypted with the address slice that is encrypted. For example, in a 128-bit pointer, additional metadata may be encoded and included in the encrypted slice. The ciphertext portion of the encoded pointer 1600 may be encrypted with a small tweakable block cipher (e.g., a SIMON, SPECK, or tweakable K-cipher at a 16-bit block size, 32-bit block size, or other variable bit size tweakable block cipher). Thus, the address slice to be encrypted may use any suitable bit-size block encryption cipher. If the number of ciphertext bits is adjusted (upward or downward), the remaining address bits to be encoded (e.g., immutable and mutable portions) may be adjusted accordingly.

A tweak may be used to encrypt the address slice and may include one or more portions of the encoded pointer 1600. For example, one option for a tweak includes the bit in the first sign bit field 1601, the bits in the power field 1602, and the bits in the extended power field 1603. Another option for a tweak includes only the bits in the power field 1602 and the bits in the extended power field 1603. In addition, at least some of the unencrypted address bits may also be used in the encryption. In one embodiment, the number of address bits that are to be used in the tweak can be determined by the power field 1602 value and the extended power field 1603 value.

In one or more embodiments, the different values encoded in power field 1602 correspond to the following approaches for tag metadata:

0 (bits 00): Tag is duplicated for every granule 1 (bits 01): Single tag slot encoding for slot size of $2^{(7+ExtPower)}$ 128 B-4 MiB 2 (bits 10): Single tag slot encoding for slot size of $2^{(23+ExtPower)}$ 8 MiB-4 GiB ExtPower>9 is reserved 3 (bits 11): Treat as 'duplicate tag' encoding to allow selective pass-through of canonical pointers When data that has a value of 0 (bits 00) is stored in the power field 1602 of a pointer, the data indicates that duplicate tags are stored for every granule of the allocation associated with the pointer. When data that has a value of 3 (bits 11) is stored in the power field 1602 of a pointer 1600, the data indicates that duplicate tags are stored for every granule of the allocation associated with the pointer in order to allow selective pass-through of canonical pointers.

Other values stored in the power field 1602, however, allow the elimination of tag duplication in larger allocations. Data stored in the power field 1602 that has a value of 1 (bits 01) indicates a first range of slot sizes (e.g., 128 B-4 MiB) for which a single tag (and possibly a descriptor and bounds) is stored in a tag table, instead of a tag being stored for each granule. To determine the slot size for the allocation, an exponent n is calculated by adding the value stored in the extended power field 1603 to the value of 7. The exponent n can be used with the base of 2 ($2^n$) to determine the appropriate slot size.

Data stored in the power field 1602 that has a value of 2 (bits 10) indicates a first range of slot sizes (e.g., 8 MiB-4 GiB) for which a single tag (and possibly a descriptor and bounds) is stored in a tag table, instead of a tag being stored for each granule. To determine the slot size for the allocation, an exponent n is calculated by adding the value stored in the extended power field 1603 to the value of 23. The exponent n can be used with the base of 2 ($2^n$) to determine the appropriate slot size. The maximum value that can be stored in the extended power field 1603 when the power field 1602 includes a value of 2, is limited at least by the size of the memory. In this example, the maximum value that can be stored in the extended power field 1603 is 8, with higher values being reserved.

For pointers with values in the power field 1602 indicating a single tag approach (e.g., values 1 or 2), the address of the slot can be determined using the higher order address bits of the pointer. Once the memory address and slot size are determined, a midpoint can be determined. In one or more embodiments, the midpoint can be used to index a tag table (e.g., 420, 520, 720) as previously described herein.

In all valid encodings, the value in the color field 1603 is checked against a stored color (e.g., tag). For values of 0 and 3 in the power field 1602, the color field 1603 may be used as a tag for each granule. For values of 1 and 2 in the power field 1602, the color field 1603 is used to store data representing an extended power. In this scenario, the value in the extended power field 1603 can be checked against a stored extended power. Adjacent allocations with same power can be assigned different extended powers by an allocator to address adjacent overflow, reused memory can be assigned a different power or extended power to address use after free (UAF) exploits, and other power/extended power assignments can be unpredictable to address non-adjacent overflows and forgeries.

Alternatively, by consuming more pointer bits as shown in FIG. 16B, an independent color/tag field can be used for any slot size and metadata format, and all pointers up to the maximum slot size can be encrypted, even if the metadata for the allocation is in the duplicated tag format.

FIG. 16B is a schematic diagram of another illustrative encoded pointer architecture according to one embodiment. FIG. 16B illustrates an encoded pointer 1610 that may be used in one or more embodiments of a memory safety system disclosed herein. Encoded pointer 1610 is one example alternative to encoded pointer 1600 of FIG. 16A. The encoded pointer 1610 may be configured as any bit size, such as, for example, a 64-bit pointer (as shown in FIG. 16A), a 128-bit pointer, a pointer that is larger than 128-bits (e.g., 256 bits, etc.), or a pointer that is smaller than 64 bits (e.g., 32 bits, 16 bits, etc.). The encoded pointer 1610, in one embodiment, may include an x86 architecture pointer.

FIG. 16B shows a 64-bit pointer (address) in its base format, using exponent size (power) metadata. The encoded pointer 1610 includes a first sign bit field 1611, a 6-bit size (power) metadata field 1612, a second sign bit field 1613, a 2-bit format field 1614, a 4-bit color/tag field 1615, and a 52-bit address field 1619. A 24-bit encrypted slice 1617 may include an upper portion of the address field 1619, the color/tag field 1615, and the format field 1614. The remaining encrypted address bits may include an immutable portion and a mutable portion that can be used for pointer arithmetic. In at least one embodiment, the number of mutable address bits and immutable address bits may be determined based on the power encoded in size metadata field 1612. Like encoded pointer 1600, encoded pointer 1610 is an example configuration that may be used in one or more embodiments and may be the output of special address encoding logic that is invoked when memory is allocated (e.g., by an operating system, in the heap or in the stack, in the text/code segment) and provided to executing programs in any of a number of different ways, including by using a function such as malloc, alloc, calloc, or new; or implicitly via the loader; or statically allocating memory by the compiler, etc. As a result, an indirect address (e.g., a linear address) that points to the allocated memory, is encoded with metadata (e.g., power in size metadata field 1612, format in format field 1614, color in color/tag field 1615, and sign bits in sign bit fields 1611 and 1613) and is partially encrypted (e.g., 1607).

By consuming more pointer bits for metadata in encoded pointer 1610, the independent color/tag field 1615 can be used for any slot size and metadata format. Additionally, any or all pointers up to the maximum slot size can be encrypted, even if the metadata for the allocation is in the duplicated tag format. It should be noted that when pointer encryption is referenced herein, such encryption is intended to refer to encryption of a portion of the pointer such as a portion of higher order immutable bits and/or some or all of the metadata such as the power field 1602, the color/extended power field 1603, and sign bit fields 1601 and 1604. The size metadata field 1612 value may specify or indicate the number of address bits to include in the pointer encryption tweak. An example of tweak address bits that are determined based on the power represented in size metadata field 1612 is referenced by 1616. The format value in format field 1614 can specify or indicate the allocation metadata format. An example of possible format values and the corresponding allocation metadata formats is the following:

Format=0 (bits 00): duplicated tags/colors
    Format=1 (bits 01): 128-byte slots
    Format=2 (bits 10): 256-byte slots
    Format=3 (bits 11): 512-byte slots Arranging Single Tag Metadata for Increased Locality and Memory Savings An alternative metadata format and arrangement can be defined such that metadata from similarly sized slots is arranged contiguously. This can improve locality for accesses to that metadata, especially for allocations that cross slot boundaries. This approach can be particularly useful for architectures with fewer available pointer bits, as significant memory savings can still be achieved while using fewer pointer bits than other embodiments described herein. For example, this alternative metadata format and arrangement may be used in conjunction with a pointer having the same configuration or a similar configuration as illustrated in pointers 1600 of FIG. 16As or 1610 of FIG. 16B. This approach also minimizes the number of pages that need to be committed for metadata, because the unused metadata for unused slots within larger slots that are used are clustered and can be left uncommitted (i.e., with no physical memory reserved).

Figure 17:
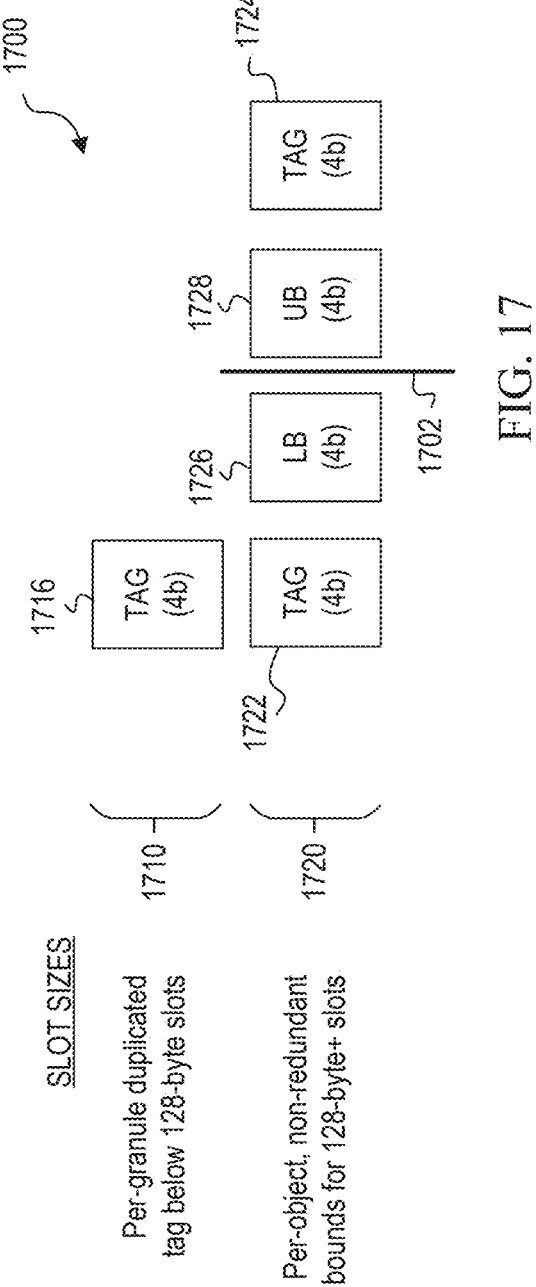
FIG. 17 is a block diagram illustrating possible metadata formats that may be used to uniquely assign each metadata storage location to a particular slot without overlap.

In order to rearrange metadata in this way, each metadata storage location is uniquely assigned to a particular slot with no overlap. FIG. 17 is a block diagram illustrating possible metadata formats 1700 that may be used to uniquely assign each metadata storage location to a particular slot with no overlap. A first format 1710 includes a per-granule duplicated tag 1716 for allocations assigned to slots that are below 128-byte slots (e.g., 64-byte slots, 32-byte slots, 16-byte slots). A second format 1720 includes per-object, non-redundant bounds (e.g., lower bounds 1726 and upper bounds 1728) adjacent to a slot midpoint 1702 superimposed on tag table entry, along with respective a tags 1722 and 1724.

The metadata formats 1710 and 1720 may include at least the following properties. First, the metadata format 1720 maximizes the usability of bounds. Bounds can be used as soon as at least one side of the associated allocation extends at least 32 bytes from the associated midpoint 1702 superimposed on the tag table, even if other side extends only 16 bytes. Other granule sizes besides 16 bytes can also be used. Second, if one side extends only 16 bytes, then a tag (e.g., 1722, 1724) may only be stored on the opposite side of metadata (e.g., the other side of the superimposed slot midpoint) to avoid consuming metadata space that may be needed for an adjacent allocation. In this case, the tag on the opposite side can be used to validate the pointer tag with the data tag. Otherwise, if both sides extend to 32 bytes or more, the tag is duplicated on both sides (e.g., 1722 and 1724) to avoid needing to load both sides of metadata in case of cacheline/page crossings. Third, even allocations larger than 16 bytes can use the duplicated tag format 1710. For example, the format supports 32-byte slots, covered by two copies of the tag (e.g., 1716) and 64-byte slots covered by four copies of the tag (e.g., 1716). Also, the formats are convenient for supporting large allocations that do not cross the midpoints of every power of two slot that could otherwise be used. Finally, if an allocation only has two granules in length, or if the allocation does not cross a 128-byte midpoint, then the duplicated tag format is used. The tag value can be duplicated in the tag table such that one tag value is stored for each granule of the allocation. If an allocation is only one granule, then one tag value is stored in the tag table for the allocation.

Figure 18:
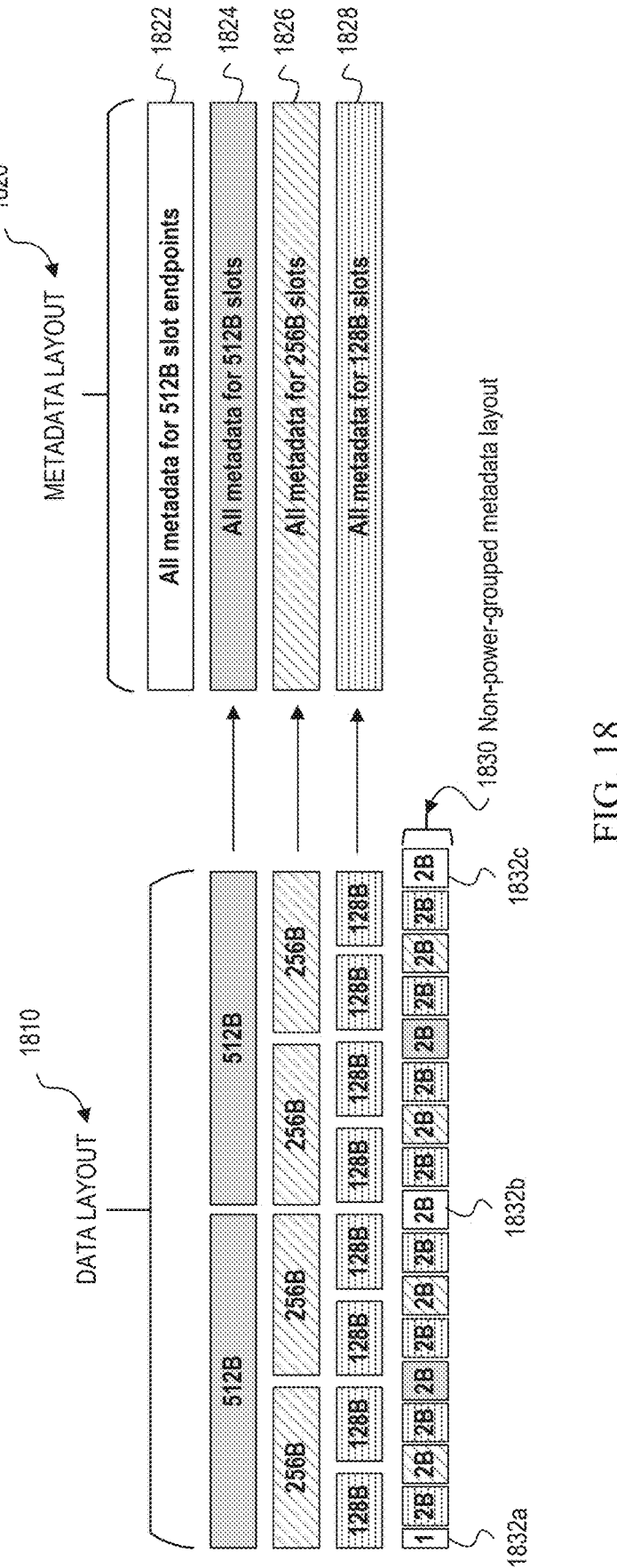
FIG. 18 is a block diagram illustrating possible data layouts and corresponding metadata layouts according to at least one embodiment.

FIG. 18 is a schematic diagram illustrating a possible data layout 1810 of slotted memory, a corresponding non-power-grouped metadata layout 1830, and a corresponding power-grouped metadata layout 1820 according to at least one embodiment. The non-power-grouped metadata layout 1830 is a direct mapping from the slotted data addresses down to the metadata addresses for bounded slots and shows which metadata storage gets assigned to which slot. In this example, only 128-byte slots, 256-byte slots, and 512-byte slots are bounded. Other smaller slots (e.g., 64-byte slots, 32-byte slots and 16-byte slots) are unbounded. As shown in the non-power-grouped metadata layout 1830 in FIG. 18, every possible 2-byte bounded metadata location maps to a unique slot midpoint with a defined slot size. Since the bounded slots start at 128 bytes for 2 bytes of metadata, 1 byte of space is unused at the ends of the metadata range for the smallest slots (e.g., 128 bytes) to accommodate the metadata of whatever slot has its midpoint at that endpoint.

As long as an allocation is at least three granules in length and crosses a midpoint of one of the bounded slots (e.g., 128 B, 256 B, 512 B), then the bounded metadata format (e.g., 1720) can be used. As previously described, if an allocation only has three granules, the corresponding metadata includes only one tag. The single tag is located on the side of the metadata corresponding to the side of the slot midpoint having two granules. The other side of the metadata corresponding to the side of the slot midpoint having one granule contains only the bounds (e.g., 1726 or 1728) without an adjacent tag. If an allocation is two granules in length or if the allocation does not cross the midpoint of one of the 128-byte slots, then the duplicated tag format can be used. The duplicated tag format is used when the allocation does not cross the midpoint of one of the 128-byte slots because allocation needs to cross the midpoint of every slot of the size indicated in the pointer for the metadata storage at that midpoint to be available/reserved for that allocation. By way of example, if an allocation crosses multiple 128 B slot midpoints, but at the end extends partway into a 128 B slot but does not cross the midpoint of that slot, then the metadata locations for that 128 B slot are unavailable to be used for that allocation. In this scenario, the allocation reverts back to the duplicated tag format.

Gaps exist between the maximally sized slots, which in this example, are the 512-byte slots. Gaps are created when the data layout 1810 does not support a slot that covers the entire address space. In this example, only three slot sizes are supported with the largest slot size being 512 bytes. Between every naturally aligned power of two 512-byte slot, a corresponding metadata location 1832a, 1832b, and 1832c is available but cannot be used for any slotted allocation since there is no slot in the data layout 1810 that has a midpoint aligned with the gap. Even though the metadata locations corresponding to the gaps cannot be used to represent bounds for a slot, the locations may still be used when an allocation in one of the gaps is using duplicated tags because the duplicated tag values may be stored in the metadata location (e.g., 1832a, 1832b, or 1832c) reserved for that gap. It should be apparent that other implementations may support different slot sizes and/or a different number of slot sizes if addition pointer bits are used.

Some allocations may exist that are not assigned to a slot (e.g., 1- or 2-granule allocations, allocations that do not cross a midpoint of a slot having the smallest slot size). Some of the non-slotted allocations may use a duplicated tag format. When the duplicated tag format is used, a typical mapping can be used to determine where the duplicated tags are to be stored. In the example of FIG. 18, the memory address of the data can be divided by 32, and the result can be added to the metadata table base address to identify the corresponding metadata location in the flat metadata range (e.g., 1830). For allocations that are selected as having non-duplicated metadata without a descriptor or bounds (e.g., 1-granule allocations), the same mapping is performed to determine where the non-duplicated tag value is to be stored.

In this embodiment, the metadata mapped to the non-power-grouped metadata layout 1830 may all be rearranged and grouped according to slot size as shown in the power-grouped metadata layout 1820. For example, the metadata for allocations assigned to 128-byte slots are grouped together in 128-byte metadata group 1828, the metadata for allocations assigned to 256-byte slots are grouped together in 256-byte metadata group 1826, the metadata for allocations assigned to 512-byte slots are grouped together in 512-byte metadata group 1824, and the metadata for the 512-byte slot endpoints are grouped together in 512-byte slot endpoint metadata group 1822. An additional mapping is performed for the metadata corresponding to non-slotted allocations to determine where that metadata would be stored if used for a slot. The power-grouped metadata layout 1820 may be implemented as one table containing all of the power-grouped metadata or as individual tables, with each table containing the metadata of a single power group and potentially non-slotted allocations. Two times metadata reduction may be achieved for 128-byte slotted allocations up to eight times metadata reduction for 512-byte aligned allocations. Any metadata location can be used as either bounded metadata or duplicated metadata.

Figure 19:
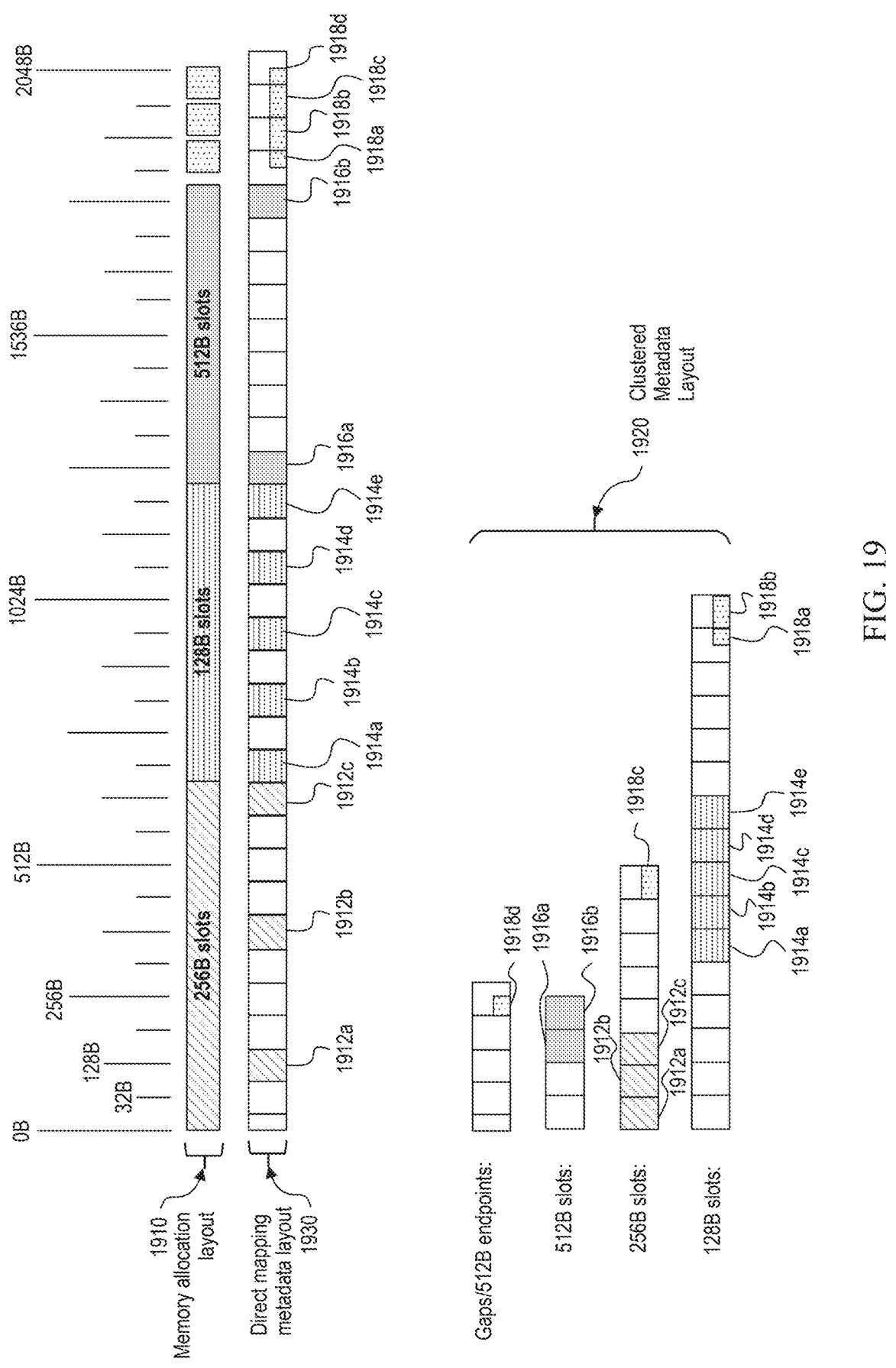
FIG. 19 is a schematic diagram illustrating an example memory allocation layout, a direct mapping metadata layout, and a power-grouped metadata layout according to at least one embodiment.

FIG. 19 is a schematic diagram illustrating an example memory allocation layout 1910, a corresponding direct mapping metadata layout 1930, and a corresponding power-grouped metadata layout 1930. As shown in the direct mapping metadata layout 1930, three allocations assigned three 256-byte slots correspond respectively to metadata 1912a, 1912b, and 1912c. Five allocations assigned to five 128-byte slots correspond respectively to metadata 1914a, 1914b, 1914c, 1914d, and 1914e. Two allocations assigned to two 512-byte slots correspond to metadata 1916a and 1916b. Two non-slotted allocations correspond to duplicated tag metadata 1918b and 1918c, and two other non-slotted allocations correspond to non-duplicated tag metadata 1918a and 1918d. Clustered metadata layout 1920 illustrates how the metadata corresponding to slotted allocations (e.g., 1912a-1912c, 1914a-1914e, and 1916a-1916b) is rearranged and grouped according to slot size (or power associated with slot size). Clustered metadata layout 1920 also illustrates how the metadata corresponding to non-slotted allocations (e.g., 1918a-1918d) is mapped into slot groups where the metadata would be stored if used for a slot.

A slight variation on the metadata format and layout of FIGS. 18 and 19 can also be used to reduce the storage overheads for physically indexed tags that are carried along with data in sidecars attached to each data cacheline. When the memory controller loads metadata into a cacheline sidecar, which is metadata storage tightly connected with a cacheline, it can start at the largest slot and check whether the metadata for that slot is valid and whether the bounds for that slot include the relevant data location. If so, that tag value can be loaded into the sidecar. Otherwise, the processor can check the next-largest slot, and so on. To indicate whether a particular metadata item is valid, the format can be modified such that one of the 4-bit portions used to store a copy of the tag can instead contain a set of flags including one flag to indicate whether the metadata is valid.

If it is possible for each 4-bit metadata granule to be used as either part of a bounded metadata item or as a duplicated tag value, then the processor may be unable to distinguish bounded metadata from duplicated tags without knowledge of the pointer, which may be unavailable at the time the metadata needs to be loaded. In that case, the processor may allow each physical page of memory to be covered by either duplicated metadata or bounded metadata, but not both. For example, there may be range registers or a bitmap to indicate the metadata type for each 4K-aligned region of physical memory. The allocator could provide appropriate controls so that the particular allocation layout on each page can be supported. One benefit of this approach is that the pointer would no longer need to specify the slot size.

Figure 20:
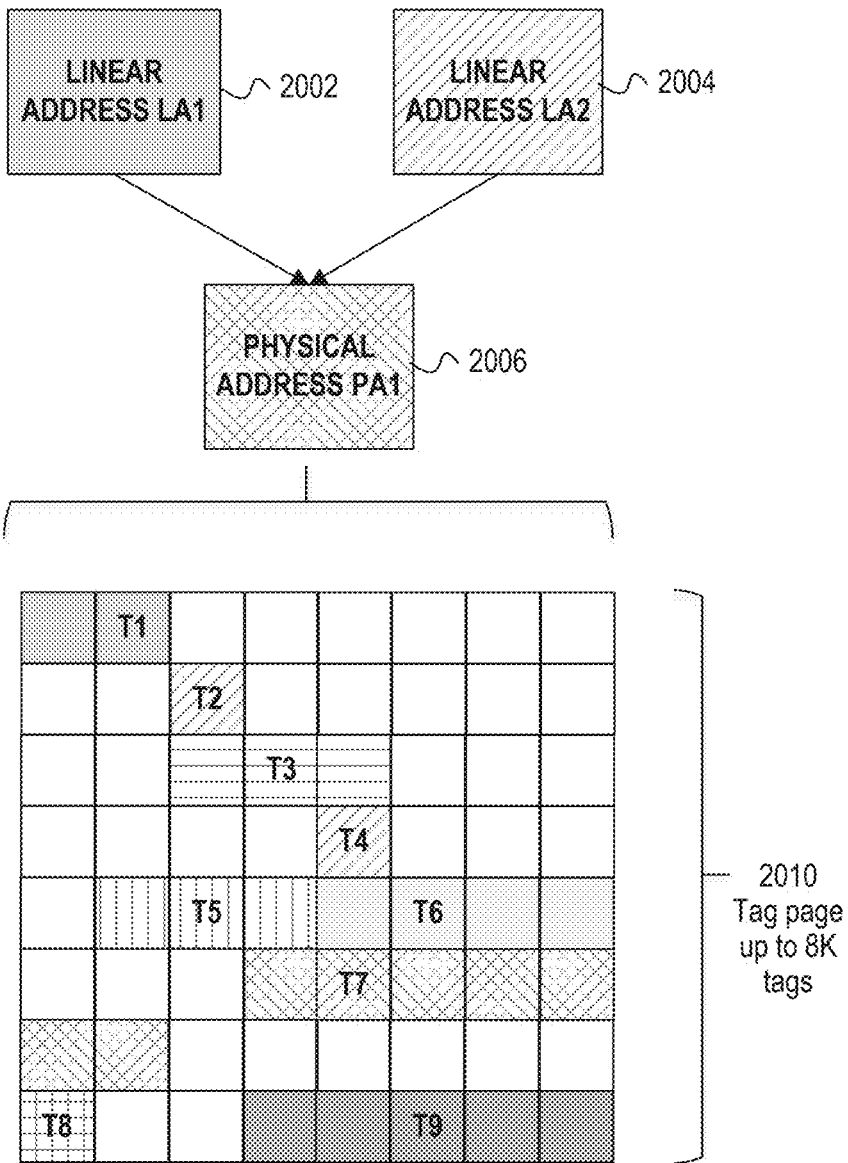
FIG. 20 is a block diagram that illustrates the use of aliasing with a memory tagging scheme according to at least one embodiment.

FIG. 20 is a block diagram that illustrates aliasing with embodiments of memory tagging with a single memory tag per allocation. FIG. 20 illustrates a page 2010 with tags T1-T9. A linear address LA1 2002 corresponds to tag T1, a linear address LA2 2004 corresponds to tags T2 and T4, and a physical address PA1 2006 corresponds to tag T7.

Additional memory savings can be achieved through aliasing with embodiments of single tag memory tagging disclosed herein. Realizing another advantage of using linear sparse single tag memory tagging is that the same physical tag page can be aliased across multiple linear mappings. This can allow software to manage different single tag representations on a shared physical page. One advantage includes avoiding discontinuous repeated tag accesses where multiple cachelines or pages may need to be accessed across an allocation. Also, aliasing provides flexibility as software can manage more sophisticated policies to minimize storage overheads. Finally, an aliasing approach remains compatible with existing cryptographic address encoding.

Exemplary Computer Architectures

Detailed below are describes of exemplary computer architectures that may be used with single tag memory tagging embodiments disclosed herein. Generally, any computer architecture designs and configurations known in the arts for processors and computing systems may be used with one or more embodiments disclosed herein. In an example, system designs and configurations known in the arts for laptops, desktops, handheld personal computers (PC)s, personal digital assistants, tablets, engineering workstations, servers, disaggregated servers, network devices, network hubs, appliances, switches, routers, embedded processors, digital signal processors (DSPs), graphics devices, video game devices, set-top boxes, micro controllers, mobile devices, smart phones, cell phones, portable media players, hand-held devices, wearable devices, and various other electronic devices, are also suitable for embodiments described herein including computing system 100. In general, a variety of systems or electronic devices capable of incorporating a processor and/or other execution logic as disclosed herein are generally suitable.

Figure 21:
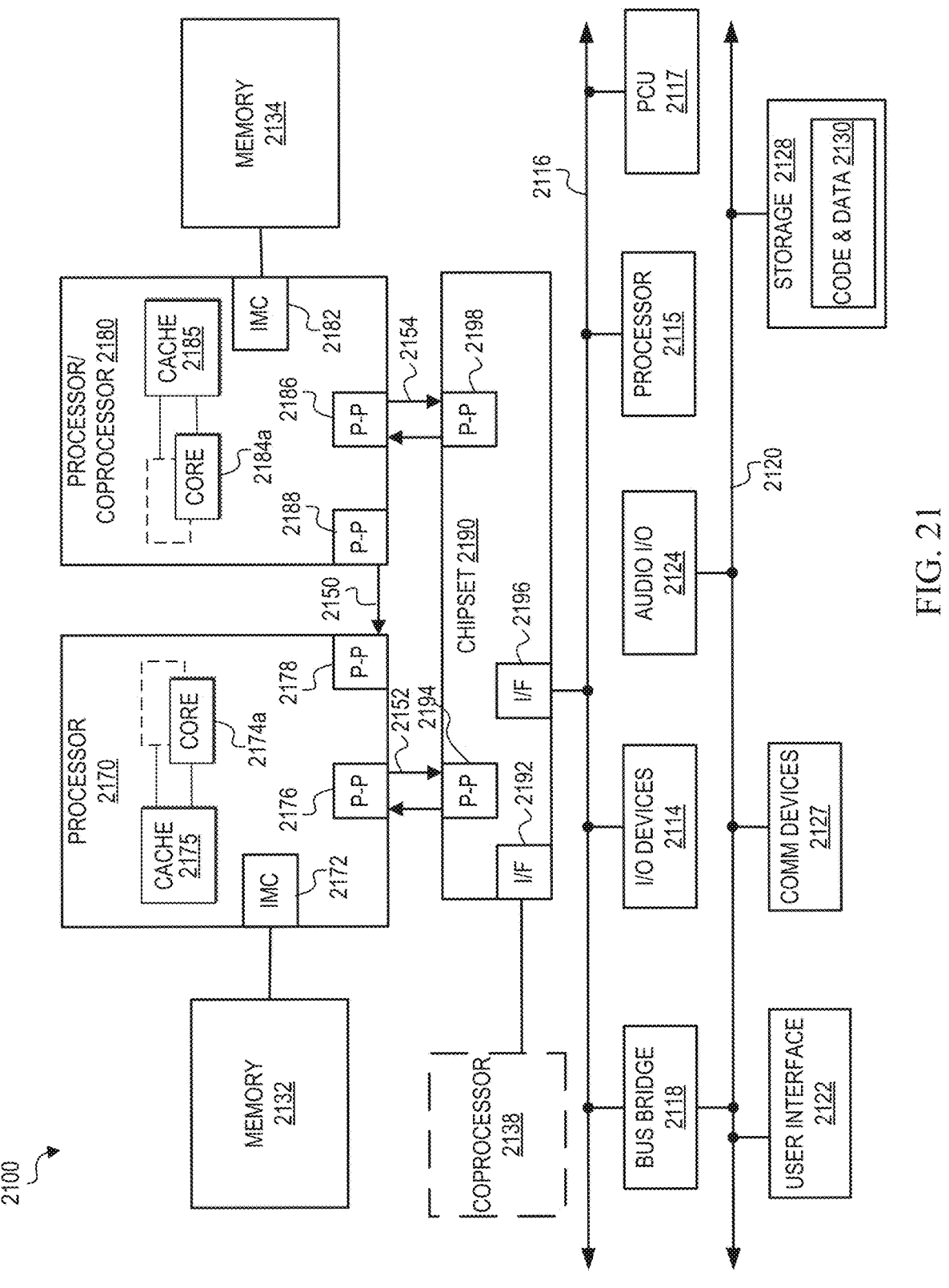
FIG. 21 illustrates an exemplary system.

FIG. 21 illustrates an exemplary system. Multiprocessor system 2100 is a point-to-point interconnect system and includes a plurality of processors including a first processor 2170 and a second processor 2180 coupled via a point-to-point interconnect 2150. In some examples, the first processor 2170 and the second processor 2180 are homogeneous. In some examples, first processor 2170 and the second processor 2180 are heterogenous. Though the exemplary system 2100 is shown to have two processors, the system may have three or more processors, or may be a single processor system.

Processors 2170 and 2180 are shown including integrated memory controller (IMC) circuitry 2172 and 2182, respectively. Processor 2170 also includes as part of its interconnect controller point-to-point (P-P) interfaces 2176 and 2178; similarly, second processor 2180 includes P-P interfaces 2186 and 2188. Processors 2170, 2180 may exchange information via the point-to-point (P-P) interconnect 2150 using P-P interface circuits such as interfaces 2178, 2188. IMC circuitry 2172 and 2182 couple the processors 2170, 2180 to respective memories, namely a memory 2132 and a memory 2134, which may be portions of main memory locally attached to the respective processors.

Processors 2170, 2180 may each exchange information with a chipset 2190 via individual P-P interconnects 2152, 2154 using point to point interface circuits such as interfaces 2176, 2194, 2186, 2198. Chipset 2190 may optionally exchange information with a coprocessor 2138 via an interface 2192. In some examples, the coprocessor 2138 is a special-purpose processor, such as, for example, a high-throughput processor, a network or communication processor, compression engine, graphics processor, general purpose graphics processing unit (GPGPU), neural-network processing unit (NPU), embedded processor, or the like.

Processors 2170 and 2180 may include respective caches 2175 and 2185. A shared cache (not shown) may be included in either processor 2170, 2180 or outside of both processors, yet connected with the processors via P-P interconnect, such that either or both processors' local cache information may be stored in the shared cache if a processor is placed into a low power mode.

Chipset 2190 may be coupled to a first interconnect 2116 via an interface 2196. In some examples, first interconnect 2116 may be a Peripheral Component Interconnect (PCI) interconnect, or an interconnect such as a PCI Express interconnect or another I/O interconnect. In some examples, one of the interconnects couples to a power control unit (PCU) 2117, which may include circuitry, software, and/or firmware to perform power management operations with regard to the processors 2170, 2180 and/or coprocessor 2138. PCU 2117 provides control information to a voltage regulator (not shown) to cause the voltage regulator to generate the appropriate regulated voltage. PCU 2117 also provides control information to control the operating voltage generated. In various examples, PCU 2117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 2117 is illustrated as being present as logic separate from the processor 2170 and/or processor 2180. In other cases, PCU 2117 may execute on a given one or more of cores (e.g., 2174a, 2184a) of processor 2170 or 2180. In some cases, PCU 2117 may be implemented as a microcontroller (dedicated or general-purpose) or other control logic configured to execute its own dedicated power management code, sometimes referred to as P-code. In yet other examples, power management operations to be performed by PCU 2117 may be implemented externally to a processor, such as by way of a separate power management integrated circuit (PMIC) or another component external to the processor. In yet other examples, power management operations to be performed by PCU 2117 may be implemented within BIOS or other system software.

Various I/O devices 2114 may be coupled to first interconnect 2116, along with a bus bridge 2118 which couples first interconnect 2116 to a second interconnect 2120. In some examples, one or more additional processor(s) 2115, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 2116. In some examples, second interconnect 2120 may be a low pin count (LPC) interconnect. Various devices may be coupled to second interconnect 2120 including, for example, a keyboard and/or mouse 2122, communication devices 2127 and a storage circuitry 2128. Storage circuitry 2128 may be one or more non-transitory machine-readable storage media as described below, such as a disk drive or other mass storage device which may include instructions/code and data 2130 and may implement the storage 'ISAB03 in some examples. Further, an audio I/O 2124 may be coupled to second interconnect 2120. Note that other architectures than the point-to-point architecture described above are possible. For example, instead of the point-to-point architecture, a system such as multiprocessor system 2100 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 22:
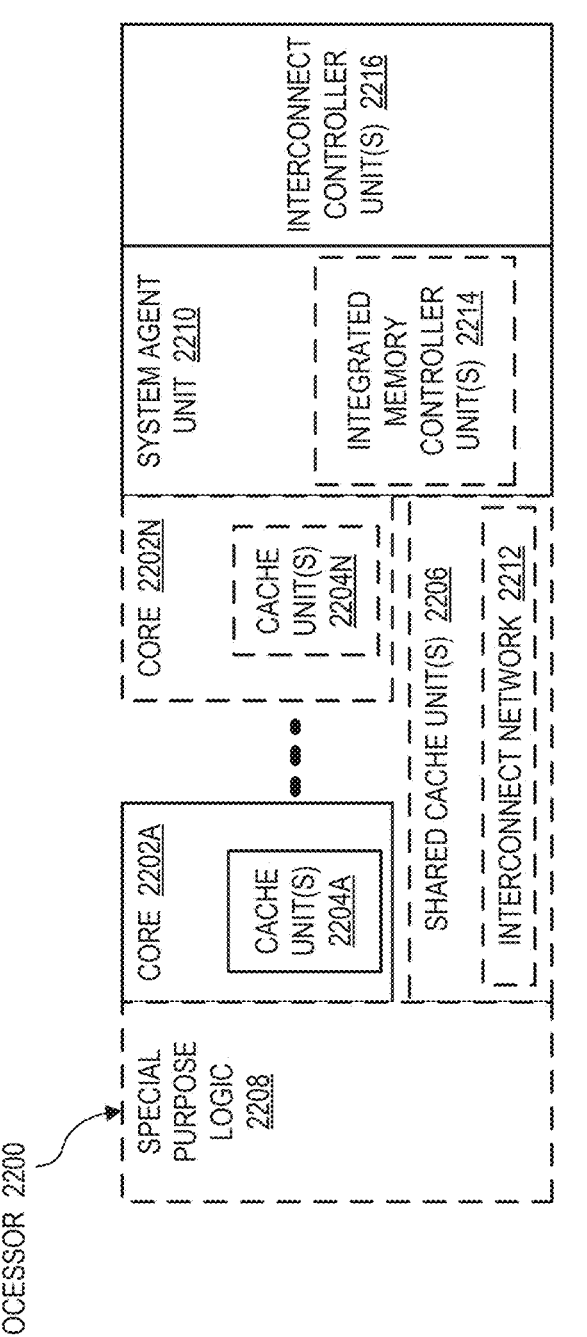
FIG. 22 illustrates a block diagram of an example processor that may have more than one core and an integrated memory controller.

FIG. 22 illustrates a block diagram of an example processor 2200 that may have more than one core and an integrated memory controller. The solid lined boxes illustrate a processor 2200 with a single core 2202A, a system agent unit circuitry 2210, a set of one or more interconnect controller unit(s) circuitry 2216, while the optional addition of the dashed lined boxes illustrates an alternative processor 2200 with multiple cores 2202A-2202N, a set of one or more integrated memory controller unit(s) circuitry 2214 in the system agent unit circuitry 2210, and special purpose logic 2208, as well as a set of one or more interconnect controller units circuitry 2216. Note that the processor 2200 may be one of the processors 2170 or 2180, or coprocessor 2138 or additional processor 2115 of FIG. 21.

Thus, different implementations of the processor 2200 may include: 1) a CPU with the special purpose logic 2208 being integrated graphics and/or scientific (throughput) logic (which may include one or more cores, not shown), and the cores 2202A-2202N being one or more general purpose cores (e.g., general purpose in-order cores, general purpose out-of-order cores, or a combination of the two); 2) a coprocessor with the cores 2202A-2202N being a large number of special purpose cores intended primarily for graphics and/or scientific (throughput); and 3) a coprocessor with the cores 2202A-2202N being a large number of general purpose in-order cores. Thus, the processor 2200 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 2200 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 2204A-2204N within the cores 2202A-2202N, a set of one or more shared cache unit(s) circuitry 2206, and external memory (not shown) coupled to the set of integrated memory controller unit(s) circuitry 2214. The set of one or more shared cache unit(s) circuitry 2206 may include one or more mid-level caches, such as level 2 (L2), level 3 (L3), level 4 (L4), or other levels of cache, such as a last level cache (LLC), and/or combinations thereof. While in some examples ring-based interconnect network circuitry 2212 interconnects the special purpose logic 2208 (e.g., integrated graphics logic), the set of shared cache unit(s) circuitry 2206, and the system agent unit circuitry 2210, alternative examples use any number of well-known techniques for interconnecting such units. In some examples, coherency is maintained between one or more of the shared cache unit(s) circuitry 2206 and cores 2202A-2202N.

In some examples, one or more of the cores 2202A-2202N are capable of multi-threading. The system agent unit circuitry 2210 includes those components coordinating and operating cores 2202A-2202N. The system agent unit circuitry 2210 may include, for example, power control unit (PCU) circuitry and/or display unit circuitry (not shown). The PCU may be or may include logic and components needed for regulating the power state of the cores 2202A-2202N and/or the special purpose logic 2208 (e.g., integrated graphics logic). The display unit circuitry is for driving one or more externally connected displays.

The cores 2202A-2202N may be homogenous in terms of instruction set architecture (ISA). Alternatively, the cores 2202A-2202N may be heterogeneous in terms of ISA; that is, a subset of the cores 2202A-2202N may be capable of executing an ISA, while other cores may be capable of executing only a subset of that ISA or another ISA.

Figure 23A:
FIG. 23A is a block diagram illustrating both an exemplary in-order pipeline and an exemplary register renaming, out-of-order issue/execution pipeline according to examples.
Figure 23B:
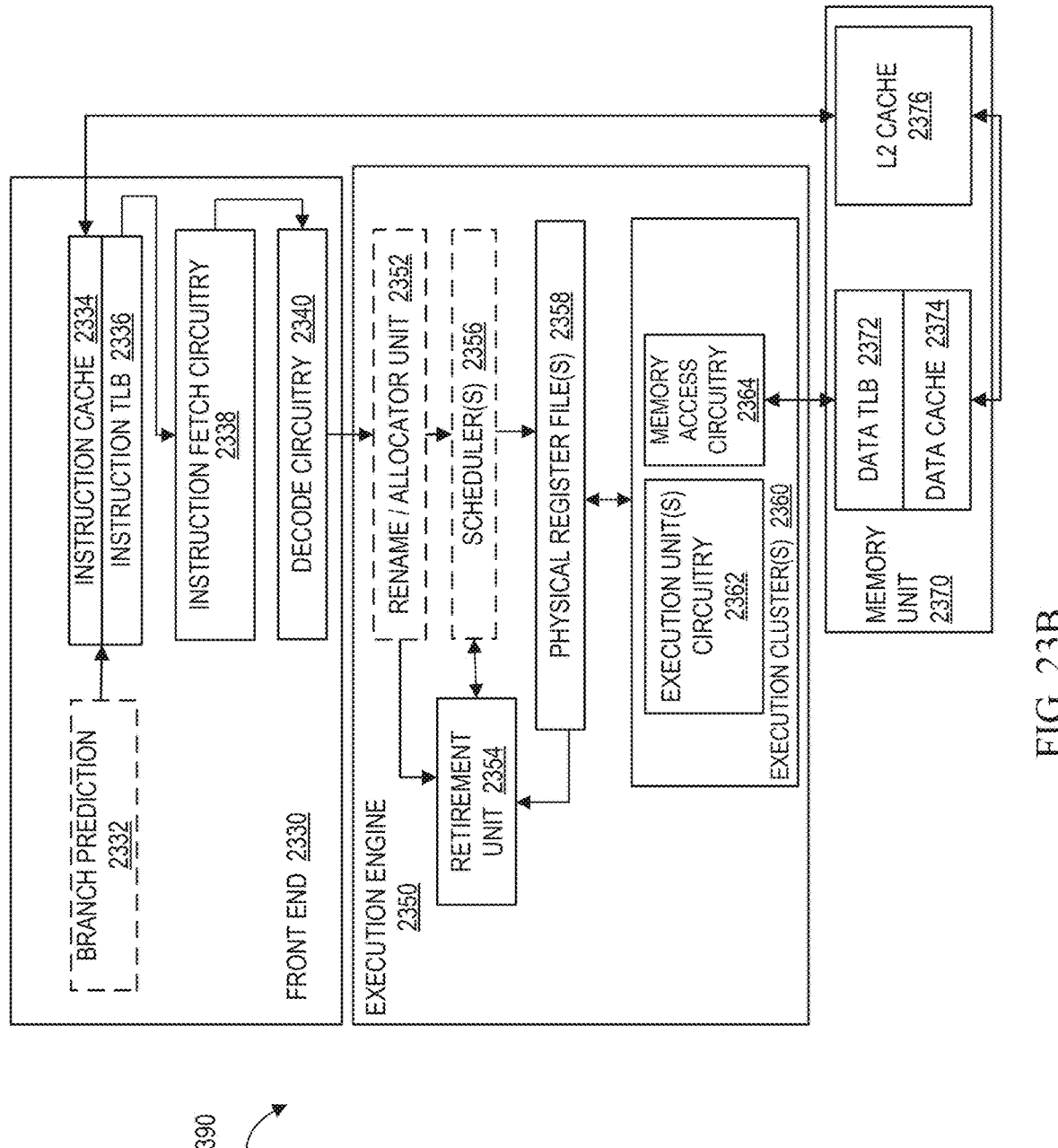
FIG. 23B is a block diagram illustrating both an exemplary example of an in-order architecture core and an exemplary register renaming, out-of-order issue/execution architecture core to be included in a processor according to examples.

FIG. 23A is a block diagram illustrating both an exemplary in-order pipeline and an exemplary register renaming, out-of-order issue/execution pipeline according to examples. FIG. 23B is a block diagram illustrating both an exemplary example of an in-order architecture core and an exemplary register renaming, out-of-order issue/execution architecture core to be included in a processor according to examples. The solid lined boxes in FIGS. 23A-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 23A, a processor pipeline 2300 includes a fetch stage 2302, an optional length decoding stage 2304, a decode stage 2306, an optional allocation (Alloc) stage 2308, an optional renaming stage 2310, a schedule (also known as a dispatch or issue) stage 2312, an optional register read/memory read stage 2314, an execute stage 2316, a write back/memory write stage 2318, an optional exception handling stage 2322, and an optional commit stage 2324. One or more operations can be performed in each of these processor pipeline stages. For example, during the fetch stage 2302, one or more instructions are fetched from instruction memory, and during the decode stage 2306, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 2306 and the register read/memory read stage 2314 may be combined into one pipeline stage. In one example, during the execute stage 2316, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 23B may implement the pipeline 2300 as follows: 1) the instruction fetch circuitry 2338 performs the fetch and length decoding stages 2302 and 2304; 2) the decode circuitry 2340 performs the decode stage 2306; 3) the rename/allocator unit circuitry 2352 performs the allocation stage 2308 and renaming stage 2310; 4) the scheduler(s) circuitry 2356 performs the schedule stage 2312; 5) the physical register file(s) circuitry 2358 and the memory unit circuitry 2370 perform the register read/memory read stage 2314; the execution cluster(s) 2360 perform the execute stage 2316; 6) the memory unit circuitry 2370 and the physical register file(s) circuitry 2358 perform the write back/memory write stage 2318; 7) various circuitry may be involved in the exception handling stage 2322; and 8) the retirement unit circuitry 2354 and the physical register file(s) circuitry 2358 perform the commit stage 2324.

FIG. 23B shows a processor core 2390 including front-end unit circuitry 2330 coupled to an execution engine unit circuitry 2350, and both are coupled to a memory unit circuitry 2370. The core 2390 may be a reduced instruction set architecture computing (RISC) core, a complex instruction set architecture computing (CISC) core, a very long instruction word (VLIW) core, or a hybrid or alternative core type. As yet another option, the core 2390 may be a special-purpose core, such as, for example, a network or communication core, compression engine, coprocessor core, general purpose computing graphics processing unit (GPGPU) core, graphics core, or the like.

The front end unit circuitry 2330 may include branch prediction circuitry 2332 coupled to an instruction cache circuitry 2334, which is coupled to an instruction translation lookaside buffer (TLB) 2336, which is coupled to instruction fetch circuitry 2338, which is coupled to decode circuitry 2340. In one example, the instruction cache circuitry 2334 is included in the memory unit circuitry 2370 rather than the front-end circuitry 2330. The decode circuitry 2340 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 2340 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 2340 may be implemented using various different mechanisms. Examples of suitable mechanisms include, but are not limited to, look-up tables, hardware implementations, programmable logic arrays (PLAs), microcode read only memories (ROMs), etc. In one example, the core 2390 includes a microcode ROM (not shown) or other medium that stores microcode for certain macroinstructions (e.g., in decode circuitry 2340 or otherwise within the front end circuitry 2330). In one example, the decode circuitry 2340 includes a micro-operation (micro-op) or operation cache (not shown) to hold/cache decoded operations, micro-tags, or micro-operations generated during the decode or other stages of the processor pipeline 2300. The decode circuitry 2340 may be coupled to rename/allocator unit circuitry 2352 in the execution engine circuitry 2350.

The execution engine circuitry 2350 includes the rename/allocator unit circuitry 2352 coupled to a retirement unit circuitry 2354 and a set of one or more scheduler(s) circuitry 2356. The scheduler(s) circuitry 2356 represents any number of different schedulers, including reservations stations, central instruction window, etc. In some examples, the scheduler(s) circuitry 2356 can include arithmetic logic unit (ALU) scheduler/scheduling circuitry, ALU queues, arithmetic generation unit (AGU) scheduler/scheduling circuitry, AGU queues, etc. The scheduler(s) circuitry 2356 is coupled to the physical register file(s) circuitry 2358. Each of the physical register file(s) circuitry 2358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 2358 includes vector registers unit circuitry, writemask registers unit circuitry, and scalar register unit circuitry. These register units may provide architectural vector registers, vector mask registers, general-purpose registers, etc. The physical register file(s) circuitry 2358 is coupled to the retirement unit circuitry 2354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 2354 and the physical register file(s) circuitry 2358 are coupled to the execution cluster(s) 2360. The execution cluster(s) 2360 includes a set of one or more execution unit(s) circuitry 2362 and a set of one or more memory access circuitry 2364. The execution unit(s) circuitry 2362 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 2356, physical register file(s) circuitry 2358, and execution cluster(s) 2360 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 2364). It should also be understood that where separate pipelines are used, one or more of these pipelines may be out-of-order issue/execution and the rest in-order.

In some examples, the execution engine unit circuitry 2350 may perform load store unit (LSU) address/data pipelining to an Advanced Microcontroller Bus (AMB) interface (not shown), and address phase and writeback, data phase load, store, and branches.

The set of memory access circuitry 2364 is coupled to the memory unit circuitry 2370, which includes data TLB circuitry 2372 coupled to a data cache circuitry 2374 coupled to a level 2 (L2) cache circuitry 2376. In one exemplary example, the memory access circuitry 2364 may include a load unit circuitry, a store address unit circuit, and a store data unit circuitry, each of which is coupled to the data TLB circuitry 2372 in the memory unit circuitry 2370. The instruction cache circuitry 2334 is further coupled to the level 2 (L2) cache circuitry 2376 in the memory unit circuitry 2370. In one example, the instruction cache 2334 and the data cache 2374 are combined into a single instruction and data cache (not shown) in L2 cache circuitry 2376, a level 3 (L3) cache circuitry (not shown), and/or main memory. The L2 cache circuitry 2376 is coupled to one or more other levels of cache and eventually to a main memory.

The core 2390 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 2390 includes logic to support a packed data instruction set architecture extension (e.g., AVX1, AVX2), thereby allowing the operations used by many multimedia applications to be performed using packed data.

Figure 24:
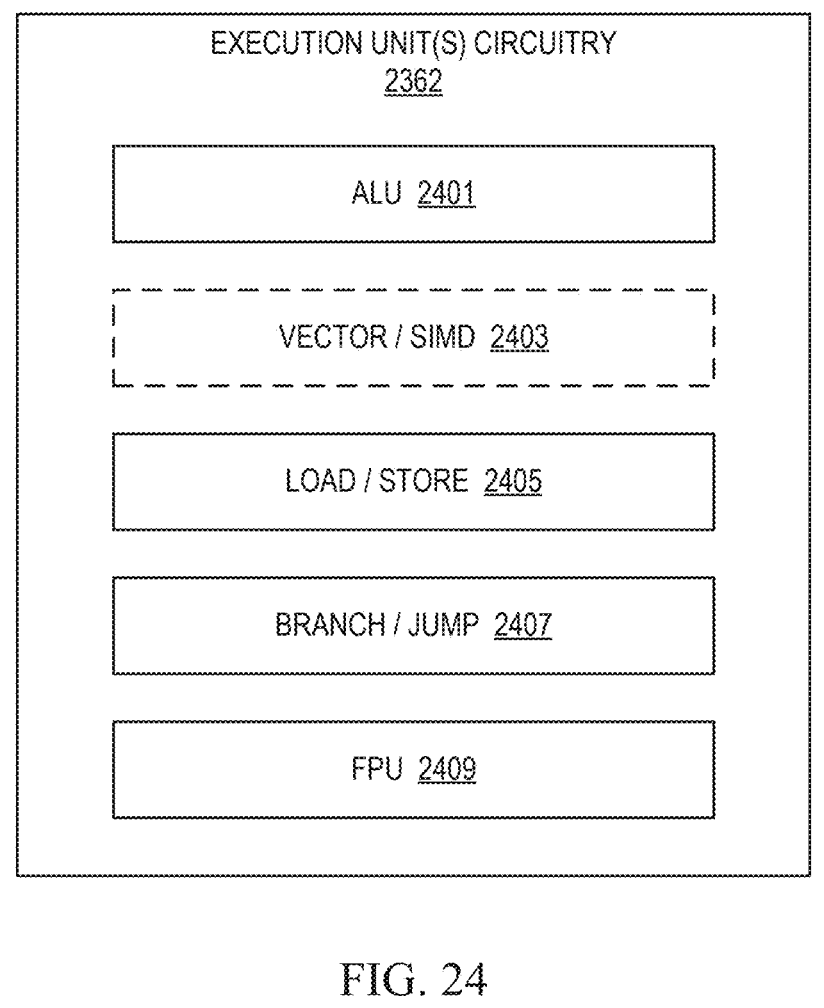

FIG. 24 illustrates examples of execution unit(s) circuitry, such as execution unit(s) circuitry 2362 of FIG. 23B. As illustrated, execution unit(s) circuitry 2362 may include one or more ALU circuits 2401, optional vector/single instruction multiple data (SIMD) circuits 2403, load/store circuits 2405, branch/jump circuits 2407, and/or Floating-point unit (FPU) circuits 2409. ALU circuits 2401 perform integer arithmetic and/or Boolean operations. Vector/SIMD circuits 2403 perform vector/SIMD operations on packed data (such as SIMD/vector registers). Load/store circuits 2405 execute load and store instructions to load data from memory into registers or store from registers to memory. Load/store circuits 2405 may also generate addresses. Branch/jump circuits 2407 cause a branch or jump to a memory address depending on the instruction. FPU circuits 2409 perform floating-point arithmetic. The width of the execution unit(s) circuitry 2362 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

With regard to this specification generally, unless expressly stated to the contrary, use of the phrases 'at least one of' and 'one or more of' refers to any combination of the named elements, conditions, activities, messages, entries, paging structures, or devices. For example, 'at least one of X, Y, and Z' and 'one or more of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular items (e.g., element, condition, module, activity, operation, claim element, messages, protocols, interfaces, devices etc.) they modify, but are not intended to indicate any type of order, rank, importance, temporal sequence, or hierarchy. For example, 'first X' and 'second X' are intended to designate two separate X elements that are not necessarily limited by any order, rank, importance, temporal sequence, or hierarchy of the two elements, unless specifically stated to the contrary.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of "embodiment" and other exemplarily language does not necessarily refer to the same embodiment or the same example, but may refer to different and distinct embodiments, as well as potentially the same embodiment.

Embodiments of the mechanisms disclosed herein may be implemented in hardware, software, firmware, or a combination of such implementation approaches. Embodiments of this disclosure may be implemented, at least partially, as computer programs or program code executing on programmable systems comprising at least one processor, a storage system (including volatile and non-volatile memory and/or storage elements), at least one input device, and at least one output device.

The architectures presented herein are provided by way of example only and are intended to be non-exclusive and non-limiting. Furthermore, the various parts disclosed are intended to be logical divisions only and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

It is also important to note that the operations in the preceding flowcharts and diagrams illustrating interactions, illustrate only some of the possible activities that may be executed by, or within, a computing system using the approaches disclosed herein for providing memory tagging with a single tag for an allocation. Some of these operations may be deleted or removed where appropriate, or these operations may be modified or changed considerably without departing from the scope of the present disclosure. In addition, the timing of these operations may be altered considerably. For example, the timing and/or sequence of certain operations may be changed relative to other operations to be performed before, after, or in parallel to the other operations, or based on any suitable combination thereof. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

NOTES AND EXAMPLES

The following examples pertain to embodiments in accordance with this specification. Example P1 provides a processor including a first register to store an encoded pointer for a first memory address within a first memory allocation of a plurality of memory allocations in a memory region of a memory, and circuitry to receive a memory operation request based on the encoded pointer, to obtain a first tag of a plurality of tags stored in a table in the memory, and the first tag is associated with the first memory allocation, to obtain first pointer metadata stored in the encoded pointer, and to determine whether to perform a memory operation corresponding to the memory operation request based, at least in part, on a determination of whether the first pointer metadata corresponds to the first tag.

Example P2 comprises the subject matter of Example P1, and the table is to include a plurality of sets of metadata associated respectively with the plurality of memory allocations, and each tag of the plurality of tags is included in a respective one of the sets of metadata.

Example P3 comprises the subject matter of Example P2, and the plurality of memory allocations is associated with at least two different allocation sizes.

Example P4 comprises the subject matter of any one of Examples P1-P3, and a first set of metadata stored in the table is associated with the first memory allocation and includes the first tag, and the first memory allocation is defined by a first allocation size.

Example P5 comprises the subject matter of Example P4, and based on the first allocation size corresponding to a single granule, the first set of metadata includes only the first tag.

Example P6 comprises the subject matter of Example P4, and based on the first allocation size corresponding to two granules, the first set of metadata includes the first tag and a descriptor.

Example P7 comprises the subject matter of Example P4, and based on the first allocation size corresponding to more than two granules, the first set of metadata includes the first tag, a descriptor, and at least one instance of bounds information.

Example P8 comprises the subject matter of Example P4, and the first set of metadata is indexed in the table based on a first midpoint of a first slot in the memory to which the first memory allocation is assigned, and the memory is apportioned into a plurality of slots associated with a plurality of slot sizes based on multiple power of two numbers.

Example P9 comprises the subject matter of Example P8, and the table is to include a plurality of entries and the first set of metadata is to be stored in one or more entries of the plurality of entries.

Example P10 comprises the subject matter of Example P9, and each one of the plurality of entries corresponds to a midpoint of a respective slot having a first slot size of one granule of the memory, and each adjacent pair of entries in the table corresponds to a respective slot having a second slot size of two or more granules of the memory.

Example P11 comprises the subject matter of any one of Examples P8-P10, and the circuitry is further to determine a first memory location of the first set of metadata based on the first midpoint of the first slot to which the first memory allocation is assigned.

Example P12 comprises the subject matter of any one of Examples P4 or P7-P11, and the circuitry is further to obtain second pointer metadata from the encoded pointer, to obtain a descriptor from the first set of metadata in response to determining that the second pointer metadata represents a size corresponding to more than two granules, to obtain at least first bounds information from the first set of metadata, to determine a first bounds of the first memory allocation based on the first bounds information and the descriptor, and to determine whether the first memory address is within the first bounds.

Example P13 comprises the subject matter of any one of Examples P1-P5 or P8-P11, and the circuitry is further to obtain second pointer metadata from the encoded pointer, and, in response to determining that the second pointer metadata in the encoded pointer represents a power corresponding to a single granule of the memory, to determine whether the first pointer metadata corresponds to the first tag.

Example P14 comprises the subject matter of any one of Examples P1-P13, and the first memory allocation is a contiguous range of linear addresses.

Example P15 comprises the subject matter of any one of Examples P1-P13, and the first memory allocation of a contiguous range of physical addresses.

Example P16 comprises the subject matter of any one of Examples P1-P13, and the first memory allocation is a page of memory.

Example P17 comprises the subject matter of any one of Examples P1-P16, and the circuitry is further to, in response to a determination that the first pointer metadata does not correspond to the first tag, enable a software exception handler to take an action.

Example P18 comprises the subject matter of Example P17 and the circuitry is further to, in response to determining that an object cache of a core of the circuitry contains a first set of metadata containing the first tag, clear the first set of metadata from the object cache, clear the first set of metadata from the table in the memory, and synchronize at least one or more other object caches of one or more other cores of the circuitry.

Example P19 comprises the subject matter of any one of Examples P1-P18, and the memory is apportioned into a plurality of slots associated with a plurality of slot sizes based on multiple power of two numbers, and two or more tags of the plurality of tags are to be clustered in the memory based on a first slot size, and two or more other tags of the plurality of tags are to be clustered in the memory based on a second slot size.

Example P20 comprises the subject matter of Example P19 and two or more memory allocations of the plurality of memory allocations are assigned to two or more adjacent slots associated with the first slot size, and a two or more other memory allocations of the plurality of memory allocations are assigned to two or more other adjacent slots associated with the second slot size.

Example P21 comprises the subject matter of any one of Examples P1-P20, and the circuitry is further to receive a second memory operation request based on a second encoded pointer to a second memory address within a second memory allocation of the plurality of memory allocations in the memory, determine that a second tag associated with the second allocation is omitted from an object cache, and use an index specified by an exception handler in software to store the second tag in an object cache entry in the object cache.

Example M1 provides a method including receiving, by a processor, a memory operation request based on an encoded pointer for a memory address within a first memory allocation of a plurality of memory allocations in memory, obtaining a first tag of a plurality of tags stored in a table in the memory, and the first tag is associated with the first memory allocation, obtaining first pointer metadata stored in the encoded pointer, and based, at least in part, on a determination that the first pointer metadata corresponds to the first tag, performing a memory operation corresponding to the memory operation request.

Example M2 comprises the subject matter of Example M1, and the table includes a plurality of sets of metadata associated respectively with the plurality of memory allocations, and each tag of the plurality of tags is included in a respective one of the sets of metadata.

Example M3 comprises the subject matter of Example M2, and the plurality of memory allocations is associated with at least two different allocation sizes.

Example M4 comprises the subject matter of any one of Examples M1-M3, and a first set of metadata stored in the table is associated with the first memory allocation and includes the first tag, and the first memory allocation is defined by a first allocation size.

Example M5 comprises the subject matter of Example M4, and based on the first allocation size corresponding to a single granule, the first set of metadata includes only the first tag.

Example M6 comprises the subject matter of Example M4, and based on the first allocation size corresponding to two granules, the first set of metadata includes the first tag and a descriptor.

Example M7 comprises the subject matter of Example M4, and based on the first allocation size corresponding to more than two granules, the first set of metadata includes the first tag, a descriptor, and at least one instance of bounds information.

Example M8 comprises the subject matter of Example M4, and the first set of metadata is indexed in the table based on a first midpoint of a first slot in the memory to which the first memory allocation is assigned, and the memory is apportioned into a plurality of slots associated with a plurality of slot sizes based on multiple power of two numbers.

Example M9 comprises the subject matter of Example M8, and the table includes a plurality of entries and the first set of metadata is stored in one or more entries of the plurality of entries.

Example M10 comprises the subject matter of Example M9, and each one of the plurality of entries corresponds to a midpoint of a respective slot having a first slot size of one granule of memory, and each adjacent pair of entries in the table corresponds to a respective slot having a second slot size of two or more granules of the memory.

Example M11 comprises the subject matter of any one of Examples M8-M10, and further includes determining a first memory location of the first set of metadata based on the first midpoint of the first slot to which the first memory allocation is assigned.

Example M12 comprises the subject matter of any one of Examples M4 or M7-M11, and further includes obtaining second pointer metadata from the encoded pointer, obtaining a descriptor from the first set of metadata in response to determining that the second pointer metadata represents a size corresponding to more than two granules, obtaining at least first bounds information from the first set of metadata, determining a first bounds of the first memory allocation based on the first bounds information and the descriptor, and determining whether the memory address is within the first bounds.

Example M13 comprises the subject matter of any one of Examples M1-M5 or M8-M11, and further includes obtaining second pointer metadata from the encoded pointer, and in response to determining that the second pointer metadata in the encoded pointer represents a power corresponding to a single granule of the memory, determining whether the first pointer metadata corresponds to the first tag.

Example M14 comprises the subject matter of any one of Examples M1-M13, and the first memory allocation is a contiguous range of linear addresses.

Example M15 comprises the subject matter of any one of Examples M1-M13, and the first memory allocation is a contiguous range of physical addresses.

Example M16 comprises the subject matter of any one of Examples M1-M13, and the first memory allocation is a page of the memory.

Example M17 comprises the subject matter of any one of Examples M1-M16, and further includes enabling a software exception handler to take an action in response to determining that the first pointer metadata does not correspond to the first tag.

Example M18 comprises the subject matter of Example M17 and further includes clearing a first set of metadata from an object cache in response to determining that the object cache of a core of the processor contains the first set of metadata containing the first tag, clearing the first set of metadata from the table in the memory, and synchronizing at least one or more other object caches of one or more other cores of the processor.

Example M19 comprises the subject matter of any one of Examples M1-M18, and the memory is apportioned into a plurality of slots associated with a plurality of slot sizes based on multiple power of two numbers, and two or more tags of the plurality of tags are to be clustered in the memory based on a first slot size, and two or more other tags of the plurality of tags are to be clustered in the memory based on a second slot size.

Example M20 comprises the subject matter of Example M19 and two or more memory allocations of the plurality of memory allocations are assigned to two or more adjacent slots associated with the first slot size, and a two or more other memory allocations of the plurality of memory allocations are assigned to two or more other adjacent slots associated with the second slot size.

Example M21 comprises the subject matter of any one of Examples M1-M20, and further includes receiving a second memory operation request based on a second encoded pointer to a second memory address within a second memory allocation of the plurality of memory allocations in the memory, determining that a second tag associated the second allocation is omitted from an object cache, specifying an index for an object cache entry in the object cache, and overwriting metadata in the object cache entry to store the second tag in the object cache entry based on the index.

Example S1 provides a system including memory circuitry that includes a memory region apportioned into a plurality of slots, processor circuitry that includes a first register to store an encoded pointer for a first memory address within a first memory allocation of a plurality of memory allocations in the memory region, and memory controller circuitry. The memory controller circuitry is to receive a memory operation request based on the encoded pointer, obtain a first tag of a plurality of tags stored in a table in the memory circuitry, and the first tag is associated with the first memory allocation, obtain first pointer metadata stored in the encoded pointer, and determine whether to perform a memory operation corresponding to the memory operation request based, at least in part, on a determination of whether the first pointer metadata corresponds to the first tag.

Example S2 comprises the subject matter of Example S1, and the table is to include a plurality of sets of metadata associated respectively with the plurality of memory allocations, and each tag of the plurality of tags is included in a respective one of the sets of metadata.

Example S3 comprises the subject matter of Example S2, and the plurality of memory allocations is associated with at least two different allocation sizes.

Example S4 comprises the subject matter of any one of Examples S1-S3, and a first set of metadata stored in the table is associated with the first memory allocation and includes the first tag, and the first memory allocation is defined by a first allocation size.

Example S5 comprises the subject matter of Example S4, and based on the first allocation size corresponding to a single granule, the first set of metadata includes only the first tag.

Example S6 comprises the subject matter of Example S4, and based on the first allocation size corresponding to two granules, the first set of metadata includes the first tag and a descriptor.

Example S7 comprises the subject matter of Example S4, and based on the first allocation size corresponding to more than two granules, the first set of metadata includes the first tag, a descriptor, and at least one instance of bounds information.

Example S8 comprises the subject matter of Example S4, and the first set of metadata is indexed in the table based on a first midpoint of a first slot in the memory circuitry to which the first memory allocation is assigned, and the plurality of slots are associated with a plurality of slot sizes based on multiple power of two numbers.

Example S9 comprises the subject matter of Example S8, and the table is to include a plurality of entries and the first set of metadata is to be stored in one or more entries of the plurality of entries.

Example S10 comprises the subject matter of Example S9, and each one of the plurality of entries corresponds to a midpoint of a respective slot having a first slot size of one granule of the memory circuitry, and each adjacent pair of entries in the table corresponds to a respective slot having a second slot size of two or more granules of the memory circuitry.

Example S11 comprises the subject matter of any one of Examples S8-S10, and the memory controller circuitry is further to determine a first memory location of the first set of metadata based on the first midpoint of the first slot to which the first memory allocation is assigned.

Example S12 comprises the subject matter of any one of Examples S4 or S7-S11, and the memory controller circuitry is further to obtain second pointer metadata from the encoded pointer, obtain a descriptor from the first set of metadata in response to determining that the second pointer metadata represents a size corresponding to more than two granules, obtain at least first bounds information from the first set of metadata, determine a first bounds of the first memory allocation based on the first bounds information and the descriptor, and determine whether the first memory address is within the first bounds.

Example S13 comprises the subject matter of any one of Examples S1-S5 or S8-S11, and the memory controller circuitry is further to obtain second pointer metadata from the encoded pointer, and in response to determining that the second pointer metadata in the encoded pointer represents a power corresponding to a single granule of the memory circuitry, determine whether the first pointer metadata corresponds to the first tag.

Example S14 comprises the subject matter of any one of Examples S1-S13, and the first memory allocation is a contiguous range of linear addresses.

Example S15 comprises the subject matter of any one of Examples S1-S13, and the first memory allocation of a contiguous range of physical addresses.

Example S16 comprises the subject matter of any one of Examples S1-S13, and the first memory allocation is a page of memory.

Example S17 comprises the subject matter of any one of Examples S1-S16, and the memory controller circuitry is further to enable a software exception handler to take an action in response to a determination that the first pointer metadata does not correspond to the first tag.

Example S18 comprises the subject matter of Example S17 and the memory controller circuitry is further to clear the first set of metadata from the object cache in response to determining that an object cache of a core of the processor circuitry contains a first set of metadata containing the first tag, clear the first set of metadata from the table in the memory circuitry, and synchronize at least one or more other object caches of one or more other cores of the processor circuitry.

Example S19 comprises the subject matter of any one of Examples S1-S18, and the plurality of slots are associated with a plurality of slot sizes based on multiple power of two numbers, and two or more tags of the plurality of tags are to be clustered in the memory circuitry based on a first slot size, and two or more other tags of the plurality of tags are to be clustered in the memory circuitry based on a second slot size.

Example S20 comprises the subject matter of Example S19 and two or more memory allocations of the plurality of memory allocations are assigned to two or more adjacent slots associated with the first slot size, and a two or more other memory allocations of the plurality of memory allocations are assigned to two or more other adjacent slots associated with the second slot size.

Example S21 comprises the subject matter of any one of Examples S1-S20, and the memory controller circuitry is further to receive a second memory operation request based on a second encoded pointer to a second memory address within a second memory allocation of the plurality of memory allocations in the memory, determine that a second tag associated with the second allocation is omitted from an object cache, and use an index specified by an exception handler in software by storing the second tag in an object cache entry in the object cache.

Example S22 comprises the subject matter of any one of Examples S1-S21, and the memory controller circuitry is an integrated memory controller (IMC) of the processor circuitry or is separate from and communicatively connected to the processor circuitry.

The following examples pertain to embodiments in accordance with this specification. Example PP1 provides a processor including circuitry to receive a memory operation request based on an encoded pointer to a first linear address within a first memory allocation in a memory, translate the first linear address to a first physical address in a first physical page of the memory corresponding to a first linear page of the memory, identify an intersection relationship between the first memory allocation and the first physical page, and determine a second physical address in the first physical page based on the intersection relationship, and determine a first location containing a first tag in a metadata table in physical memory based on the second physical address.

Example PP2 comprises the subject matter of Example PP1, and the circuitry is further to obtain the first tag stored at the first location in the metadata table, obtain first pointer metadata stored in the encoded pointer, and determine whether to perform a memory operation corresponding to the memory operation request based, at least in part, on whether the first pointer metadata corresponds to the first tag.

Example PP3 comprises the subject matter of Example PP2, and the intersection relationship is defined by the first memory allocation being entirely contained within the first physical page.

Example PP4 comprises the subject matter of Example PP3, and the first tag is associated with the first memory allocation.

Example PP5 comprises the subject matter of any one of Examples PP3-PP4, and the circuitry is further to determine a second linear address of a slot midpoint of a first slot in the memory to which the first memory allocation is assigned, and the memory is apportioned into a plurality of slots associated with a plurality of slot sizes based on multiple power of two numbers, and translate the second linear address of the slot midpoint to the second physical address in the first physical page.

Example PP6 comprises the subject matter of Example PP2, and the intersection relationship is defined by the first memory allocation crossing a lower boundary of the first physical page such that an upper portion of the first memory allocation intersects a lower portion of the first physical page.

Example PP7 comprises the subject matter of Example PP6, and the first tag is associated with the upper portion of the first memory allocation.

Example PP8 comprises the subject matter of any one of Examples PP6-PP7, and the second physical address corresponds to the lower boundary of the first physical page.

Example PP9 comprises the subject matter of Example PP2, and the intersection relationship is defined by the first memory allocation crossing an upper boundary of the first physical page such that a lower portion of the first memory allocation intersects an upper portion of the first physical page.

Example PP10 comprises the subject matter of Example PP9, and the first tag is associated with the lower portion of the first memory allocation.

Example PP11 comprises the subject matter of any one of Examples PP9-PP10, and the second physical address corresponds to the upper boundary of the first physical page.

Example PP12 comprises the subject matter of Example PP1, and the metadata table is to include a plurality of sets of metadata associated respectively with each unique intersection of a physical page and at least a portion of a memory allocation.

Example PP13 comprises the subject matter of Example PP12, and each set of metadata of the plurality of sets of metadata includes a tag and a descriptor.

Example PP14 comprises the subject matter of any one of Examples PP1-PP13, and a first set of metadata in the metadata table includes the first tag and a first descriptor.

Example PP15 comprises the subject matter of Example PP14, and based on a first intersection of the first physical page and at least a portion of the first memory allocation including more than two granules, one or more instances of bounds information is included in the first set of metadata.

Example MM1 provides a method including receiving a memory operation request based on an encoded pointer to a first linear address within a first memory allocation in a memory, translating the first linear address to a first physical address in a first physical page of the memory corresponding to a first linear page of the memory, identifying an intersection relationship between the first memory allocation and the first physical page, and determining a second physical address in the first physical page based on the intersection relationship, and determining a first location containing a first tag in a metadata table in physical memory based on the second physical address.

Example MM2 comprises the subject matter of Example MM1, and further includes obtaining the first tag stored at the first location in the metadata table, obtaining first pointer metadata stored in the encoded pointer, and determining whether to perform a memory operation corresponding to the memory operation request based, at least in part, on whether the first pointer metadata corresponds to the first tag.

Example MM3 comprises the subject matter of Example MM2, and the intersection relationship is defined by the first memory allocation being entirely contained within the first physical page.

Example MM4 comprises the subject matter of Example MM3, and the first tag is associated with the first memory allocation.

Example MM5 comprises the subject matter of any one of Examples MM3-MM4, and further includes determining a second linear address of a slot midpoint of a first slot in the memory to which the first memory allocation is assigned, and the memory is apportioned into a plurality of slots associated with a plurality of slot sizes based on multiple power of two numbers, and translating the second linear address of the slot midpoint to the second physical address in the first physical page.

Example MM6 comprises the subject matter of Example MM2, and the intersection relationship is defined by the first memory allocation crossing a lower boundary of the first physical page such that an upper portion of the first memory allocation intersects a lower portion of the first physical page.

Example MM7 comprises the subject matter of Example MM6, and the first tag is associated with the upper portion of the first memory allocation.

Example MM8 comprises the subject matter of any one of Examples MM6-MM7, and the second physical address corresponds to the lower boundary of the first physical page.

Example MM9 comprises the subject matter of Example MM2, and the intersection relationship is defined by the first memory allocation crossing an upper boundary of the first physical page such that a lower portion of the first memory allocation intersects an upper portion of the first physical page.

Example MM10 comprises the subject matter of Example MM9, and the first tag is associated with the lower portion of the first memory allocation.

Example MM11 comprises the subject matter of any one of Examples MM9-MM10, and the second physical address corresponds to the upper boundary of the first physical page.

Example MM12 comprises the subject matter of Example MM1, and the metadata table is to include a plurality of sets of metadata associated respectively with each unique intersection of a physical page and at least a portion of a memory allocation.

Example MM13 comprises the subject matter of Example MM12, and each set of metadata of the plurality of sets of metadata includes a tag and a descriptor.

Example MM14 comprises the subject matter of any one of Examples MM1-MM13, and a first set of metadata in the metadata table includes the first tag and a first descriptor.

Example MM15 comprises the subject matter of Example MM14, and based on a first intersection of the first physical page and at least a portion of the first memory allocation including more than two granules, one or more instances of bounds information is included in the first set of metadata.

Example SS1 provides a system including memory circuitry that includes a memory region apportioned into a plurality of slots, and processor circuitry to receive a memory operation request based on an encoded pointer to a first linear address within a first memory allocation in a memory, translate the first linear address to a first physical address in a first physical page of the memory corresponding to a first linear page of the memory, identify an intersection relationship between the first memory allocation and the first physical page, and determine a second physical address in the first physical page based on the intersection relationship, and determine a first location containing a first tag in a metadata table in physical memory based on the second physical address.

Example SS2 comprises the subject matter of Example SS1, and the processor circuitry is further to obtain the first tag stored at the first location in the metadata table, obtain first pointer metadata stored in the encoded pointer, and determine whether to perform a memory operation corresponding to the memory operation request based, at least in part, on whether the first pointer metadata corresponds to the first tag.

Example SS3 comprises the subject matter of Example SS2, and the intersection relationship is defined by the first memory allocation being entirely contained within the first physical page.

Example SS4 comprises the subject matter of Example SS3, and the first tag is associated with the first memory allocation.

Example SS5 comprises the subject matter of any one of Examples SS3-SS4, and the processor circuitry is further to determine a second linear address of a slot midpoint of a first slot in the memory to which the first memory allocation is assigned and the plurality of slots is associated with a plurality of slot sizes based on multiple power of two numbers, and translate the second linear address of the slot midpoint to the second physical address in the first physical page.

Example SS6 comprises the subject matter of Example SS2, and the intersection relationship is defined by the first memory allocation crossing a lower boundary of the first physical page such that an upper portion of the first memory allocation intersects a lower portion of the first physical page.

Example SS7 comprises the subject matter of Example SS6, and the first tag is associated with the upper portion of the first memory allocation.

Example SS8 comprises the subject matter of any one of Examples SS6-SS7, and the second physical address corresponds to the lower boundary of the first physical page.

Example SS9 comprises the subject matter of Example SS2, and the intersection relationship is defined by the first memory allocation crossing an upper boundary of the first physical page such that a lower portion of the first memory allocation intersects an upper portion of the first physical page.

Example SS10 comprises the subject matter of Example SS9, and the first tag is associated with the lower portion of the first memory allocation.

Example SS11 comprises the subject matter of any one of Examples SS9-SS10, and the second physical address corresponds to the upper boundary of the first physical page.

Example SS12 comprises the subject matter of Example SS1, and the metadata table is to include a plurality of sets of metadata associated respectively with each unique intersection of a physical page and at least a portion of a memory allocation.

Example SS13 comprises the subject matter of Example SS12, and each set of metadata of the plurality of sets of metadata includes a tag and a descriptor.

Example SS14 comprises the subject matter of any one of Examples SS1-SS13, and a first set of metadata in the metadata table includes the first tag and a first descriptor.

Example SS15 comprises the subject matter of Example SS14, and based on a first intersection of the first physical page and at least a portion of the first memory allocation including more than two granules, one or more instances of bounds information is included in the first set of metadata.

Example X1 provides an apparatus comprising means for performing the method of any one of Examples M1-M20 or MM1-MM15.

Example X2 comprises the subject matter of Example X1 can optionally include that the means for performing the method comprises at least one processor and at least one memory element.

Example X3 comprises the subject matter of Example X2 can optionally include that the at least one memory element comprises machine readable instructions that when executed, cause the apparatus to perform the method of any one of Examples M1-M20 or MM1-MM15.

Example X4 comprises the subject matter of any one of Examples X1-X3 can optionally include that the apparatus is one of a computing system, a processing element, or a system-on-a-chip.

Example Y1 provides at least one machine readable storage medium comprising instructions that when executed realize an apparatus, realize a processor, realize a system, or implement a method as in any one of the preceding Examples.

The invention claimed is:

1. A processor, comprising:
a register to store an encoded pointer for a memory address within a first memory allocation of a plurality of memory allocations in a memory region of a memory; and
circuitry to:
receive a memory operation request based on the encoded pointer;
obtain a first tag of a plurality of tags stored in a table in the memory, wherein each memory allocation of the plurality of memory allocations is associated with a respective one of the plurality of tags stored in the table;
obtain first pointer metadata stored in the encoded pointer; and
determine whether to perform a memory operation corresponding to the memory operation request based, at least in part, on a determination of whether the first pointer metadata corresponds to the first tag.

2. The processor of claim 1, wherein the table is to include a plurality of sets of metadata associated respectively with the plurality of memory allocations, wherein each tag of the plurality of tags is included in a respective one of the plurality of sets of metadata.

3. The processor of claim 2, wherein the plurality of memory allocations is associated with at least two different allocation sizes.

4. The processor of claim 1, wherein a first set of metadata stored in the table is associated with the first memory allocation and includes the first tag, wherein the first memory allocation is defined by a first allocation size.

5. The processor of claim 4, wherein based on the first allocation size corresponding to a single granule, the first set of metadata includes only the first tag.

6. The processor of claim 4, wherein based on the first allocation size corresponding to two granules, the first set of metadata includes the first tag and a descriptor.

7. The processor of claim 4, wherein based on the first allocation size corresponding to more than two granules, the first set of metadata includes the first tag, a descriptor, and at least one instance of bounds information.

8. The processor of claim 4, wherein the first set of metadata is indexed in the table based on a first midpoint of a first slot in the memory to which the first memory allocation is assigned, wherein the memory is apportioned into a plurality of slots associated with a plurality of slot sizes based on multiple power of two numbers.

9. The processor of claim 8, wherein the table is to include a plurality of entries and the first set of metadata is to be stored in one or more entries of the plurality of entries.

10. The processor of claim 9, wherein each one of the plurality of entries corresponds to a midpoint of a respective slot having a first slot size of one granule of the memory, and wherein each adjacent pair of entries in the table corresponds to a respective slot having a second slot size of two or more granules of the memory.

11. The processor of claim 8, wherein the circuitry is further to:
determine a first memory location of the first set of metadata based on the first midpoint of the first slot to which the first memory allocation is assigned.

12. The processor of claim 4, wherein the circuitry is further to:

obtain second pointer metadata from the encoded pointer;

in response to determining that the second pointer metadata represents a size corresponding to more than two granules, obtain a descriptor from the first set of metadata;

obtain at least first bounds information from the first set of metadata;

determine a first bounds of the first memory allocation based on the first bounds information and the descriptor; and determine whether the memory address is within the first bounds.

13. The processor of claim 1, wherein the circuitry is further to:

obtain second pointer metadata from the encoded pointer; and in response to determining that the second pointer metadata in the encoded pointer represents a power corresponding to a single granule of the memory, determine whether the first pointer metadata corresponds to the first tag.

14. The processor of claim 1, wherein the first memory allocation is a contiguous range of linear addresses.

15. The processor of claim 1, wherein the first memory allocation of a contiguous range of physical addresses.

16. The processor of claim 1, wherein the first memory allocation is a page of the memory.

17. The processor of claim 1, wherein the circuitry is further to:

in response to a second determination that the first pointer metadata does not correspond to the first tag, enable a software exception handler to take an action.

18. The processor of claim 17, wherein the circuitry is further to:

in response to determining that an object cache of a core of the circuitry contains a first set of metadata containing the first tag, clear the first set of metadata from the object cache;

clear the first set of metadata from the table in the memory; and synchronize at least one or more other object caches of one or more other cores of the circuitry.

19. The processor of claim 1, wherein the memory is apportioned into a plurality of slots associated with a plurality of slot sizes based on multiple power of two numbers, wherein two or more of the plurality of tags are to be clustered in the memory based on a first slot size, and wherein two or more other tags of the plurality of tags are to be clustered in the memory based on a second slot size.

20. One or more non-transitory machine readable media comprising instructions that, when executed by a processor, cause the processor to:

receive a memory operation request based on an encoded pointer for a memory address within a first memory allocation of a plurality of memory allocations in memory;

obtain a first tag of a plurality of tags stored in a table in the memory, wherein each memory allocation of the plurality of memory allocations is associated with a respective one of the plurality of tags stored in the table;

obtain first pointer metadata stored in the encoded pointer; and determine whether to perform a memory operation corresponding to the memory operation request based, at least in part, on a determination of whether the first pointer metadata corresponds to the first tag.

21. The one or more non-transitory machine readable media of claim 20, wherein the table is to include a plurality of sets of metadata associated respectively with the plurality of memory allocations, wherein each tag of the plurality of tags is included in a respective one of the plurality of sets of metadata.

22. A system, comprising:

memory circuitry including a memory region apportioned into a plurality of slots;

processor circuitry including a register to store an encoded pointer for a memory address within a first memory allocation of a plurality of memory allocations in the memory region; and memory controller circuitry to:

receive a memory operation request based on the encoded pointer;

obtain a first tag of a plurality of tags stored in a table in the memory circuitry, wherein each memory allocation of the plurality of memory allocations is associated with a respective one of the plurality of tags stored in the table;

obtain first pointer metadata stored in the encoded pointer; and based, at least in part, on a determination that the first pointer metadata corresponds to the first tag, perform a memory operation corresponding to the memory operation request.

23. The system of claim 22, wherein the plurality of memory allocations is associated with at least two different allocation sizes, and wherein the first memory allocation is a contiguous range of linear addresses, a contiguous range of physical addresses, or a page of memory.

24. A method, comprising:

receiving, by a processor a memory operation request based on an encoded pointer for a memory address within a first memory allocation of a plurality of memory allocations in memory;

obtaining a first tag of a plurality of tags stored in a table in the memory, wherein the first tag is associated with the first memory allocation;

obtaining first pointer metadata stored in the encoded pointer; and based, at least in part, on a determination that the first pointer metadata corresponds to the first tag, performing a memory operation corresponding to the memory operation request.

25. The method of claim 24, further comprising:

receiving a second memory operation request based on a second encoded pointer to a second memory address within a second memory allocation of the plurality of memory allocations in the memory;

determining that a second tag associated the second memory allocation is omitted from an object cache;

specifying, by an exception handler in software, an index for an object cache entry in the object cache; and overwriting metadata in the object cache entry by storing the second tag in the object cache entry based on the index.

* * * * *